United States Patent
Yi et al.

(10) Patent No.: US 11,363,480 B2
(45) Date of Patent: Jun. 14, 2022

(54) CONDITIONAL RADIO RESOURCE MANAGEMENT MEASUREMENTS

(71) Applicant: Ofinno, LLC, Reston, VA (US)

(72) Inventors: Yunjung Yi, Vienna, VA (US); Esmael Dinan, McLean, VA (US); Kyungmin Park, Vienna, VA (US); Hua Zhou, Herndon, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 16/867,740

(22) Filed: May 6, 2020

(65) Prior Publication Data

US 2020/0359247 A1    Nov. 12, 2020

Related U.S. Application Data

(60) Provisional application No. 62/844,679, filed on May 7, 2019.

(51) Int. Cl.
*H04W 24/10* (2009.01)
*H04L 5/00* (2006.01)
*H04W 76/27* (2018.01)
*H04W 52/02* (2009.01)
(Continued)

(52) U.S. Cl.
CPC .............. *H04W 24/10* (2013.01); *H04L 5/005* (2013.01); *H04W 52/0251* (2013.01); *H04W 52/0274* (2013.01); *H04W 72/085* (2013.01); *H04W 76/27* (2018.02); *H04W 80/02* (2013.01)

(58) Field of Classification Search
CPC ...... H04B 7/0619–0658; H04L 5/0048; H04L 5/0057; H04L 5/0094; H04W 24/10; H04W 52/00–0296
See application file for complete search history.

(56) References Cited

U.S. PATENT DOCUMENTS

| 8,644,827 B2 | 2/2014 | Yamada et al. |
| 9,351,220 B2 | 5/2016 | Tamura et al. |
| 2019/0059093 A1* | 2/2019 | Cheng ................... H04L 5/0082 |

(Continued)

OTHER PUBLICATIONS

3GPP TS 38.133 V15.4.0 (Dec. 2018); Technical Specification 3rd Generation Partnership Project; Technical Specification Group Radio Access Network; NR;; Requirements for support of radio resource management.

(Continued)

*Primary Examiner* — Pao Sinkantarakorn
(74) *Attorney, Agent, or Firm* — Brett Gardner; Kavon Nasabzadeh; Philip R. Smith

(57) ABSTRACT

A wireless device receives radio resource control (RRC) message(s) comprising configuration parameters of: a measurement object of a carrier. The measurement object indicates one or more reference signals. The RRC message(s) comprise a measurement report associated with the measurement object. The RRC message(s) comprise one or more conditions to initiate, based on the measurement object, a first measurement of a signal quality of the one or more reference signals. A determination is made of whether one or more conditions are met. In response to the determination indicating that the one or more conditions are met, the first measurement of a signal quality of the one or more reference signals is initiated. The signal quality based on the measurement report transmit.

16 Claims, 26 Drawing Sheets

(51) Int. Cl.
*H04W 80/02* (2009.01)
*H04W 72/08* (2009.01)

(56) References Cited

U.S. PATENT DOCUMENTS

| | | | | |
|---|---|---|---|---|
| 2019/0159053 A1* | 5/2019 | Tsuda | .................... | H04W 48/16 |
| 2019/0364451 A1* | 11/2019 | Yang | .................... | H04W 24/10 |
| 2020/0267586 A1* | 8/2020 | Hwang | ................ | H04W 24/08 |
| 2020/0280991 A1* | 9/2020 | Kim | ....................... | H04W 48/12 |
| 2021/0014746 A1* | 1/2021 | Wu | ........................ | H04W 76/11 |
| 2021/0076240 A1* | 3/2021 | Koziol | ................ | H04W 24/08 |

OTHER PUBLICATIONS

3GPP TS 38.215 V15.4.0 (Dec. 2018); Technical Specification; 3rd Generation Partnership Project; Technical Specification Group Radio Access Network; NR; Physical layer measurements; (Release 15).
3GPP TS 38.331 V15.8.0 (Dec. 2019); Technical Specification; 3rd Generation Partnership Project; Technical Specification Group Radio Access Network; NR; Radio Resource Control (RRC) protocol specification; (Release 15).
"R1-1901711; 3GPP TSG RAN WG1 #96 ; Athens, Greece, Feb. 25-Mar. 1, 2019; ; Source:vivo; Title:UE power saving in RRM Measurements; Agenda Item:7.2.9.3;".
"R1-1901805 NR RRM UE power saving_final; 3GPP TSG RAN WG1 Meeting RAN1 #96 ; Athens, Greece, Feb. 25-Mar. 1, 2019; ; Agenda item: 7.2.9.3; Source: MediaTek Inc. ; Title: NR RRM UE power saving;".
"R1-1902032—On UE Power Saving for RRM Measurement_Final; 3GPP TSG RAN WG1 Meeting #96 ; Athens, Greece, Feb. 25-Mar. 1, 2019; Source: ZTE; Title:On UE Power Saving for RRM Measurement; Agenda Item:7.2.9.3; Document for: Discussion and Decision;".
"R1-1902054; 3GPP TSG RAN WG1 #96; Athens, Greece, Feb. 25-Mar. 1, 2019; Agenda Item:7.2.9.3; Source: LG Electronics ; Title: Discussion on UE power consumption reduction in RRM measurements; Document for:Discussion and decision;".
"R1-1902319 UE power consumption reduction in RRM measurement; 3GPP TSG RAN WG1 Meeting #96 ; Athens, GR, Feb. 25-Mar. 1, 2019; ; Agenda Item:7.2.9.3; Source:Samsung; Title:UE power consumption reduction in RRM measurement;".
"R1-1902341; 3GPP TSG RAN WG1 #96; Athens, Greece, Feb. 25-Mar. 1, 2019; ; Source: CMCC; Title:Discussion on power saving in intra-band RRM measurements; Agenda item:7.2.9.3;".
"R1-1902509; 3GPP TSG-RAN WG1 #96; Athens, Greece, Feb. 25-Mar. 1, 2019; ; Source: Intel Corporation; Title: On RRM aspects of NR UE power saving; Agenda item:7.2.9.3;".
"R1-1902936 RRM aspects of NR UE power saving; 3GPP TSG-RAN WG1 Meeting #96Tdoc ; Athens, Greece, Feb. 25-Mar. 1, 2019; ; Agenda Item:7.2.9.3; Source:Ericsson; Title:RRM aspects of NR UE power saving ;".
"R1-1903017 UE Power Consumption Reduction in RRM Measurements; 3GPP TSG-RAN WG1 Meeting #96 ; Athens, Greece, Feb. 25-Mar. 1, 2019; ; Agenda item:7.2.9.3; Source: Qualcomm Incorporated; Title: UE Power Consumption Reduction in RRM Measurements;".
"R1-1903136; 3GPP TSG RAN WG1 #96; Athens, Greece, Feb. 25-Mar. 1, 2019; ; Agenda item:7.2.9.3; Source:Nokia, Nokia Shanghai Bell; Title:UE Power Consumption Reduction in RRM Measurements;".
"R1-1903236_Discussion on UE power Consumption Reduction in RRM Measurements_rev_final; 3GPP TSG RAN WG1 #96; Athens, Greece, Feb. 25-Mar. 1, 2019; ; Source:NTT DOCOMO, Inc.; Title:Discussion on UE power Consumption Reduction in RRM Measurements; Agenda Item:7.2.9.3;".

* cited by examiner

CONDITIONAL RADIO RESOURCE MANAGEMENT MEASUREMENTS

CROSS-REFERENCE TO RELATED APPLICATIONS

This application claims the benefit of U.S. Provisional Application No. 62/844,679, filed May 7, 2019, which is hereby incorporated by reference in its entirety.

BRIEF DESCRIPTION OF THE SEVERAL VIEWS OF THE DRAWINGS

Examples of several of the various embodiments of the present disclosure are described herein with reference to the drawings.

DETAILED DESCRIPTION OF EMBODIMENTS

Figure 1:
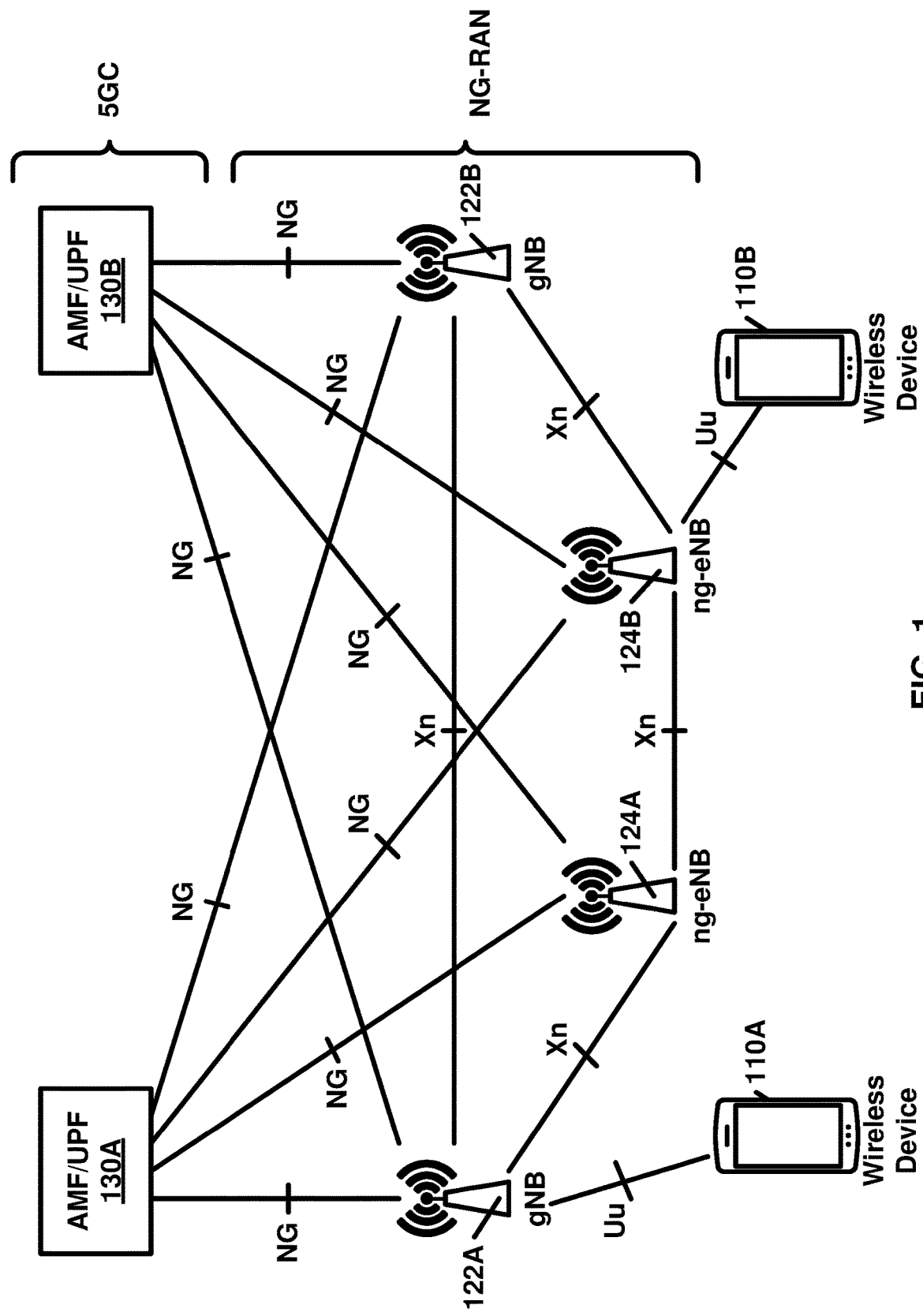
FIG. 1 is a diagram of an example RAN architecture as per an aspect of an embodiment of the present disclosure.

Example embodiments of the present disclosure enable operation of radio resource management (RRM). Embodiments of the technology disclosed herein may be employed in the technical field of multicarrier communication systems. More particularly, the embodiments of the technology disclosed herein may relate to reduced RRM measurements of a wireless device by a base station configuration in multi-carrier communication systems.

The following Acronyms are used throughout the present disclosure:

3GPP 3rd Generation Partnership Project
5GC 5G Core Network
ACK Acknowledgement
AMF Access and Mobility Management Function
ARQ Automatic Repeat Request
AS Access Stratum
ASIC Application-Specific Integrated Circuit
BA Bandwidth Adaptation
BCCH Broadcast Control Channel
BCH Broadcast Channel
BPSK Binary Phase Shift Keying
BWP Bandwidth Part
CA Carrier Aggregation
CC Component Carrier
CCCH Common Control CHannel
CDMA Code Division Multiple Access
CN Core Network
CP Cyclic Prefix
CP-OFDM Cyclic Prefix-Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CSS Common Search Space
CU Central Unit
DC Dual Connectivity
DCCH Dedicated Control CHannel
DCI Downlink Control Information
DL Downlink
DL-SCH Downlink Shared CHannel DM-RS DeModulation Reference Signal
DRB Data Radio Bearer
DRX Discontinuous Reception
DTCH Dedicated Traffic CHannel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCID Logical Channel IDentifier
LTE Long Term Evolution
MAC Media Access Control
MCG Master Cell Group
MCS Modulation and Coding Scheme
MeNB Master evolved Node B
MIB Master Information Block
MME Mobility Management Entity
MN Master Node
NACK Negative Acknowledgement
NAS Non-Access Stratum
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM Orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
sPCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QFI Quality of Service Indicator
QoS Quality of Service
QPSK Quadrature Phase Shift Keying
RA Random Access
RACH Random Access CHannel
RAN Radio Access Network
RAT Radio Access Technology
RA-RNTI Random Access-Radio Network Temporary Identifier
RB Resource Blocks
RBG Resource Block Groups
RI Rank Indicator
RLC Radio Link Control
RRC Radio Resource Control
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SMF Session Management Function
SN Secondary Node
SpCell Special Cell
SRB Signaling Radio Bearer
SRS Sounding Reference Signal
SS Synchronization Signal
SSS Secondary Synchronization Signal
sTAG secondary Timing Advance Group
TA Timing Advance
TAG Timing Advance Group
TAI Tracking Area Identifier
TAT Time Alignment Timer
TB Transport Block
TC-RNTI Temporary Cell-Radio Network Temporary Identifier
TDD Time Division Duplex
TDMA Time Division Multiple Access
TTI Transmission Time Interval
UCI Uplink Control Information
UE User Equipment
UL Uplink
UL-SCH Uplink Shared CHannel
UPF User Plane Function
UPGW User Plane Gateway
VHDL VHSIC Hardware Description Language
Xn-C Xn-Control plane
Xn-U Xn-User plane Example embodiments of the disclosure may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is an example Radio Access Network (RAN) architecture as per an aspect of an embodiment of the present disclosure. As illustrated in this example, a RAN node may be a next generation Node B (gNB) (e.g. 120A, 120B) providing New Radio (NR) user plane and control plane protocol terminations towards a first wireless device (e.g. 110A). In an example, a RAN node may be a next generation evolved Node B (ng-eNB) (e.g. 124A, 124B), providing Evolved UMTS Terrestrial Radio Access (E-UTRA) user plane and control plane protocol terminations towards a second wireless device (e.g. 110B). The first wireless device may communicate with a base station over a Uu interface. The second wireless device may communicate with a ng-eNB over a Uu interface. In this disclosure, wireless device 110A and 110B are structurally similar to wireless device 110. Base stations 120A and/or 120B may be structurally similarly to base station 120. Base station 120 may comprise at least one of a base station (e.g. 122A and/or 122B), ng-eNB (e.g. 124A and/or 124B), and or the like.

A base station or an ng-eNB may host functions such as: radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of UEs in RRC_INACTIVE state, distribution function for Non-Access Stratum (NAS) messages, RAN sharing, and dual connectivity or tight interworking between NR and E-UTRA.

In an example, one or more gNBs and/or one or more ng-eNBs may be interconnected with each other by means of Xn interface. A base station or an ng-eNB may be connected by means of NG interfaces to 5G Core Network (5GC). In an example, 5GC may comprise one or more AMF/User Plan Function (UPF) functions (e.g. 130A or 130B). A base station or an ng-eNB may be connected to a UPF by means of an NG-User plane (NG-U) interface. The NG-U interface may provide delivery (e.g. non-guaranteed delivery) of user plane Protocol Data Units (PDUs) between a RAN node and the UPF. A base station or an ng-eNB may be connected to an AMF by means of an NG-Control plane (NG-C) interface. The NG-C interface may provide, for example, NG interface management, UE context management, UE mobility management, transport of NAS messages, paging, PDU session management, configuration transfer and/or warning message transmission, combinations thereof, and/or the like.

In an example, a UPF may host functions such as anchor point for intra-/inter-Radio Access Technology (RAT) mobility (when applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

In an example, an AMF may host functions such as NAS signaling termination, NAS signaling security, Access Stratum (AS) security control, inter Core Network (CN) node signaling for mobility between $3^{rd}$ Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection.

Figure 2A:
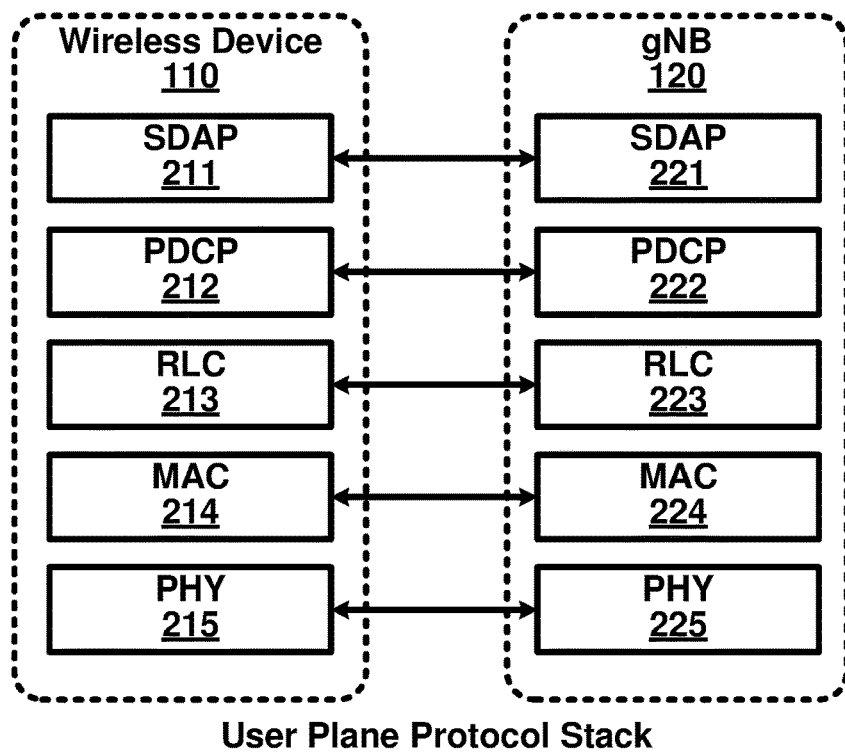
FIG. 2A is a diagram of an example user plane protocol stack as per an aspect of an embodiment of the present disclosure.

FIG. 2A is an example user plane protocol stack, where Service Data Adaptation Protocol (SDAP) (e.g. 211 and 221), Packet Data Convergence Protocol (PDCP) (e.g. 212 and 222), Radio Link Control (RLC) (e.g. 213 and 223) and Media Access Control (MAC) (e.g. 214 and 224) sublayers and Physical (PHY) (e.g. 215 and 225) layer may be terminated in wireless device (e.g. 110) and base station (e.g. 120) on the network side. In an example, a PHY layer provides transport services to higher layers (e.g. MAC, RRC, etc.). In an example, services and functions of a MAC sublayer may comprise mapping between logical channels and transport channels, multiplexing/demultiplexing of MAC Service Data Units (SDUs) belonging to one or different logical channels into/from Transport Blocks (TB s) delivered to/from the PHY layer, scheduling information reporting, error correction through Hybrid Automatic Repeat request (HARQ) (e.g. one HARQ entity per carrier in case of Carrier Aggregation (CA)), priority handling between UEs by means of dynamic scheduling, priority handling between logical channels of one UE by means of logical channel prioritization, and/or padding. A MAC entity may support one or multiple numerologies and/or transmission timings. In an example, mapping restrictions in a logical channel prioritization may control which numerology and/or transmission timing a logical channel may use. In an example, an RLC sublayer may supports transparent mode (TM), unacknowledged mode (UM) and acknowledged mode (AM) transmission modes. The RLC configuration may be per logical channel with no dependency on numerologies and/or Transmission Time Interval (TTI) durations. In an example, Automatic Repeat Request (ARQ) may operate on any of the numerologies and/or TTI durations the logical channel is configured with. In an example, services and functions of the PDCP layer for the user plane may comprise sequence numbering, header compression and decompression, transfer of user data, reordering and duplicate detection, PDCP PDU routing (e.g. in case of split bearers), retransmission of PDCP SDUs, ciphering, deciphering and integrity protection, PDCP SDU discard, PDCP re-establishment and data recovery for RLC AM, and/or duplication of PDCP PDUs. In an example, services and functions of SDAP may comprise mapping between a QoS flow and a data radio bearer. In an example, services and functions of SDAP may comprise mapping Quality of Service Indicator (QFI) in DL and UL packets. In an example, a protocol entity of SDAP may be configured for an individual PDU session.

Figure 2B:
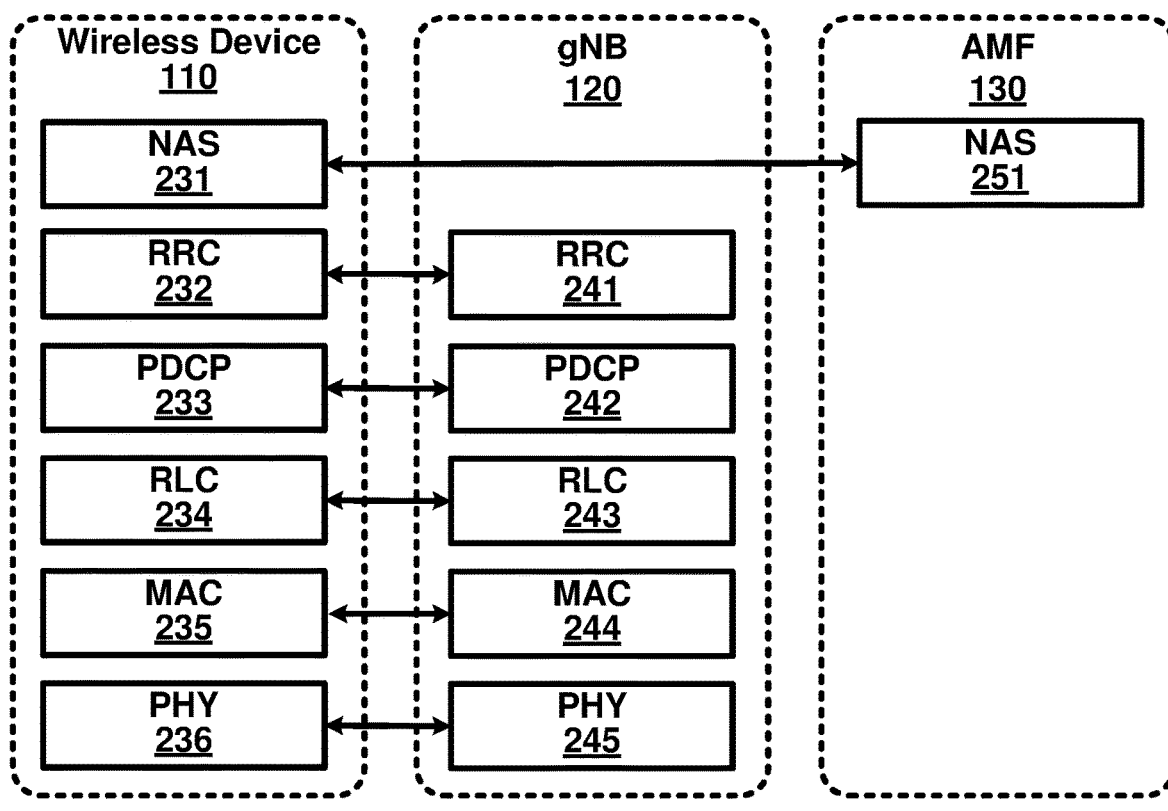
FIG. 2B is a diagram of an example control plane protocol stack as per an aspect of an embodiment of the present disclosure.

FIG. 2B is an example control plane protocol stack where PDCP (e.g. 233 and 242), RLC (e.g. 234 and 243) and MAC (e.g. 235 and 244) sublayers and PHY (e.g. 236 and 245)

layer may be terminated in wireless device (e.g. 110) and base station (e.g. 120) on a network side and perform service and functions described above. In an example, RRC (e.g. 232 and 241) may be terminated in a wireless device and a base station on a network side. In an example, services and functions of RRC may comprise broadcast of system information related to AS and NAS, paging initiated by 5GC or RAN, establishment, maintenance and release of an RRC connection between the UE and RAN, security functions including key management, establishment, configuration, maintenance and release of Signaling Radio Bearers (SRBs) and Data Radio Bearers (DRBs), mobility functions, QoS management functions, UE measurement reporting and control of the reporting, detection of and recovery from radio link failure, and/or NAS message transfer to/from NAS from/to a UE. In an example, NAS control protocol (e.g. 231 and 251) may be terminated in the wireless device and AMF (e.g. 130) on a network side and may perform functions such as authentication, mobility management between a UE and a AMF for 3GPP access and non-3GPP access, and session management between a UE and a SMF for 3GPP access and non-3GPP access.

In an example, a base station may configure a plurality of logical channels for a wireless device. A logical channel in the plurality of logical channels may correspond to a radio bearer and the radio bearer may be associated with a QoS requirement. In an example, a base station may configure a logical channel to be mapped to one or more TTIs/numerologies in a plurality of TTIs/numerologies. The wireless device may receive a Downlink Control Information (DCI) via Physical Downlink Control CHannel (PDCCH) indicating an uplink grant. In an example, the uplink grant may be for a first TTI/numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or one or more MAC Control Elements (CEs). The one or more first logical channels may be mapped to the first TTI/numerology. The MAC layer at the wireless device may multiplex one or more MAC CEs and/or one or more MAC SDUs (e.g., logical channel) in a MAC PDU (e.g., transport block). In an example, the MAC PDU may comprise a MAC header comprising a plurality of MAC sub-headers. A MAC sub-header in the plurality of MAC sub-headers may correspond to a MAC CE or a MAC SUD (logical channel) in the one or more MAC CEs and/or one or more MAC SDUs. In an example, a MAC CE or a logical channel may be configured with a Logical Channel IDentifier (LCID). In an example, LCID for a logical channel or a MAC CE may be fixed/pre-configured. In an example, LCID for a logical channel or MAC CE may be configured for the wireless device by the base station. The MAC sub-header corresponding to a MAC CE or a MAC SDU may comprise LCID associated with the MAC CE or the MAC SDU.

In an example, a base station may activate and/or deactivate and/or impact one or more processes (e.g., set values of one or more parameters of the one or more processes or start and/or stop one or more timers of the one or more processes) at the wireless device by employing one or more MAC commands. The one or more MAC commands may comprise one or more MAC control elements. In an example, the one or more processes may comprise activation and/or deactivation of PDCP packet duplication for one or more radio bearers. The base station may transmit a MAC CE comprising one or more fields, the values of the fields indicating activation and/or deactivation of PDCP duplication for the one or more radio bearers. In an example, the one or more processes may comprise Channel State Information (CSI) transmission of on one or more cells. The base station may transmit one or more MAC CEs indicating activation and/or deactivation of the CSI transmission on the one or more cells. In an example, the one or more processes may comprise activation or deactivation of one or more secondary cells. In an example, the base station may transmit a MA CE indicating activation or deactivation of one or more secondary cells. In an example, the base station may transmit one or more MAC CEs indicating starting and/or stopping one or more Discontinuous Reception (DRX) timers at the wireless device. In an example, the base station may transmit one or more MAC CEs indicating one or more timing advance values for one or more Timing Advance Groups (TAGs).

Figure 3:
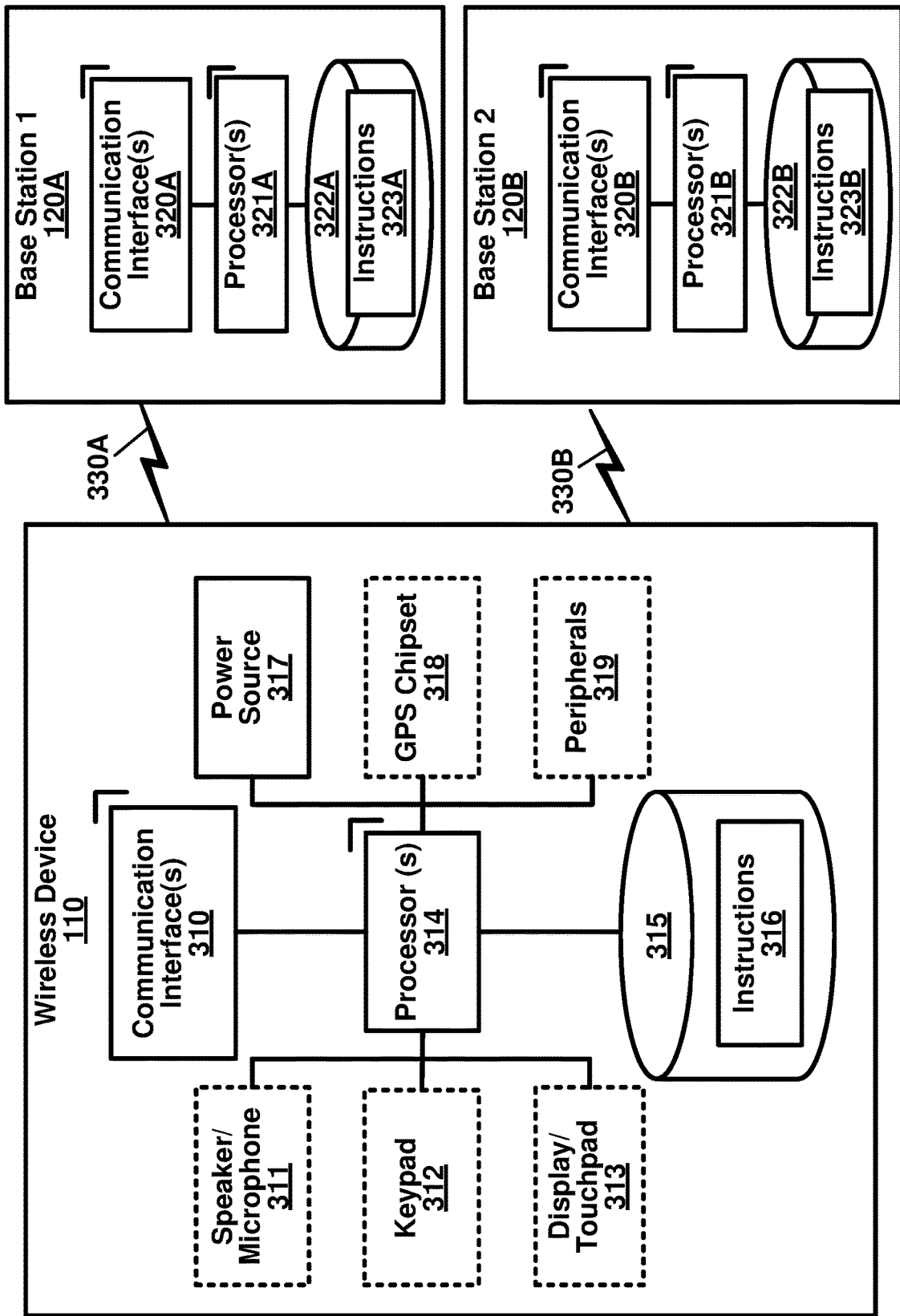
FIG. 3 is a diagram of an example wireless device and two base stations as per an aspect of an embodiment of the present disclosure.

FIG. 3 is a block diagram of base stations (base station 1, 120A, and base station 2, 120B) and a wireless device 110. A wireless device may be called an UE. A base station may be called a NB, eNB, gNB, and/or ng-eNB. In an example, a wireless device and/or a base station may act as a relay node. The base station 1, 120A, may comprise at least one communication interface 320A (e.g. a wireless modem, an antenna, a wired modem, and/or the like), at least one processor 321A, and at least one set of program code instructions 323A stored in non-transitory memory 322A and executable by the at least one processor 321A. The base station 2, 120B, may comprise at least one communication interface 320B, at least one processor 321B, and at least one set of program code instructions 323B stored in non-transitory memory 322B and executable by the at least one processor 321B.

A base station may comprise many sectors for example: 1, 2, 3, 4, or 6 sectors. A base station may comprise many cells, for example, ranging from 1 to 50 cells or more. A cell may be categorized, for example, as a primary cell or secondary cell. At Radio Resource Control (RRC) connection establishment/re-establishment/handover, one serving cell may provide the NAS (non-access stratum) mobility information (e.g. Tracking Area Identifier (TAI)). At RRC connection re-establishment/handover, one serving cell may provide the security input. This cell may be referred to as the Primary Cell (PCell). In the downlink, a carrier corresponding to the PCell may be a DL Primary Component Carrier (PCC), while in the uplink, a carrier may be an UL PCC. Depending on wireless device capabilities, Secondary Cells (SCells) may be configured to form together with a PCell a set of serving cells. In a downlink, a carrier corresponding to an SCell may be a downlink secondary component carrier (DL SCC), while in an uplink, a carrier may be an uplink secondary component carrier (UL SCC). An SCell may or may not have an uplink carrier.

A cell, comprising a downlink carrier and optionally an uplink carrier, may be assigned a physical cell ID and a cell index. A carrier (downlink or uplink) may belong to one cell. The cell ID or cell index may also identify the downlink carrier or uplink carrier of the cell (depending on the context it is used). In the disclosure, a cell ID may be equally referred to a carrier ID, and a cell index may be referred to a carrier index. In an implementation, a physical cell ID or a cell index may be assigned to a cell. A cell ID may be determined using a synchronization signal transmitted on a downlink carrier. A cell index may be determined using RRC messages. For example, when the disclosure refers to a first physical cell ID for a first downlink carrier, the disclosure may mean the first physical cell ID is for a cell comprising the first downlink carrier. The same concept may apply to, for example, carrier activation. When the disclosure indicates that a first carrier is activated, the specification may equally mean that a cell comprising the first carrier is activated.

A base station may transmit to a wireless device one or more messages (e.g. RRC messages) comprising a plurality of configuration parameters for one or more cells. One or more cells may comprise at least one primary cell and at least one secondary cell. In an example, an RRC message may be broadcasted or unicasted to the wireless device. In an example, configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). Another SI may be transmitted via SystemInformationBlockType2. For a wireless device in an RRC_Connected state, dedicated RRC signaling may be employed for the request and delivery of the other SI. For the wireless device in the RRC_Idle state and/or the RRC_Inactive state, the request may trigger a random-access procedure.

A wireless device may report its radio access capability information which may be static. A base station may request what capabilities for a wireless device to report based on band information. When allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., static capabilities may be stored in 5GC).

When CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. When adding a new SCell, dedicated RRC signaling may be employed to send all required system information of the SCell i.e. while in connected mode, wireless devices may not need to acquire broadcasted system information directly from the SCells.

The purpose of an RRC connection reconfiguration procedure may be to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be to establish (or reestablish, resume) an RRC connection. an RRC connection establishment procedure may comprise SRB1 establishment. The RRC connection establishment procedure may be used to transfer the initial NAS dedicated information/message from a wireless device to E-UTRAN. The RRCConnectionReestablishment message may be used to re-establish SRB1.

A measurement report procedure may be to transfer measurement results from a wireless device to NG-RAN. The wireless device may initiate a measurement report procedure after successful security activation. A measurement report message may be employed to transmit measurement results.

The wireless device 110 may comprise at least one communication interface 310 (e.g. a wireless modem, an antenna, and/or the like), at least one processor 314, and at least one set of program code instructions 316 stored in non-transitory memory 315 and executable by the at least one processor 314. The wireless device 110 may further comprise at least one of at least one speaker/microphone 311, at least one keypad 312, at least one display/touchpad 313, at least one power source 317, at least one global positioning system (GPS) chipset 318, and other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and the like. The processor 314 of the wireless device 110, the processor 321A in base station 1 120A, and/or the processor 321B in base station 2 120B may perform at least one of signal coding/processing, data processing, power control, input/output processing, and/or any other functionality that may enable the wireless device 110, the base station 1 120A and/or the base station 2 120B to operate in a wireless environment.

The processor 314 of the wireless device 110 may be connected to the speaker/microphone 311, the keypad 312, and/or the display/touchpad 313. The processor 314 may receive user input data from and/or provide user output data to the speaker/microphone 311, the keypad 312, and/or the display/touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and the like. The processor 314 may be connected to the GPS chipset 318. The GPS chipset 318 may be configured to provide geographic location information of the wireless device 110.

The processor 314 of the wireless device 110 may further be connected to other peripherals 319, which may comprise one or more software and/or hardware modules that provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and the like.

The communication interface 320A of the base station 1, 120A, and/or the communication interface 320B of the base station 2, 120B, may be configured to communicate with the communication interface 310 of the wireless device 110 via a wireless link 330A and/or a wireless link 330B respectively. In an example, the communication interface 320A of the base station 1, 120A, may communicate with the communication interface 320B of the base station 2 and other RAN and core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110 and/or the base station 2 120B and the wireless device 110 may be configured to send and receive transport blocks via the wireless link 330A and/or via the wireless link 330B, respectively. The wireless link 330A and/or the wireless link 330B may employ at least one frequency carrier. According to some of various aspects of embodiments, transceiver(s) may be employed. A transceiver may be a device that comprises both a transmitter and a receiver. Transceivers may be employed in devices such as wireless devices, base stations, relay nodes, and/or the like. Example embodiments for radio technology implemented in the communication interface 310, 320A, 320B and the wireless link 330A, 330B are illustrated in FIG. 4A, FIG. 4B, FIG. 4C, FIG. 4D, FIG. 6, FIG. 7A, FIG. 7B, FIG. 8, and associated text.

In an example, other nodes in a wireless network (e.g. AMF, UPF, SMF, etc.) may comprise one or more communication interfaces, one or more processors, and memory storing instructions.

A node (e.g. wireless device, base station, AMF, SMF, UPF, servers, switches, antennas, and/or the like) may comprise one or more processors, and memory storing instructions that when executed by the one or more processors causes the node to perform certain processes and/or functions. Example embodiments may enable operation of single-carrier and/or multi-carrier communications. Other example embodiments may comprise a non-transitory tangible computer readable media comprising instructions executable by one or more processors to cause operation of single-carrier and/or multi-carrier communications. Yet other example embodiments may comprise an article of manufacture that comprises a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and code stored in and/or in communication with a memory device to implement connections, electronic device operations, protocol(s), protocol layers, communication drivers, device drivers, hardware operations, combinations thereof, and/or the like.

Figure 4A:
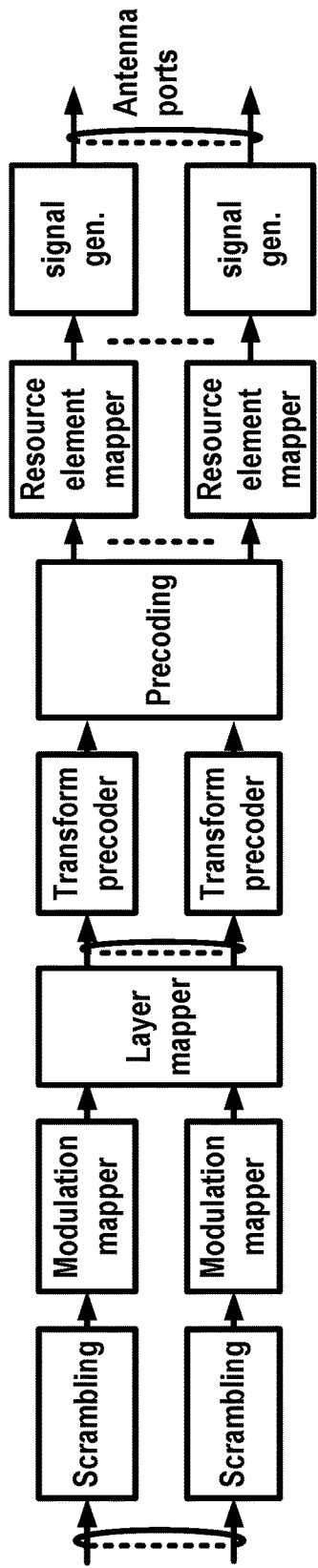
FIG. 4A, FIG. 4B, FIG. 4C and FIG. 4D are example diagrams for uplink and downlink signal transmission as per an aspect of an embodiment of the present disclosure.

FIG. 4A, FIG. 4B, FIG. 4C and FIG. 4D are example diagrams for uplink and downlink signal transmission as per an aspect of an embodiment of the present disclosure. FIG. 4A shows an example uplink transmitter for at least one physical channel. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 4A. These functions are illustrated as examples and it is anticipated that other mechanisms may be implemented in various embodiments.

Figure 4B:
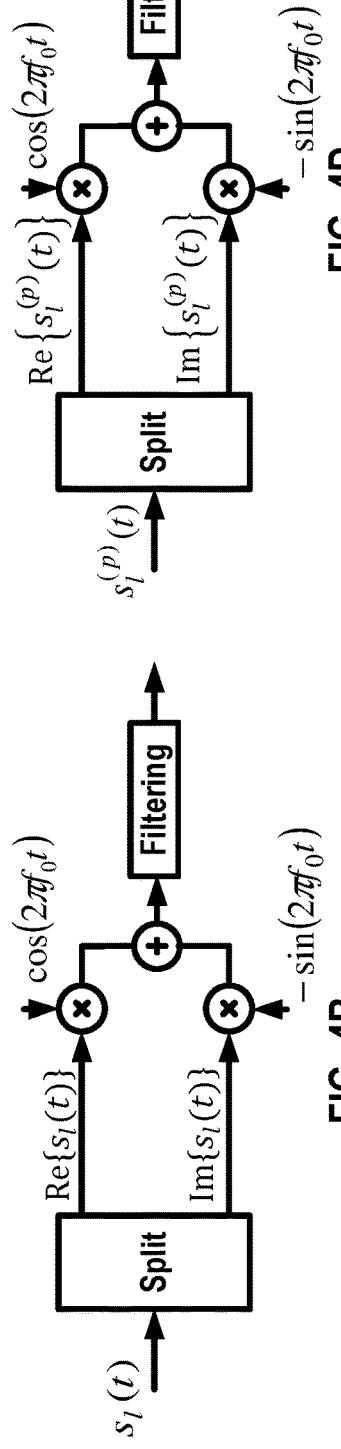

An example structure for modulation and up-conversion to the carrier frequency of the complex-valued SC-FDMA or CP-OFDM baseband signal for an antenna port and/or the complex-valued Physical Random Access CHannel (PRACH) baseband signal is shown in FIG. 4B. Filtering may be employed prior to transmission.

Figure 4D:
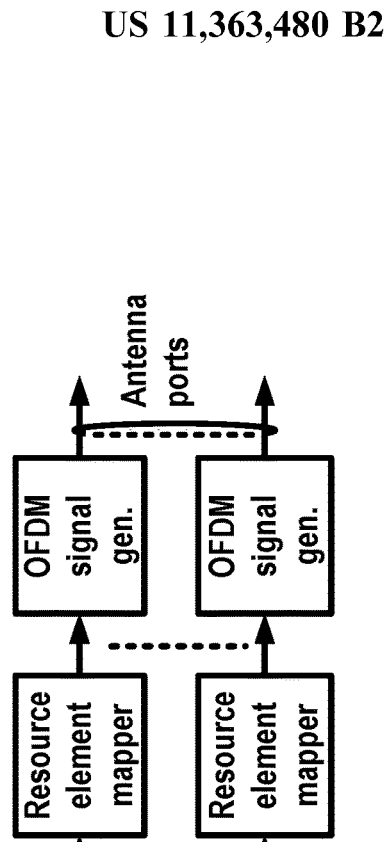
Figure 4C:
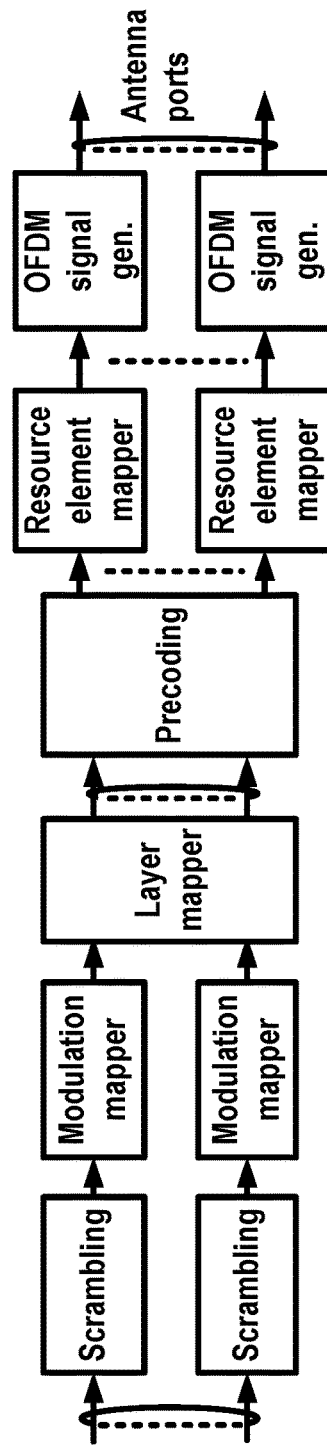

An example structure for downlink transmissions is shown in FIG. 4C. The baseband signal representing a downlink physical channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

In an example, a base station may transmit a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. In an example, a first antenna port and a second antenna port may be quasi co-located if one or more large-scale properties of the channel over which a first symbol on the first antenna port is conveyed may be inferred from the channel over which a second symbol on a second antenna port is conveyed. The one or more large-scale properties may comprise at least one of: delay spread; doppler spread; doppler shift; average gain; average delay; and/or spatial Receiving (Rx) parameters.

An example modulation and up-conversion to the carrier frequency of the complex-valued OFDM baseband signal for an antenna port is shown in FIG. 4D. Filtering may be employed prior to transmission.

Figure 5A:
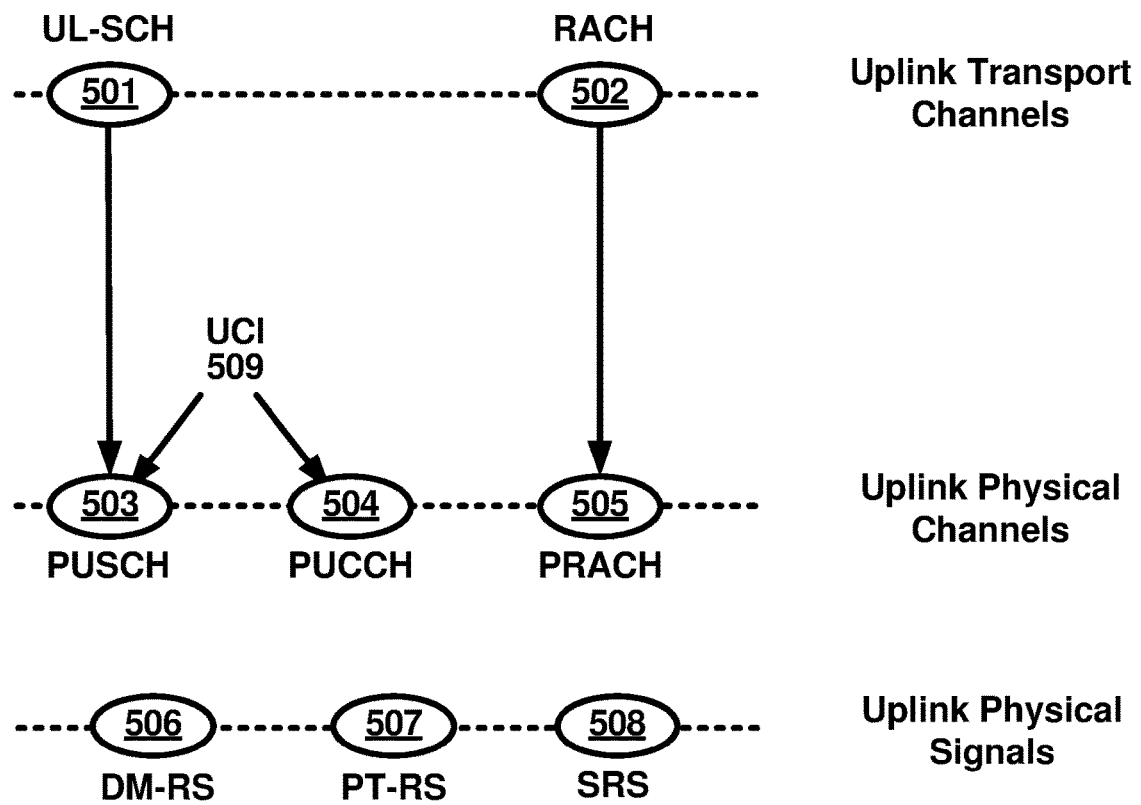
FIG. 5A is a diagram of an example uplink channel mapping and example uplink physical signals as per an aspect of an embodiment of the present disclosure.
Figure 5B:
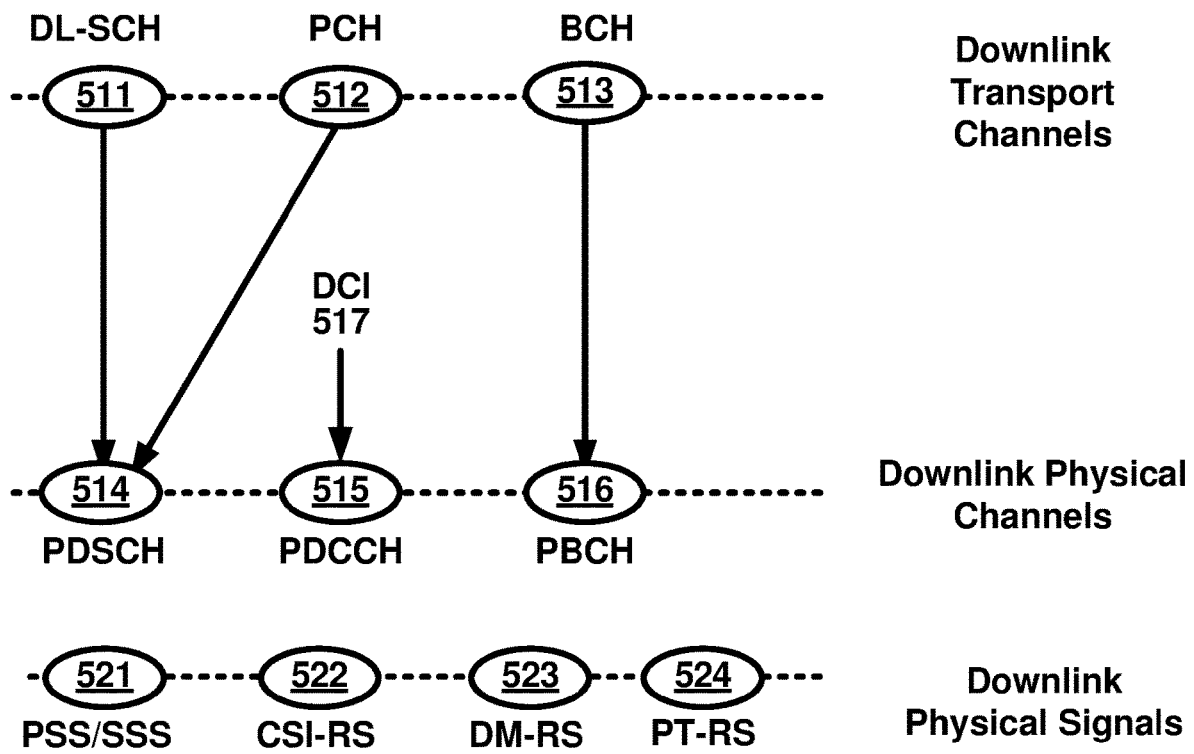
FIG. 5B is a diagram of an example downlink channel mapping and example downlink physical signals as per an aspect of an embodiment of the present disclosure.

FIG. 5A is a diagram of an example uplink channel mapping and example uplink physical signals. FIG. 5B is a diagram of an example downlink channel mapping and a downlink physical signals. In an example, a physical layer may provide one or more information transfer services to a MAC and/or one or more higher layers. For example, the physical layer may provide the one or more information transfer services to the MAC via one or more transport channels. An information transfer service may indicate how and with what characteristics data are transferred over the radio interface.

In an example embodiment, a radio network may comprise one or more downlink and/or uplink transport channels. For example, a diagram in FIG. 5A shows example uplink transport channels comprising Uplink-Shared CHannel (UL-SCH) 501 and Random Access CHannel (RACH) 502. A diagram in FIG. 5B shows example downlink transport channels comprising Downlink-Shared CHannel (DL-SCH) 511, Paging CHannel (PCH) 512, and Broadcast CHannel (BCH) 513. A transport channel may be mapped to one or more corresponding physical channels. For example, UL-SCH 501 may be mapped to Physical Uplink Shared CHannel (PUSCH) 503. RACH 502 may be mapped to PRACH 505. DL-SCH 511 and PCH 512 may be mapped to Physical Downlink Shared CHannel (PDSCH) 514. BCH 513 may be mapped to Physical Broadcast CHannel (PBCH) 516.

There may be one or more physical channels without a corresponding transport channel. The one or more physical channels may be employed for Uplink Control Information (UCI) 509 and/or Downlink Control Information (DCI) 517. For example, Physical Uplink Control CHannel (PUCCH) 504 may carry UCI 509 from a UE to a base station. For example, Physical Downlink Control CHannel (PDCCH) 515 may carry DCI 517 from a base station to a UE. NR may support UCI 509 multiplexing in PUSCH 503 when UCI 509 and PUSCH 503 transmissions may coincide in a slot at least in part. The UCI 509 may comprise at least one of CSI, Acknowledgement (ACK)/Negative Acknowledgement (NACK), and/or scheduling request. The DCI 517 on PDCCH 515 may indicate at least one of following: one or more downlink assignments and/or one or more uplink scheduling grants In uplink, a UE may transmit one or more Reference Signals (RSs) to a base station. For example, the one or more RSs may be at least one of Demodulation-RS (DM-RS) 506, Phase Tracking-RS (PT-RS) 507, and/or Sounding RS (SRS) 508. In downlink, a base station may transmit (e.g., unicast, multicast, and/or broadcast) one or more RSs to a UE. For example, the one or more RSs may be at least one of Primary Synchronization Signal (PSS)/Secondary Synchronization Signal (SSS) 521, CSI-RS 522, DM-RS 523, and/or PT-RS 524.

In an example, a UE may transmit one or more uplink DM-RSs 506 to a base station for channel estimation, for example, for coherent demodulation of one or more uplink physical channels (e.g., PUSCH 503 and/or PUCCH 504). For example, a UE may transmit a base station at least one uplink DM-RS 506 with PUSCH 503 and/or PUCCH 504, wherein the at least one uplink DM-RS 506 may be spanning a same frequency range as a corresponding physical channel. In an example, a base station may configure a UE with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to transmit at one or more symbols of a PUSCH and/or PUCCH. A base station may semi-statistically configure a UE with a maximum number of front-loaded DM-RS symbols for PUSCH and/or PUCCH. For example, a UE may schedule a single-symbol DM-RS and/or double symbol DM-RS based on a maximum number of front-loaded DM-RS symbols, wherein a base station may configure the UE with one or more additional uplink DM-RS for PUSCH and/or PUCCH. A new radio network may support, e.g., at least for CP-OFDM, a common DM-RS structure for DL and UL, wherein a DM-RS location, DM-RS pattern, and/or scrambling sequence may be same or different.

In an example, whether uplink PT-RS 507 is present or not may depend on a RRC configuration. For example, a presence of uplink PT-RS may be UE-specifically configured. For example, a presence and/or a pattern of uplink PT-RS 507 in a scheduled resource may be UE-specifically configured by a combination of RRC signaling and/or association with one or more parameters employed for other purposes (e.g., Modulation and Coding Scheme (MCS)) which may be indicated by DCI. When configured, a dynamic presence of uplink PT-RS 507 may be associated with one or more DCI parameters comprising at least MCS. A radio network may support plurality of uplink PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, uplink PT-RS 507 may be confined in the scheduled time/frequency duration for a UE.

In an example, a UE may transmit SRS 508 to a base station for channel state estimation to support uplink channel dependent scheduling and/or link adaptation. For example, SRS 508 transmitted by a UE may allow for a base station to estimate an uplink channel state at one or more different frequencies. A base station scheduler may employ an uplink channel state to assign one or more resource blocks of good quality for an uplink PUSCH transmission from a UE. A base station may semi-statistically configure a UE with one or more SRS resource sets. For an SRS resource set, a base station may configure a UE with one or more SRS resources. An SRS resource set applicability may be configured by a higher layer (e.g., RRC) parameter. For example, when a higher layer parameter indicates beam management, a SRS resource in each of one or more SRS resource sets may be transmitted at a time instant. A UE may transmit one or more SRS resources in different SRS resource sets simultaneously. A new radio network may support aperiodic, periodic and/or semi-persistent SRS transmissions. A UE may transmit SRS resources based on one or more trigger types, wherein the one or more trigger types may comprise higher layer signaling (e.g., RRC) and/or one or more DCI formats (e.g., at least one DCI format may be employed for a UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH 503 and SRS 508 are transmitted in a same slot, a UE may be configured to transmit SRS 508 after a transmission of PUSCH 503 and corresponding uplink DM-RS 506.

In an example, a base station may semi-statistically configure a UE with one or more SRS configuration parameters indicating at least one of following: a SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, a SRS bandwidth, a frequency hopping bandwidth, a cyclic shift, and/or a SRS sequence ID.

In an example, in a time domain, an SS/PBCH block may comprise one or more OFDM symbols (e.g., 4 OFDM symbols numbered in increasing order from 0 to 3) within the SS/PBCH block. An SS/PBCH block may comprise PSS/SSS 521 and PBCH 516. In an example, in the frequency domain, an SS/PBCH block may comprise one or more contiguous subcarriers (e.g., 240 contiguous subcarriers with the subcarriers numbered in increasing order from 0 to 239) within the SS/PBCH block. For example, a PSS/SSS 521 may occupy 1 OFDM symbol and 127 subcarriers. For example, PBCH 516 may span across 3 OFDM symbols and 240 subcarriers. A UE may assume that one or more SS/PBCH blocks transmitted with a same block index may be quasi co-located, e.g., with respect to Doppler spread, Doppler shift, average gain, average delay, and spatial Rx parameters. A UE may not assume quasi co-location for other SS/PBCH block transmissions. A periodicity of an SS/PBCH block may be configured by a radio network (e.g., by an RRC signaling) and one or more time locations where the SS/PBCH block may be sent may be determined by sub-carrier spacing. In an example, a UE may assume a band-specific sub-carrier spacing for an SS/PBCH block unless a radio network has configured a UE to assume a different sub-carrier spacing.

In an example, downlink CSI-RS 522 may be employed for a UE to acquire channel state information. A radio network may support periodic, aperiodic, and/or semi-persistent transmission of downlink CSI-RS 522. For example, a base station may semi-statistically configure and/or reconfigure a UE with periodic transmission of downlink CSI-RS 522. A configured CSI-RS resources may be activated ad/or deactivated. For semi-persistent transmission, an activation and/or deactivation of CSI-RS resource may be triggered dynamically. In an example, CSI-RS configuration may comprise one or more parameters indicating at least a number of antenna ports. For example, a base station may configure a UE with 32 ports. A base station may semi-statistically configure a UE with one or more CSI-RS resource sets. One or more CSI-RS resources may be allocated from one or more CSI-RS resource sets to one or more UEs. For example, a base station may semi-statistically configure one or more parameters indicating CSI RS resource mapping, for example, time-domain location of one or more CSI-RS resources, a bandwidth of a CSI-RS resource, and/or a periodicity. In an example, a UE may be configured to employ a same OFDM symbols for downlink CSI-RS 522 and control resource set (coreset) when the downlink CSI-RS 522 and coreset are spatially quasi co-located and resource elements associated with the downlink CSI-RS 522 are the outside of PRBs configured for coreset. In an example, a UE may be configured to employ a same OFDM symbols for downlink CSI-RS 522 and SSB/PBCH when the downlink CSI-RS 522 and SSB/PBCH are spatially quasi co-located and resource elements associated with the downlink CSI-RS 522 are the outside of PRBs configured for SSB/PBCH.

In an example, a UE may transmit one or more downlink DM-RSs 523 to a base station for channel estimation, for example, for coherent demodulation of one or more downlink physical channels (e.g., PDSCH 514). For example, a radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statistically configure a UE with a maximum number of front-loaded DM-RS symbols for PDSCH 514. For example, a DM-RS configuration may support one or more DM-RS ports. For example, for single user-MIMO, a DM-RS configuration may support at least 8 orthogonal downlink DM-RS ports. For example, for multiuser-MIMO, a DM-RS configuration may support 12 orthogonal downlink DM-RS ports. A radio network may support, e.g., at least for CP-OFDM, a common DM-RS structure for DL and UL, wherein a DM-RS location, DM-RS pattern, and/or scrambling sequence may be same or different.

In an example, whether downlink PT-RS 524 is present or not may depend on a RRC configuration. For example, a presence of downlink PT-RS 524 may be UE-specifically configured. For example, a presence and/or a pattern of downlink PT-RS 524 in a scheduled resource may be UE-specifically configured by a combination of RRC signaling and/or association with one or more parameters employed for other purposes (e.g., MCS) which may be indicated by DCI. When configured, a dynamic presence of downlink PT-RS 524 may be associated with one or more DCI parameters comprising at least MCS. A radio network may support plurality of PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, downlink PT-RS 524 may be confined in the scheduled time/frequency duration for a UE.

Figure 6:
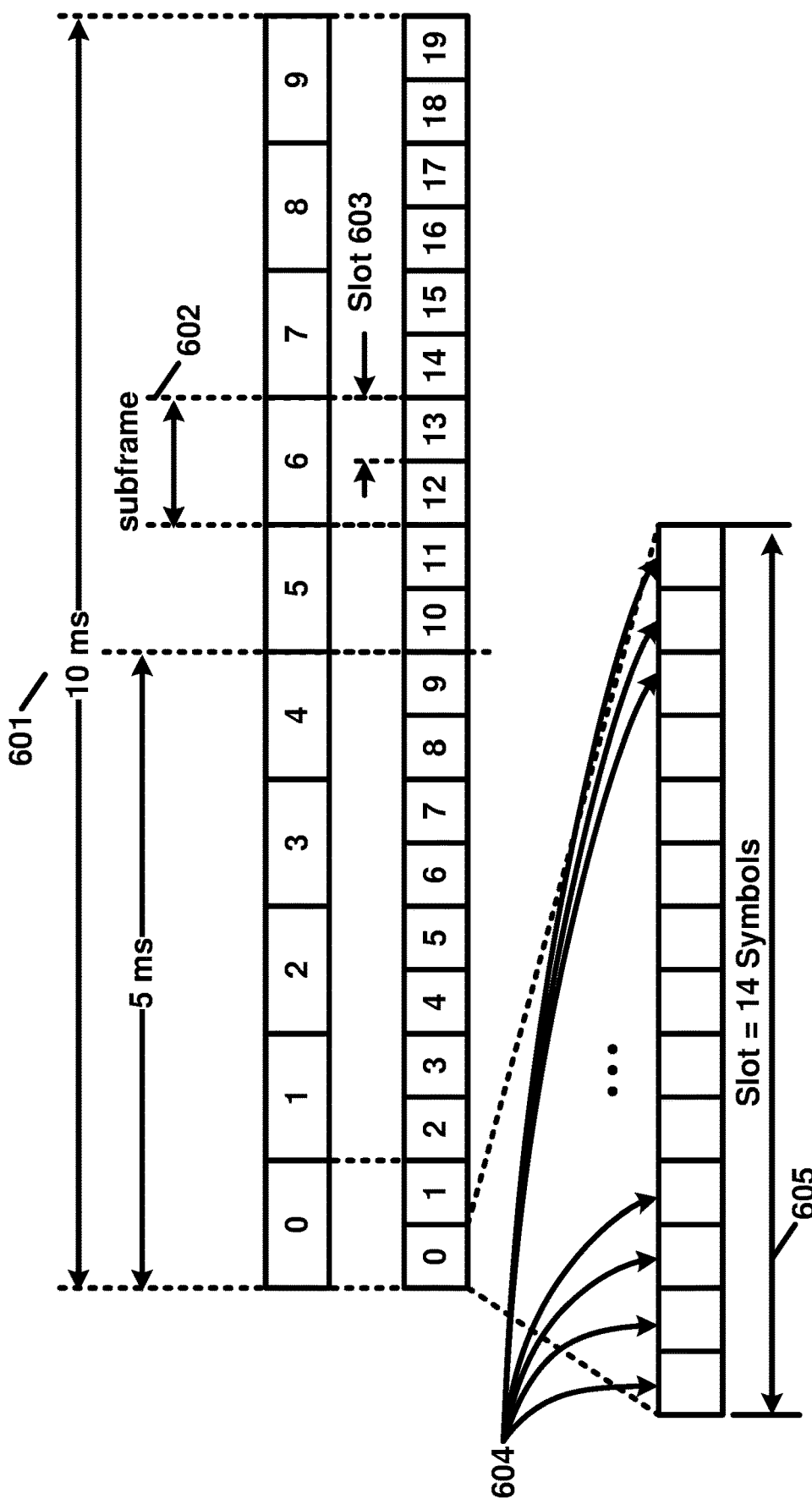
FIG. 6 is a diagram depicting an example frame structure as per an aspect of an embodiment of the present disclosure.

FIG. 6 is a diagram depicting an example frame structure for a carrier as per an aspect of an embodiment of the present disclosure. A multicarrier OFDM communication system may include one or more carriers, for example, ranging from 1 to 32 carriers, in case of carrier aggregation, or ranging from 1 to 64 carriers, in case of dual connectivity. Different radio frame structures may be supported (e.g., for FDD and for TDD duplex mechanisms). FIG. 6 shows an example frame structure. Downlink and uplink transmissions may be organized into radio frames 601. In this example, radio frame duration is 10 ms. In this example, a 10 ms radio frame 601 may be divided into ten equally sized subframes 602 with 1 ms duration. Subframe(s) may comprise one or more slots (e.g. slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Uplink and downlink transmissions may be separated in the frequency domain. Slot(s) may include a plurality of OFDM symbols 604. The number of OFDM symbols 604 in a slot 605 may depend on the cyclic prefix length. For example, a slot may be 14 OFDM symbols for the same subcarrier spacing of up to 480 kHz with normal CP. A slot may be 12 OFDM symbols for the same subcarrier spacing of 60 kHz with extended CP. A slot may contain downlink, uplink, or a downlink part and an uplink part and/or alike.

Figure 7A:
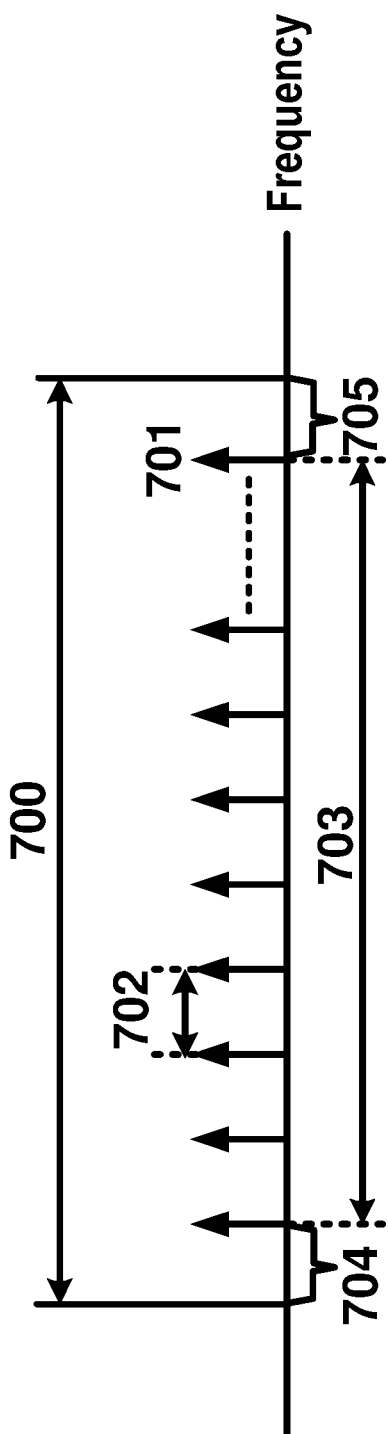
FIG. 7A and FIG. 7B are diagrams depicting example sets of OFDM subcarriers as per an aspect of an embodiment of the present disclosure.

FIG. 7A is a diagram depicting example sets of OFDM subcarriers as per an aspect of an embodiment of the present disclosure. In the example, a base station may communicate with a wireless device with a carrier with an example channel bandwidth 700. Arrow(s) in the diagram may depict a subcarrier in a multicarrier OFDM system. The OFDM system may use technology such as OFDM technology, SC-FDMA technology, and/or the like. In an example, an arrow 701 shows a subcarrier transmitting information symbols. In an example, a subcarrier spacing 702, between two contiguous subcarriers in a carrier, may be any one of 15 KHz, 30 KHz, 60 KHz, 120 KHz, 240 KHz etc. In an example, different subcarrier spacing may correspond to different transmission numerologies. In an example, a transmission numerology may comprise at least: a numerology index; a value of subcarrier spacing; a type of cyclic prefix (CP). In an example, a base station may transmit to/receive from a UE on a number of subcarriers 703 in a carrier. In an example, a bandwidth occupied by a number of subcarriers 703 (transmission bandwidth) may be smaller than the channel bandwidth 700 of a carrier, due to guard band 704 and 705. In an example, a guard band 704 and 705 may be used to reduce interference to and from one or more neighbor carriers. A number of subcarriers (transmission bandwidth) in a carrier may depend on the channel bandwidth of the carrier and the subcarrier spacing. For example, a transmission bandwidth, for a carrier with 20 MHz channel bandwidth and 15 KHz subcarrier spacing, may be in number of 1024 subcarriers.

Figure 7B:
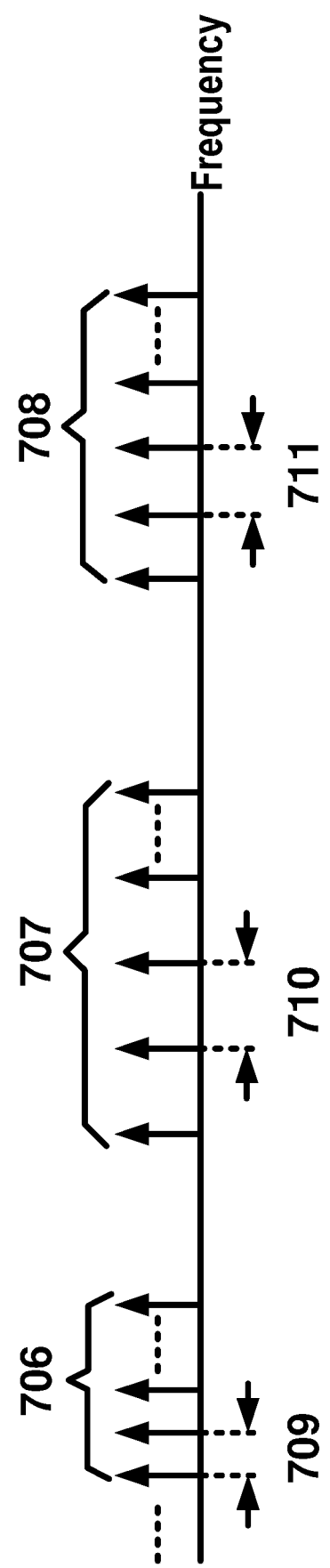

In an example, a base station and a wireless device may communicate with multiple CCs when configured with CA. In an example, different component carriers may have different bandwidth and/or subcarrier spacing, if CA is supported. In an example, a base station may transmit a first type of service to a UE on a first component carrier. The base station may transmit a second type of service to the UE on a second component carrier. Different type of services may have different service requirement (e.g., data rate, latency, reliability), which may be suitable for transmission via different component carrier having different subcarrier spacing and/or bandwidth. FIG. 7B shows an example embodiment. A first component carrier may comprise a first number of subcarriers 706 with a first subcarrier spacing 709. A second component carrier may comprise a second number of subcarriers 707 with a second subcarrier spacing 710. A third component carrier may comprise a third number of subcarriers 708 with a third subcarrier spacing 711. Carriers in a multicarrier OFDM communication system may be contiguous carriers, non-contiguous carriers, or a combination of both contiguous and non-contiguous carriers.

Figure 8:
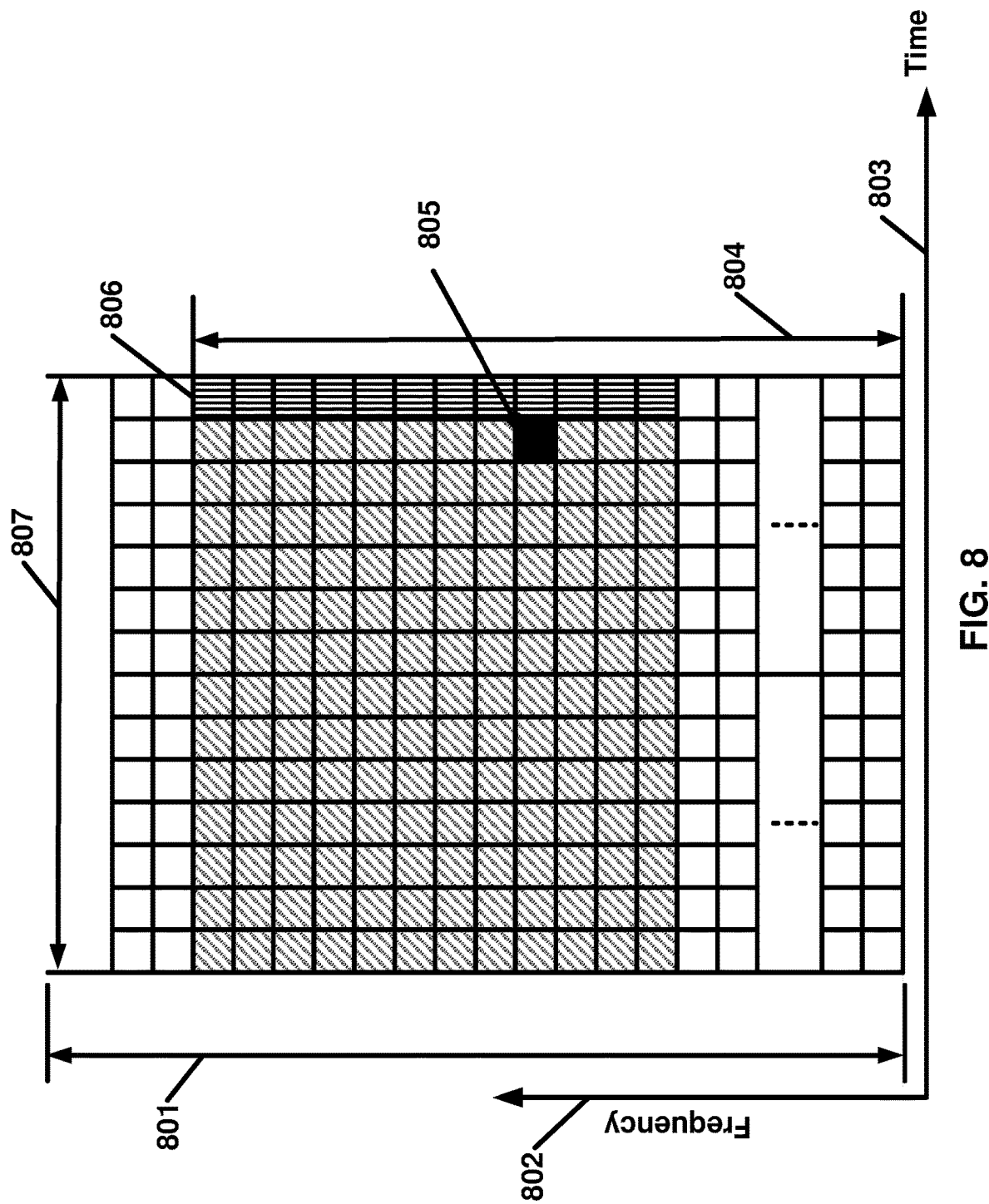
FIG. 8 is a diagram depicting example OFDM radio resources as per an aspect of an embodiment of the present disclosure.

FIG. 8 is a diagram depicting OFDM radio resources as per an aspect of an embodiment of the present disclosure. In an example, a carrier may have a transmission bandwidth 801. In an example, a resource grid may be in a structure of frequency domain 802 and time domain 803. In an example, a resource grid may comprise a first number of OFDM symbols in a subframe and a second number of resource blocks, starting from a common resource block indicated by higher-layer signaling (e.g. RRC signaling), for a transmission numerology and a carrier. In an example, in a resource grid, a resource unit identified by a subcarrier index and a symbol index may be a resource element 805. In an example, a subframe may comprise a first number of OFDM symbols 807 depending on a numerology associated with a carrier. For example, when a subcarrier spacing of a numerology of a carrier is 15 KHz, a subframe may have 14 OFDM symbols for a carrier. When a subcarrier spacing of a numerology is 30 KHz, a subframe may have 28 OFDM symbols. When a subcarrier spacing of a numerology is 60 Khz, a subframe may have 56 OFDM symbols, etc. In an example, a second number of resource blocks comprised in a resource grid of a carrier may depend on a bandwidth and a numerology of the carrier.

As shown in FIG. 8, a resource block 806 may comprise 12 subcarriers. In an example, multiple resource blocks may be grouped into a Resource Block Group (RBG) 804. In an example, a size of a RBG may depend on at least one of: a RRC message indicating a RBG size configuration; a size of a carrier bandwidth; or a size of a bandwidth part of a carrier. In an example, a carrier may comprise multiple bandwidth parts. A first bandwidth part of a carrier may have different frequency location and/or bandwidth from a second bandwidth part of the carrier.

In an example, a base station may transmit a downlink control information comprising a downlink or uplink resource block assignment to a wireless device. A base station may transmit to or receive from, a wireless device, data packets (e.g. transport blocks) scheduled and transmitted via one or more resource blocks and one or more slots according to parameters in a downlink control information and/or RRC message(s). In an example, a starting symbol relative to a first slot of the one or more slots may be indicated to the wireless device. In an example, a base station may transmit to or receive from, a wireless device, data packets scheduled on one or more RBGs and one or more slots.

In an example, a base station may transmit a downlink control information comprising a downlink assignment to a wireless device via one or more PDCCHs. The downlink assignment may comprise parameters indicating at least modulation and coding format; resource allocation; and/or HARQ information related to DL-SCH. In an example, a resource allocation may comprise parameters of resource block allocation; and/or slot allocation. In an example, a base station may dynamically allocate resources to a wireless device via a Cell-Radio Network Temporary Identifier (C-RNTI) on one or more PDCCHs. The wireless device may monitor the one or more PDCCHs in order to find possible allocation when its downlink reception is enabled. The wireless device may receive one or more downlink data package on one or more PDSCH scheduled by the one or more PDCCHs, when successfully detecting the one or more PDCCHs.

In an example, a base station may allocate Configured Scheduling (CS) resources for down link transmission to a wireless device. The base station may transmit one or more RRC messages indicating a periodicity of the CS grant. The base station may transmit a DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages, until deactivated.

In an example, a base station may transmit a downlink control information comprising an uplink grant to a wireless device via one or more PDCCHs. The uplink grant may comprise parameters indicating at least modulation and coding format; resource allocation; and/or HARQ information related to UL-SCH. In an example, a resource allocation may comprise parameters of resource block allocation; and/or slot allocation. In an example, a base station may dynamically allocate resources to a wireless device via a C-RNTI on one or more PDCCHs. The wireless device may monitor the one or more PDCCHs in order to find possible resource allocation. The wireless device may transmit one or more uplink data package via one or more PUSCH scheduled by the one or more PDCCHs, when successfully detecting the one or more PDCCHs.

In an example, a base station may allocate CS resources for uplink data transmission to a wireless device. The base station may transmit one or more RRC messages indicating a periodicity of the CS grant. The base station may transmit a DCI via a PDCCH addressed to a CS-RNTI activating the CS resources. The DCI may comprise parameters indicating that the uplink grant is a CS grant. The CS grant may be implicitly reused according to the periodicity defined by the one or more RRC message, until deactivated.

In an example, a base station may transmit DCI/control signaling via PDCCH. The DCI may take a format in a plurality of formats. A DCI may comprise downlink and/or uplink scheduling information (e.g., resource allocation information, HARQ related parameters, MCS), request for CSI (e.g., aperiodic CQI reports), request for SRS, uplink power control commands for one or more cells, one or more timing information (e.g., TB transmission/reception timing, HARQ feedback timing, etc.), etc. In an example, a DCI may indicate an uplink grant comprising transmission parameters for one or more transport blocks. In an example, a DCI may indicate downlink assignment indicating parameters for receiving one or more transport blocks. In an example, a DCI may be used by base station to initiate a contention-free random access at the wireless device. In an example, the base station may transmit a DCI comprising slot format indicator (SFI) notifying a slot format. In an example, the base station may transmit a DCI comprising pre-emption indication notifying the PRB(s) and/or OFDM symbol(s) where a UE may assume no transmission is intended for the UE. In an example, the base station may transmit a DCI for group power control of PUCCH or PUSCH or SRS. In an example, a DCI may correspond to an RNTI. In an example, the wireless device may obtain an RNTI in response to completing the initial access (e.g., C-RNTI). In an example, the base station may configure an RNTI for the wireless (e.g., CS-RNTI, TPC-CS-RNTI, TPC-PUCCH-RNTI, TPC-PUSCH-RNTI, TPC-SRS-RNTI). In an example, the wireless device may compute an RNTI (e.g., the wireless device may compute RA-RNTI based on resources used for transmission of a preamble). In an example, an RNTI may have a pre-configured value (e.g., P-RNTI or SI-RNTI). In an example, a wireless device may monitor a group common search space which may be used by base station for transmitting DCIs that are intended for a group of UEs. In an example, a group common DCI may correspond to an RNTI which is commonly configured for a group of UEs. In an example, a wireless device may monitor a UE-specific search space. In an example, a UE specific DCI may correspond to an RNTI configured for the wireless device.

A NR system may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources, associated with a CSI-RS resource index (CRI), or one or more DM-RSs of PBCH, may be used as RS for measuring quality of a beam pair link. Quality of a beam pair link may be defined as a reference signal received power (RSRP) value, or a reference signal received quality (RSRQ) value, and/or a CSI value measured on RS resources. The base station may indicate whether an RS resource, used for measuring a beam pair link quality, is quasi-co-located (QCLed) with DM-RSs of a control channel. A RS resource and DM-RSs of a control channel may be called QCLed when a channel characteristics from a transmission on an RS to a wireless device, and that from a transmission on a control channel to a wireless device, are similar or same under a configured criterion. In a multi-beam operation, a wireless device may perform an uplink beam sweeping to access a cell.

In an example, a wireless device may be configured to monitor PDCCH on one or more beam pair links simultaneously depending on a capability of a wireless device. This may increase robustness against beam pair link blocking. A base station may transmit one or more messages to configure a wireless device to monitor PDCCH on one or more beam pair links in different PDCCH OFDM symbols. For example, a base station may transmit higher layer signaling (e.g. RRC signaling) or MAC CE comprising parameters related to the Rx beam setting of a wireless device for monitoring PDCCH on one or more beam pair links. A base station may transmit indication of spatial QCL assumption between an DL RS antenna port(s) (for example, cell-specific CSI-RS, or wireless device-specific CSI-RS, or SS block, or PBCH with or without DM-RSs of PBCH), and DL RS antenna port(s) for demodulation of DL control channel. Signaling for beam indication for a PDCCH may be MAC CE signaling, or RRC signaling, or DCI signaling, or specification-transparent and/or implicit method, and combination of these signaling methods.

For reception of unicast DL data channel, a base station may indicate spatial QCL parameters between DL RS antenna port(s) and DM-RS antenna port(s) of DL data channel. The base station may transmit DCI (e.g. downlink grants) comprising information indicating the RS antenna port(s). The information may indicate RS antenna port(s) which may be QCL-ed with the DM-RS antenna port(s). Different set of DM-RS antenna port(s) for a DL data channel may be indicated as QCL with different set of the RS antenna port(s).

Figure 9A:
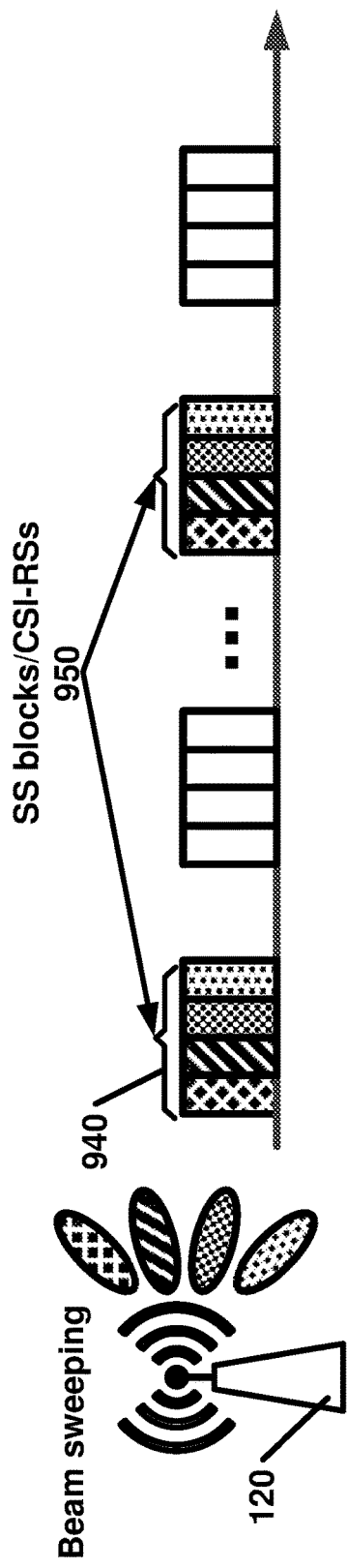
FIG. 9A is a diagram depicting an example CSI-RS and/or SS block transmission in a multi-beam system.

FIG. 9A is an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. For example, in a multi-beam operation, a base station 120 may transmit SS blocks in multiple beams, together forming a SS burst 940. One or more SS blocks may be transmitted on one beam. If multiple SS bursts 940 are transmitted with multiple beams, SS bursts together may form SS burst set 950.

A wireless device may further use CSI-RS in the multi-beam operation for estimating a beam quality of a links between a wireless device and a base station. A beam may be associated with a CSI-RS. For example, a wireless device may, based on a RSRP measurement on CSI-RS, report a beam index, as indicated in a CRI for downlink beam selection, and associated with a RSRP value of a beam. A CSI-RS may be transmitted on a CSI-RS resource including at least one of one or more antenna ports, one or more time or frequency radio resources. A CSI-RS resource may be configured in a cell-specific way by common RRC signaling, or in a wireless device-specific way by dedicated RRC signaling, and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be transmitted periodically, or using aperiodic transmission, or using a multi-shot or semi-persistent transmission. For example, in a periodic transmission in FIG. 9A, a base station 120 may transmit configured CSI-RS resources 940 periodically using a configured periodicity in a time domain. In an aperiodic transmission, a configured CSI-RS resource may be transmitted in a dedicated time slot. In a multi-shot or semi-persistent transmission, a configured CSI-RS resource may be transmitted within a configured period. Beams used for CSI-RS transmission may have different beam width than beams used for SS-blocks transmission.

Figure 9B:
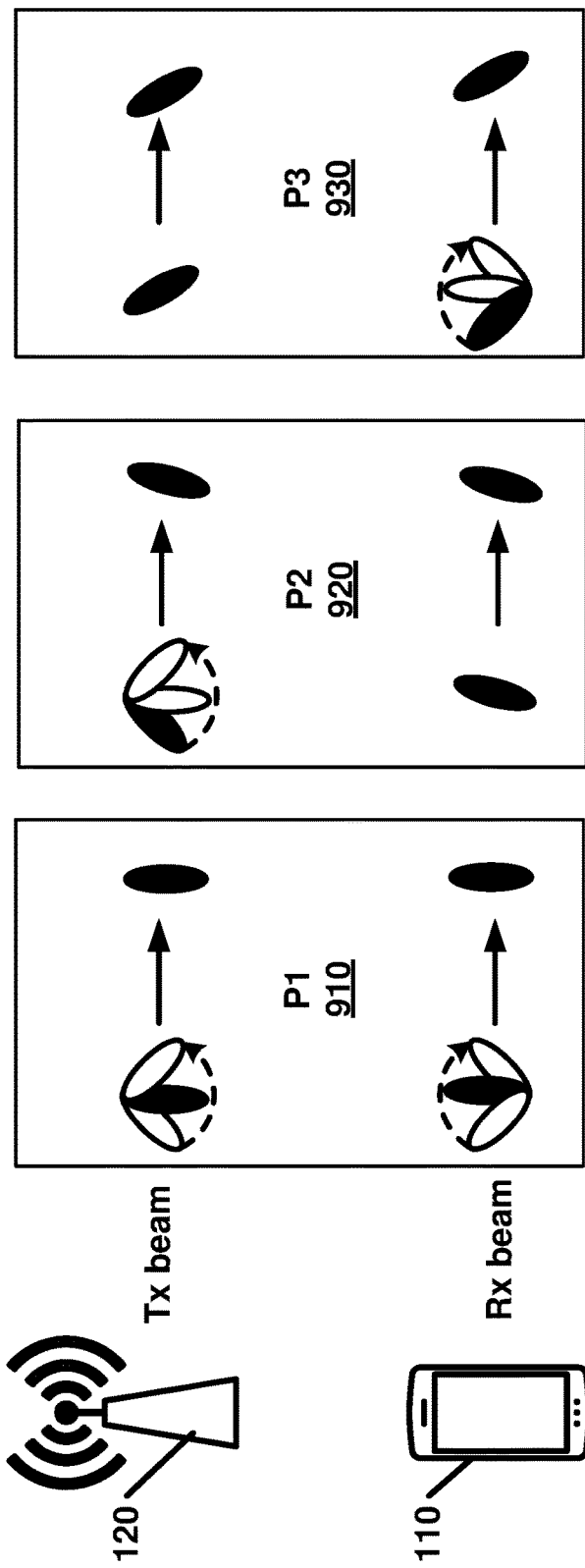
FIG. 9B is a diagram depicting an example downlink beam management procedure as per an aspect of an embodiment of the present disclosure.

FIG. 9B is an example of a beam management procedure in an example new radio network. A base station 120 and/or a wireless device 110 may perform a downlink L1/L2 beam management procedure. One or more of the following downlink L1/L2 beam management procedures may be performed within one or more wireless devices 110 and one or more base stations 120. In an example, a P-1 procedure 910 may be used to enable the wireless device 110 to measure one or more Transmission (Tx) beams associated with the base station 120 to support a selection of a first set of Tx beams associated with the base station 120 and a first set of Rx beam(s) associated with a wireless device 110. For beamforming at a base station 120, a base station 120 may sweep a set of different TX beams. For beamforming at a wireless device 110, a wireless device 110 may sweep a set of different Rx beams. In an example, a P-2 procedure 920 may be used to enable a wireless device 110 to measure one or more Tx beams associated with a base station 120 to possibly change a first set of Tx beams associated with a base station 120. A P-2 procedure 920 may be performed on a possibly smaller set of beams for beam refinement than in the P-1 procedure 910. A P-2 procedure 920 may be a special case of a P-1 procedure 910. In an example, a P-3 procedure 930 may be used to enable a wireless device 110 to measure at least one Tx beam associated with a base station 120 to change a first set of Rx beams associated with a wireless device 110.

A wireless device 110 may transmit one or more beam management reports to a base station 120. In one or more beam management reports, a wireless device 110 may indicate some beam pair quality parameters, comprising at least, one or more beam identifications; RSRP; Precoding Matrix Indicator (PMI)/Channel Quality Indicator (CQI)/Rank Indicator (RI) of a subset of configured beams. Based on one or more beam management reports, a base station 120 may transmit to a wireless device 110 a signal indicating that one or more beam pair links are one or more serving beams. A base station 120 may transmit PDCCH and PDSCH for a wireless device 110 using one or more serving beams.

In an example embodiment, new radio network may support a Bandwidth Adaptation (BA). In an example, receive and/or transmit bandwidths configured by an UE employing a BA may not be large. For example, a receive and/or transmit bandwidths may not be as large as a bandwidth of a cell. Receive and/or transmit bandwidths may be adjustable. For example, a UE may change receive and/or transmit bandwidths, e.g., to shrink during period of low activity to save power. For example, a UE may change a location of receive and/or transmit bandwidths in a frequency domain, e.g. to increase scheduling flexibility. For example, a UE may change a subcarrier spacing, e.g. to allow different services.

In an example embodiment, a subset of a total cell bandwidth of a cell may be referred to as a Bandwidth Part (BWP). A base station may configure a UE with one or more BWPs to achieve a BA. For example, a base station may indicate, to a UE, which of the one or more (configured) BWPs is an active BWP.

Figure 10:
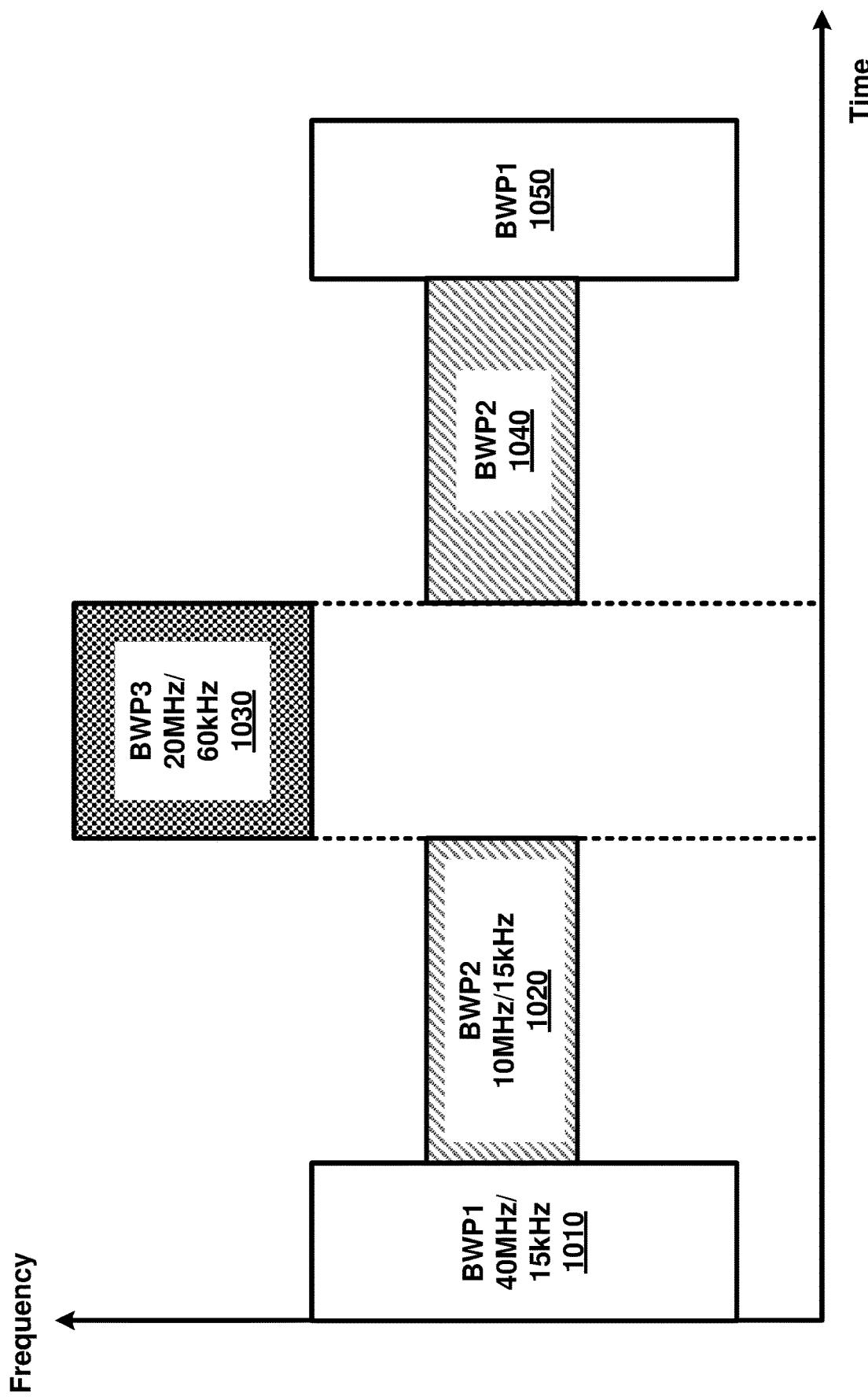
FIG. 10 is an example diagram of configured BWPs as per an aspect of an embodiment of the present disclosure.

FIG. 10 is an example diagram of 3 BWPs configured: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz.

In an example, a UE, configured for operation in one or more BWPs of a cell, may be configured by one or more higher layers (e.g. RRC layer) for a cell a set of one or more BWPs (e.g., at most four BWPs) for receptions by the UE (DL BWP set) in a DL bandwidth by at least one parameter DL-BWP and a set of one or more BWPs (e.g., at most four BWPs) for transmissions by a UE (UL BWP set) in an UL bandwidth by at least one parameter UL-BWP for a cell.

To enable BA on the PCell, a base station may configure a UE with one or more UL and DL BWP pairs. To enable BA on SCells (e.g., in case of CA), a base station may configure a UE at least with one or more DL BWPs (e.g., there may be none in an UL).

In an example, an initial active DL BWP may be defined by at least one of a location and number of contiguous PRBs, a subcarrier spacing, or a cyclic prefix, for a control resource set for at least one common search space. For operation on the PCell, one or more higher layer parameters may indicate at least one initial UL BWP for a random access procedure. If a UE is configured with a secondary carrier on a primary cell, the UE may be configured with an initial BWP for random access procedure on a secondary carrier.

In an example, for unpaired spectrum operation, a UE may expect that a center frequency for a DL BWP may be same as a center frequency for a UL BWP.

For example, for a DL BWP or an UL BWP in a set of one or more DL BWPs or one or more UL BWPs, respectively, a base statin may semi-statistically configure a UE for a cell with one or more parameters indicating at least one of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; an offset of a first PRB of a DL bandwidth or an UL bandwidth, respectively, relative to a first PRB of a bandwidth.

In an example, for a DL BWP in a set of one or more DL BWPs on a PCell, a base station may configure a UE with one or more control resource sets for at least one type of common search space and/or one UE-specific search space. For example, a base station may not configure a UE without a common search space on a PCell, or on a sPCell, in an active DL BWP.

For an UL BWP in a set of one or more UL BWPs, a base station may configure a UE with one or more resource sets for one or more PUCCH transmissions.

In an example, if a DCI comprises a BWP indicator field, a BWP indicator field value may indicate an active DL BWP, from a configured DL BWP set, for one or more DL receptions. If a DCI comprises a BWP indicator field, a BWP indicator field value may indicate an active UL BWP, from a configured UL BWP set, for one or more UL transmissions.

In an example, for a PCell, a base station may semi-statistically configure a UE with a default DL BWP among configured DL BWPs. If a UE is not provided a default DL BWP, a default BWP may be an initial active DL BWP.

In an example, a base station may configure a UE with a timer value for a PCell. For example, a UE may start a timer, referred to as BWP inactivity timer, when a UE detects a DCI indicating an active DL BWP, other than a default DL BWP, for a paired spectrum operation or when a UE detects a DCI indicating an active DL BWP or UL BWP, other than a default DL BWP or UL BWP, for an unpaired spectrum operation. The UE may increment the timer by an interval of a first value (e.g., the first value may be 1 millisecond or 0.5 milliseconds) if the UE does not detect a DCI during the interval for a paired spectrum operation or for an unpaired spectrum operation. In an example, the timer may expire when the timer is equal to the timer value. A UE may switch to the default DL BWP from an active DL BWP when the timer expires.

In an example, a base station may semi-statistically configure a UE with one or more BWPs. A UE may switch an active BWP from a first BWP to a second BWP in response to receiving a DCI indicating the second BWP as an active BWP and/or in response to an expiry of BWP inactivity timer (for example, the second BWP may be a default BWP). For example, FIG. 10 is an example diagram of 3 BWPs configured, BWP1 (1010 and 1050), BWP2 (1020 and 1040), and BWP3 (1030). BWP2 (1020 and 1040) may be a default BWP. BWP1 (1010) may be an initial active BWP. In an example, a UE may switch an active BWP from BWP1 1010 to BWP2 1020 in response to an expiry of BWP inactivity timer. For example, a UE may switch an active BWP from BWP2 1020 to BWP3 1030 in response to receiving a DCI indicating BWP3 1030 as an active BWP. Switching an active BWP from BWP3 1030 to BWP2 1040 and/or from BWP2 1040 to BWP1 1050 may be in response to receiving a DCI indicating an active BWP and/or in response to an expiry of BWP inactivity timer.

In an example, if a UE is configured for a secondary cell with a default DL BWP among configured DL BWPs and a timer value, UE procedures on a secondary cell may be same as on a primary cell using the timer value for the secondary cell and the default DL BWP for the secondary cell.

In an example, if a base station configures a UE with a first active DL BWP and a first active UL BWP on a secondary cell or carrier, a UE may employ an indicated DL BWP and an indicated UL BWP on a secondary cell as a respective first active DL BWP and first active UL BWP on a secondary cell or carrier.

Figure 11A:
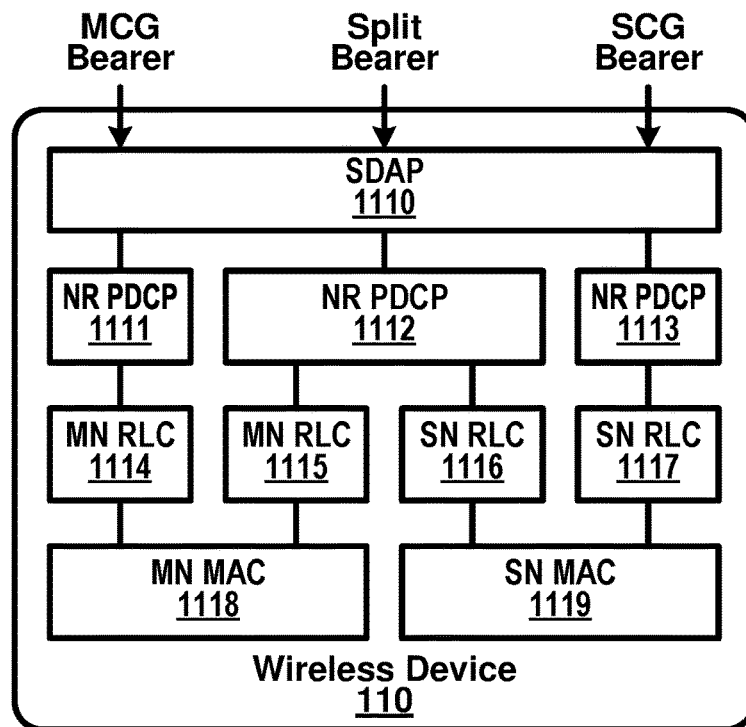
FIG. 11A, and FIG. 11B are diagrams of an example multi connectivity as per an aspect of an embodiment of the present disclosure.
Figure 11B:
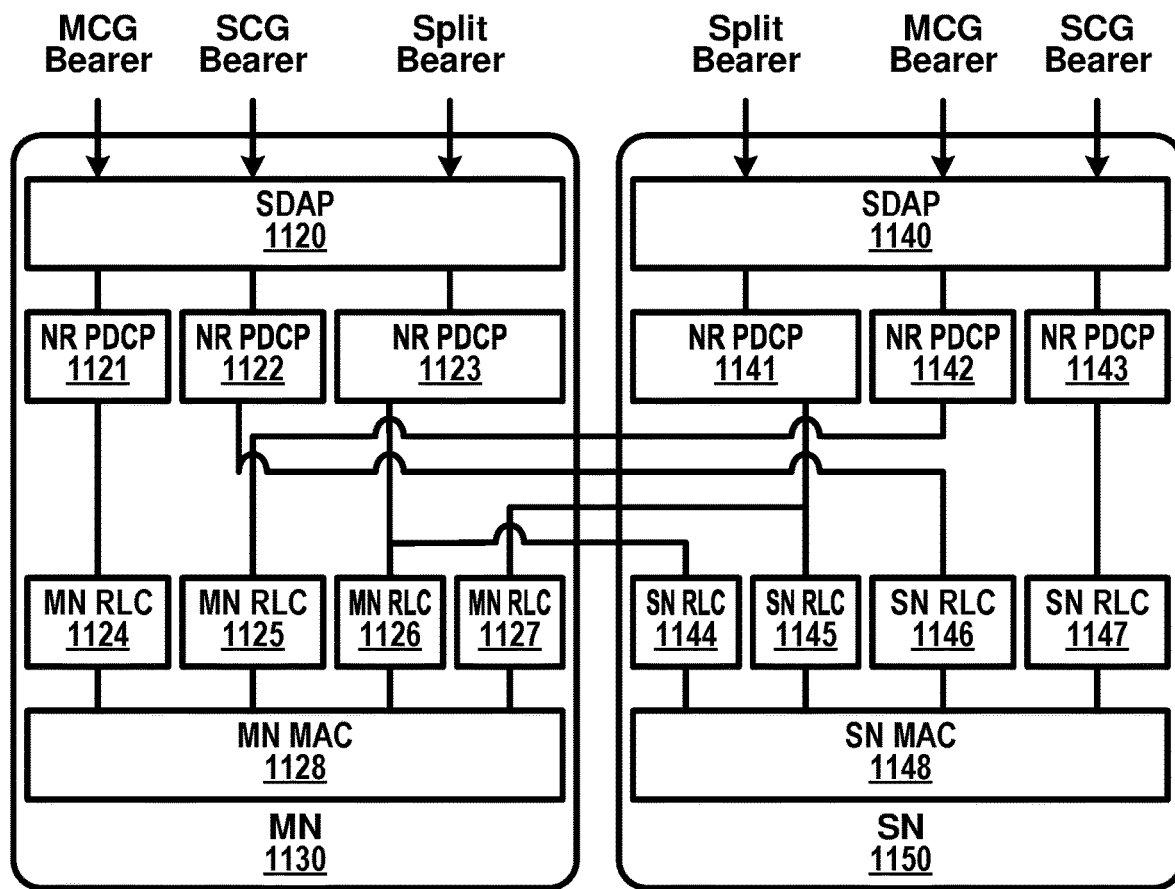

FIG. 11A and FIG. 11B show packet flows employing a multi connectivity (e.g. dual connectivity, multi connectivity, tight interworking, and/or the like). FIG. 11A is an example diagram of a protocol structure of a wireless device 110 (e.g. UE) with CA and/or multi connectivity as per an aspect of an embodiment. FIG. 11B is an example diagram of a protocol structure of multiple base stations with CA and/or multi connectivity as per an aspect of an embodiment. The multiple base stations may comprise a master node, MN 1130 (e.g. a master node, a master base station, a master gNB, a master eNB, and/or the like) and a secondary node, SN 1150 (e.g. a secondary node, a secondary base station, a secondary gNB, a secondary eNB, and/or the like). A master node 1130 and a secondary node 1150 may co-work to communicate with a wireless device 110.

When multi connectivity is configured for a wireless device 110, the wireless device 110, which may support multiple reception/transmission functions in an RRC connected state, may be configured to utilize radio resources provided by multiple schedulers of a multiple base stations.

Multiple base stations may be inter-connected via a non-ideal or ideal backhaul (e.g. Xn interface, X2 interface, and/or the like). A base station involved in multi connectivity for a certain wireless device may perform at least one of two different roles: a base station may either act as a master base station or as a secondary base station. In multi connectivity, a wireless device may be connected to one master base station and one or more secondary base stations. In an example, a master base station (e.g. the MN 1130) may provide a master cell group (MCG) comprising a primary cell and/or one or more secondary cells for a wireless device (e.g. the wireless device 110). A secondary base station (e.g. the SN 1150) may provide a secondary cell group (SCG) comprising a primary secondary cell (sPCell) and/or one or more secondary cells for a wireless device (e.g. the wireless device 110).

In multi connectivity, a radio protocol architecture that a bearer employs may depend on how a bearer is setup. In an example, three different type of bearer setup options may be supported: an MCG bearer, an SCG bearer, and/or a split bearer. A wireless device may receive/transmit packets of an MCG bearer via one or more cells of the MCG, and/or may receive/transmits packets of an SCG bearer via one or more cells of an SCG. Multi-connectivity may also be described as having at least one bearer configured to use radio resources provided by the secondary base station. Multi-connectivity may or may not be configured/implemented in some of the example embodiments.

In an example, a wireless device (e.g. Wireless Device 110) may transmit and/or receive: packets of an MCG bearer via an SDAP layer (e.g. SDAP 1110), a PDCP layer (e.g. NR PDCP 1111), an RLC layer (e.g. MN RLC 1114), and a MAC layer (e.g. MN MAC 1118); packets of a split bearer via an SDAP layer (e.g. SDAP 1110), a PDCP layer (e.g. NR PDCP 1112), one of a master or secondary RLC layer (e.g. MN RLC 1115, SN RLC 1116), and one of a master or secondary MAC layer (e.g. MN MAC 1118, SN MAC 1119); and/or packets of an SCG bearer via an SDAP layer (e.g. SDAP 1110), a PDCP layer (e.g. NR PDCP 1113), an RLC layer (e.g. SN RLC 1117), and a MAC layer (e.g. MN MAC 1119).

In an example, a master base station (e.g. MN 1130) and/or a secondary base station (e.g. SN 1150) may transmit/receive: packets of an MCG bearer via a master or secondary node SDAP layer (e.g. SDAP 1120, SDAP 1140), a master or secondary node PDCP layer (e.g. NR PDCP 1121, NR PDCP 1142), a master node RLC layer (e.g. MN RLC 1124, MN RLC 1125), and a master node MAC layer (e.g. MN MAC 1128); packets of an SCG bearer via a master or secondary node SDAP layer (e.g. SDAP 1120, SDAP 1140), a master or secondary node PDCP layer (e.g. NR PDCP 1122, NR PDCP 1143), a secondary node RLC layer (e.g. SN RLC 1146, SN RLC 1147), and a secondary node MAC layer (e.g. SN MAC 1148); packets of a split bearer via a master or secondary node SDAP layer (e.g. SDAP 1120, SDAP 1140), a master or secondary node PDCP layer (e.g. NR PDCP 1123, NR PDCP 1141), a master or secondary node RLC layer (e.g. MN RLC 1126, SN RLC 1144, SN RLC 1145, MN RLC 1127), and a master or secondary node MAC layer (e.g. MN MAC 1128, SN MAC 1148).

In multi connectivity, a wireless device may configure multiple MAC entities: one MAC entity (e.g. MN MAC 1118) for a master base station, and other MAC entities (e.g. SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be applied: at least one cell of an SCG has a configured UL CC and at least one cell of a SCG, named as primary secondary cell (sPCell, PCell of SCG, or sometimes called PCell), is configured with PUCCH resources; when an SCG is configured, there may be at least one SCG bearer or one Split bearer; upon detection of a physical layer problem or a random access problem on a sPCell, or a number of NR RLC retransmissions has been reached associated with the SCG, or upon detection of an access problem on a sPCell during a SCG addition or a SCG change: an RRC connection re-establishment procedure may not be triggered, UL transmissions towards cells of an SCG may be stopped, a master base station may be informed by a wireless device of a SCG failure type, for split bearer, a DL data transfer over a master base station may be maintained; an NR RLC acknowledged mode (AM) bearer may be configured for a split bearer; PCell and/or sPCell may not be de-activated; sPCell may be changed with a SCG change procedure (e.g. with security key change and a RACH procedure); and/or a bearer type change between a split bearer and a SCG bearer or simultaneous configuration of a SCG and a split bearer may or may not be supported.

With respect to interaction between a master base station and a secondary base stations for multi-connectivity, one or more of the following may be applied: a master base station and/or a secondary base station may maintain RRM measurement configurations of a wireless device; a master base station may (e.g. based on received measurement reports, traffic conditions, and/or bearer types) may decide to request a secondary base station to provide additional resources (e.g. serving cells) for a wireless device; upon receiving a request from a master base station, a secondary base station may create/modify a container that may result in configuration of additional serving cells for a wireless device (or decide that the secondary base station has no resource available to do so); for a UE capability coordination, a master base station may provide (a part of) an AS configuration and UE capabilities to a secondary base station; a master base station and a secondary base station may exchange information about a UE configuration by employing of RRC containers (inter-node messages) carried via Xn messages; a secondary base station may initiate a reconfiguration of the secondary base station existing serving cells (e.g. PUCCH towards the secondary base station); a secondary base station may decide which cell is a sPCell within a SCG; a master base station may or may not change content of RRC configurations provided by a secondary base station; in case of a SCG addition and/or a SCG SCell addition, a master base station may provide recent (or the latest) measurement results for SCG cell(s); a master base station and secondary base stations may receive information of SFN and/or subframe offset of each other from OAM and/or via an Xn interface, (e.g. for a purpose of DRX alignment and/or identification of a measurement gap). In an example, when adding a new SCG SCell, dedicated RRC signaling may be used for sending required system information of a cell as for CA, except for a SFN acquired from a MIB of a sPCell of a SCG.

Figure 12:
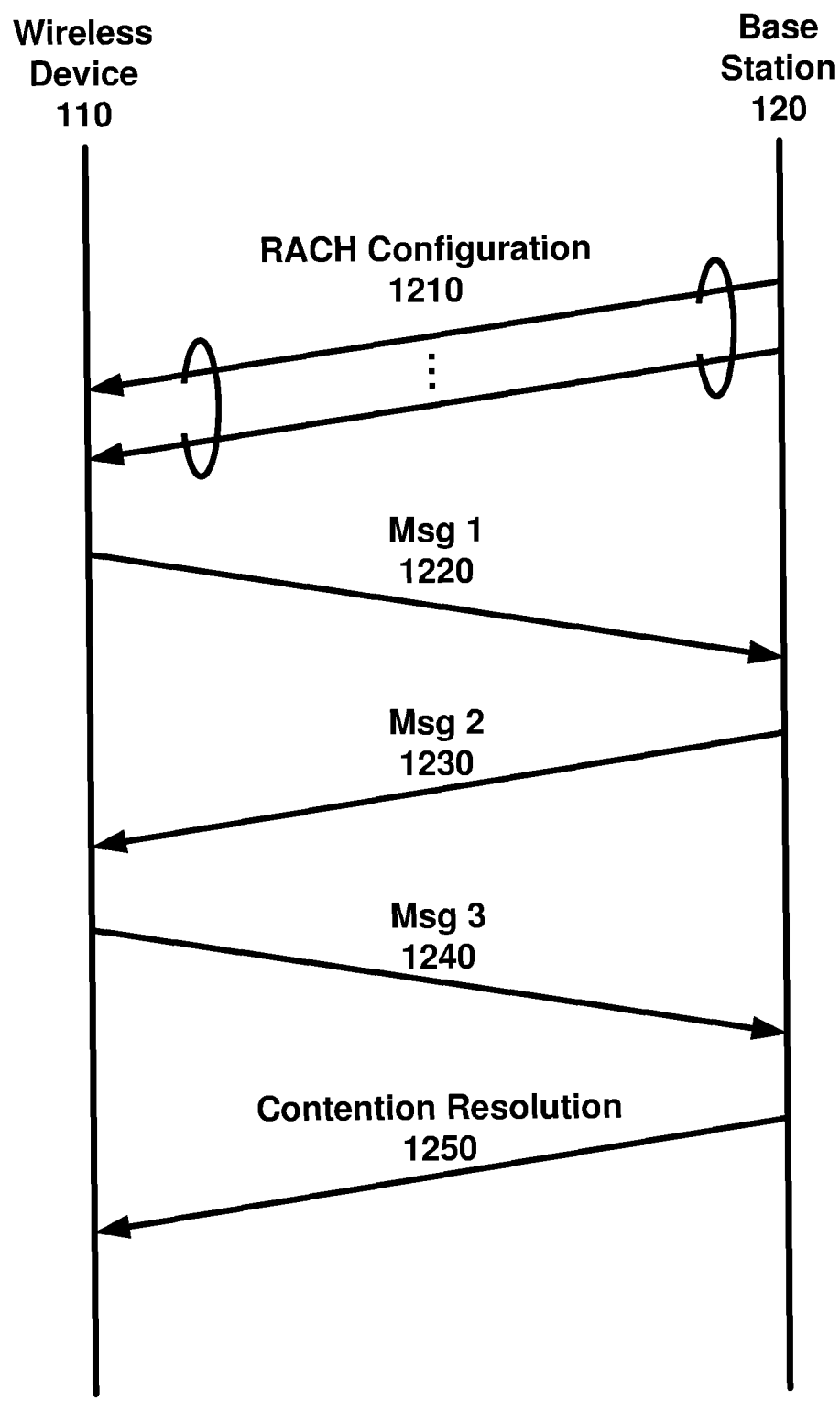
FIG. 12 is a diagram of an example random access procedure as per an aspect of an embodiment of the present disclosure.

FIG. 12 is an example diagram of a random access procedure. One or more events may trigger a random access procedure. For example, one or more events may be at least one of following: initial access from RRC_IDLE, RRC connection re-establishment procedure, handover, DL or UL data arrival during RRC_CONNECTED when UL synchronization status is non-synchronized, transition from RRC_Inactive, and/or request for other system information. For example, a PDCCH order, a MAC entity, and/or a beam failure indication may initiate a random access procedure.

In an example embodiment, a random access procedure may be at least one of a contention based random access procedure and a contention free random access procedure. For example, a contention based random access procedure may comprise, one or more Msg 1 1220 transmissions, one or more Msg2 1230 transmissions, one or more Msg3 1240 transmissions, and contention resolution 1250. For example, a contention free random access procedure may comprise one or more Msg 1 1220 transmissions and one or more Msg2 1230 transmissions.

In an example, a base station may transmit (e.g., unicast, multicast, or broadcast), to a UE, a RACH configuration 1210 via one or more beams. The RACH configuration 1210 may comprise one or more parameters indicating at least one of following: available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), random access preamble index, a maximum number of preamble transmission, preamble group A and group B, a threshold (e.g., message size) to determine the groups of random access preambles, a set of one or more random access preambles for system information request and corresponding PRACH resource(s), if any, a set of one or more random access preambles for beam failure recovery request and corresponding PRACH resource(s), if any, a time window to monitor RA response(s), a time window to monitor response(s) on beam failure recovery request, and/or a contention resolution timer.

In an example, the Msg1 1220 may be one or more transmissions of a random access preamble. For a contention based random access procedure, a UE may select a SS block with a RSRP above the RSRP threshold. If random access preambles group B exists, a UE may select one or more random access preambles from a group A or a group B depending on a potential Msg3 1240 size. If a random access preambles group B does not exist, a UE may select the one or more random access preambles from a group A. A UE may select a random access preamble index randomly (e.g. with equal probability or a normal distribution) from one or more random access preambles associated with a selected group. If a base station semi-statistically configures a UE with an association between random access preambles and SS blocks, the UE may select a random access preamble index randomly with equal probability from one or more random access preambles associated with a selected SS block and a selected group.

For example, a UE may initiate a contention free random access procedure based on a beam failure indication from a lower layer. For example, a base station may semi-statistically configure a UE with one or more contention free PRACH resources for beam failure recovery request associated with at least one of SS blocks and/or CSI-RSs. If at least one of SS blocks with a RSRP above a first RSRP threshold amongst associated SS blocks or at least one of CSI-RSs with a RSRP above a second RSRP threshold amongst associated CSI-RSs is available, a UE may select a random access preamble index corresponding to a selected SS block or CSI-RS from a set of one or more random access preambles for beam failure recovery request.

For example, a UE may receive, from a base station, a random access preamble index via PDCCH or RRC for a contention free random access procedure. If a base station does not configure a UE with at least one contention free PRACH resource associated with SS blocks or CSI-RS, the UE may select a random access preamble index. If a base station configures a UE with one or more contention free PRACH resources associated with SS blocks and at least one SS block with a RSRP above a first RSRP threshold amongst associated SS blocks is available, the UE may select the at least one SS block and select a random access preamble corresponding to the at least one SS block. If a base station configures a UE with one or more contention free PRACH resources associated with CSI-RSs and at least one CSI-RS with a RSRP above a second RSPR threshold amongst the associated CSI-RSs is available, the UE may select the at least one CSI-RS and select a random access preamble corresponding to the at least one CSI-RS.

A UE may perform one or more Msg1 1220 transmissions by transmitting the selected random access preamble. For example, if a UE selects an SS block and is configured with an association between one or more PRACH occasions and one or more SS blocks, the UE may determine an PRACH occasion from one or more PRACH occasions corresponding to a selected SS block. For example, if a UE selects a CSI-RS and is configured with an association between one or more PRACH occasions and one or more CSI-RSs, the UE may determine a PRACH occasion from one or more PRACH occasions corresponding to a selected CSI-RS. A UE may transmit, to a base station, a selected random access preamble via a selected PRACH occasions. A UE may determine a transmit power for a transmission of a selected random access preamble at least based on an initial preamble power and a power-ramping factor. A UE may determine a RA-RNTI associated with a selected PRACH occasions in which a selected random access preamble is transmitted. For example, a UE may not determine a RA-RNTI for a beam failure recovery request. A UE may determine an RA-RNTI at least based on an index of a first OFDM symbol and an index of a first slot of a selected PRACH occasions, and/or an uplink carrier index for a transmission of Msg1 1220.

In an example, a UE may receive, from a base station, a random access response, Msg 2 1230. A UE may start a time window (e.g., ra-ResponseWindow) to monitor a random access response. For beam failure recovery request, a base station may configure a UE with a different time window (e.g., bfr-ResponseWindow) to monitor response on beam failure recovery request. For example, a UE may start a time window (e.g., ra-ResponseWindow or bfr-ResponseWindow) at a start of a first PDCCH occasion after a fixed duration of one or more symbols from an end of a preamble transmission. If a UE transmits multiple preambles, the UE may start a time window at a start of a first PDCCH occasion after a fixed duration of one or more symbols from an end of a first preamble transmission. A UE may monitor a PDCCH of a cell for at least one random access response identified by a RA-RNTI or for at least one response to beam failure recovery request identified by a C-RNTI while a timer for a time window is running.

In an example, a UE may consider a reception of random access response successful if at least one random access response comprises a random access preamble identifier corresponding to a random access preamble transmitted by the UE. A UE may consider the contention free random access procedure successfully completed if a reception of random access response is successful. If a contention free random access procedure is triggered for a beam failure recovery request, a UE may consider a contention free random access procedure successfully complete if a PDCCH transmission is addressed to a C-RNTI. In an example, if at least one random access response comprises a random access preamble identifier, a UE may consider the random access procedure successfully completed and may indicate a reception of an acknowledgement for a system information request to upper layers. If a UE has signaled multiple preamble transmissions, the UE may stop transmitting remaining preambles (if any) in response to a successful reception of a corresponding random access response.

In an example, a UE may perform one or more Msg 3 1240 transmissions in response to a successful reception of random access response (e.g., for a contention based random access procedure). A UE may adjust an uplink transmission timing based on a timing advanced command indicated by a random access response and may transmit one or more transport blocks based on an uplink grant indicated by a random access response. Subcarrier spacing for PUSCH transmission for Msg3 1240 may be provided by at least one higher layer (e.g. RRC) parameter. A UE may transmit a random access preamble via PRACH and Msg3 1240 via PUSCH on a same cell. A base station may indicate an UL BWP for a PUSCH transmission of Msg3 1240 via system information block. A UE may employ HARQ for a retransmission of Msg 3 1240.

In an example, multiple UEs may perform Msg 1 1220 by transmitting a same preamble to a base station and receive, from the base station, a same random access response comprising an identity (e.g., TC-RNTI). Contention resolution 1250 may ensure that a UE does not incorrectly use an identity of another UE. For example, contention resolution 1250 may be based on C-RNTI on PDCCH or a UE contention resolution identity on DL-SCH. For example, if a base station assigns a C-RNTI to a UE, the UE may perform contention resolution 1250 based on a reception of a PDCCH transmission that is addressed to the C-RNTI. In response to detection of a C-RNTI on a PDCCH, a UE may consider contention resolution 1250 successful and may consider a random access procedure successfully completed. If a UE has no valid C-RNTI, a contention resolution may be addressed by employing a TC-RNTI. For example, if a MAC PDU is successfully decoded and a MAC PDU comprises a UE contention resolution identity MAC CE that matches the CCCH SDU transmitted in Msg3 1250, a UE may consider the contention resolution 1250 successful and may consider the random access procedure successfully completed.

Figure 13:
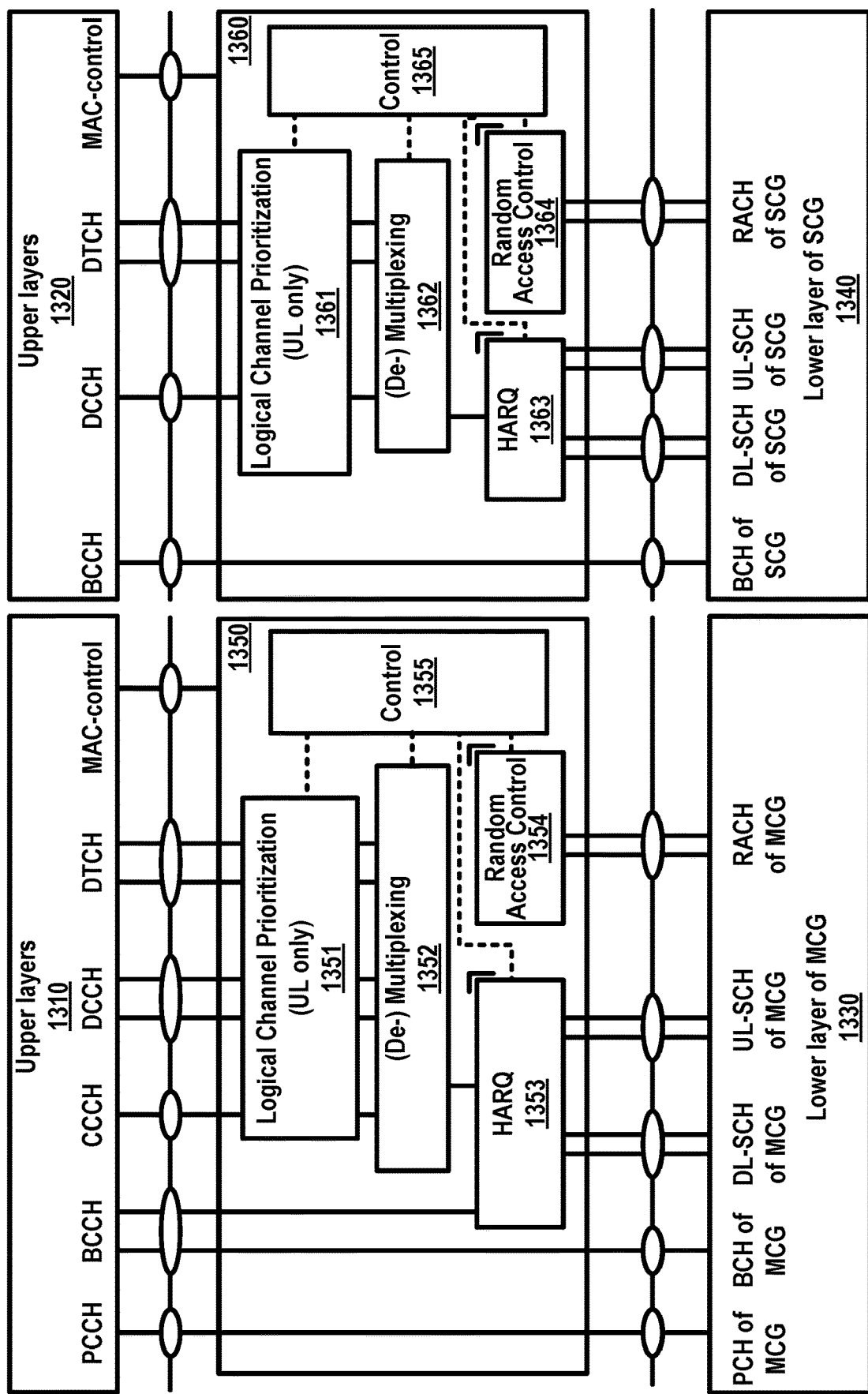
FIG. 13 is a structure of example MAC entities as per an aspect of an embodiment of the present disclosure.

FIG. 13 is an example structure for MAC entities as per an aspect of an embodiment. In an example, a wireless device may be configured to operate in a multi-connectivity mode. A wireless device in RRC_CONNECTED with multiple RX/TX may be configured to utilize radio resources provided by multiple schedulers located in a plurality of base stations. The plurality of base stations may be connected via a non-ideal or ideal backhaul over the Xn interface. In an example, a base station in a plurality of base stations may act as a master base station or as a secondary base station. A wireless device may be connected to one master base station and one or more secondary base stations. A wireless device may be configured with multiple MAC entities, e.g. one MAC entity for master base station, and one or more other MAC entities for secondary base station(s). In an example, a configured set of serving cells for a wireless device may comprise two subsets: an MCG comprising serving cells of a master base station, and one or more SCGs comprising serving cells of a secondary base station(s). FIG. 13 illustrates an example structure for MAC entities when MCG and SCG are configured for a wireless device.

In an example, at least one cell in a SCG may have a configured UL CC, wherein a cell of at least one cell may be called sPCell or PCell of SCG, or sometimes may be simply called PCell. A sPCell may be configured with PUCCH resources. In an example, when a SCG is configured, there may be at least one SCG bearer or one split bearer. In an example, upon detection of a physical layer problem or a random access problem on a sPCell, or upon reaching a number of RLC retransmissions associated with the SCG, or upon detection of an access problem on a sPCell during a SCG addition or a SCG change: an RRC connection re-establishment procedure may not be triggered, UL transmissions towards cells of an SCG may be stopped, a master base station may be informed by a UE of a SCG failure type and DL data transfer over a master base station may be maintained.

In an example, a MAC sublayer may provide services such as data transfer and radio resource allocation to upper layers (e.g. 1310 or 1320). A MAC sublayer may comprise a plurality of MAC entities (e.g. 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. For example, BCCH, PCCH, CCCH and DCCH may be control channels and DTCH may be a traffic channel. In an example, a first MAC entity (e.g. 1310) may provide services on PCCH, BCCH, CCCH, DCCH, DTCH and MAC control elements. In an example, a second MAC entity (e.g. 1320) may provide services on BCCH, DCCH, DTCH and MAC control elements.

A MAC sublayer may expect from a physical layer (e.g. 1330 or 1340) services such as data transfer services, signaling of HARQ feedback, signaling of scheduling request or measurements (e.g. CQI). In an example, in dual connectivity, two MAC entities may be configured for a wireless device: one for MCG and one for SCG. A MAC entity of wireless device may handle a plurality of transport channels. In an example, a first MAC entity may handle first transport channels comprising a PCCH of MCG, a first BCH of MCG, one or more first DL-SCHs of MCG, one or more first UL-SCHs of MCG and one or more first RACHs of MCG. In an example, a second MAC entity may handle second transport channels comprising a second BCH of SCG, one or more second DL-SCHs of SCG, one or more second UL-SCHs of SCG and one or more second RACHs of SCG.

In an example, if a MAC entity is configured with one or more SCells, there may be multiple DL-SCHs and there may be multiple UL-SCHs as well as multiple RACHs per MAC entity. In an example, there may be one DL-SCH and UL-SCH on a SpCell. In an example, there may be one DL-SCH, zero or one UL-SCH and zero or one RACH for an SCell. A DL-SCH may support receptions using different numerologies and/or TTI duration within a MAC entity. A UL-SCH may also support transmissions using different numerologies and/or TTI duration within the MAC entity.

In an example, a MAC sublayer may support different functions and may control these functions with a control (e.g. 1355 or 1365) element. Functions performed by a MAC entity may comprise mapping between logical channels and transport channels (e.g., in uplink or downlink), multiplexing (e.g. 1352 or 1362) of MAC SDUs from one or different logical channels onto transport blocks (TB) to be delivered to the physical layer on transport channels (e.g., in uplink), demultiplexing (e.g. 1352 or 1362) of MAC SDUs to one or different logical channels from transport blocks (TB) delivered from the physical layer on transport channels (e.g., in downlink), scheduling information reporting (e.g., in uplink), error correction through HARQ in uplink or downlink (e.g. 1363), and logical channel prioritization in uplink (e.g. 1351 or 1361). A MAC entity may handle a random access process (e.g. 1354 or 1364).

Figure 14:
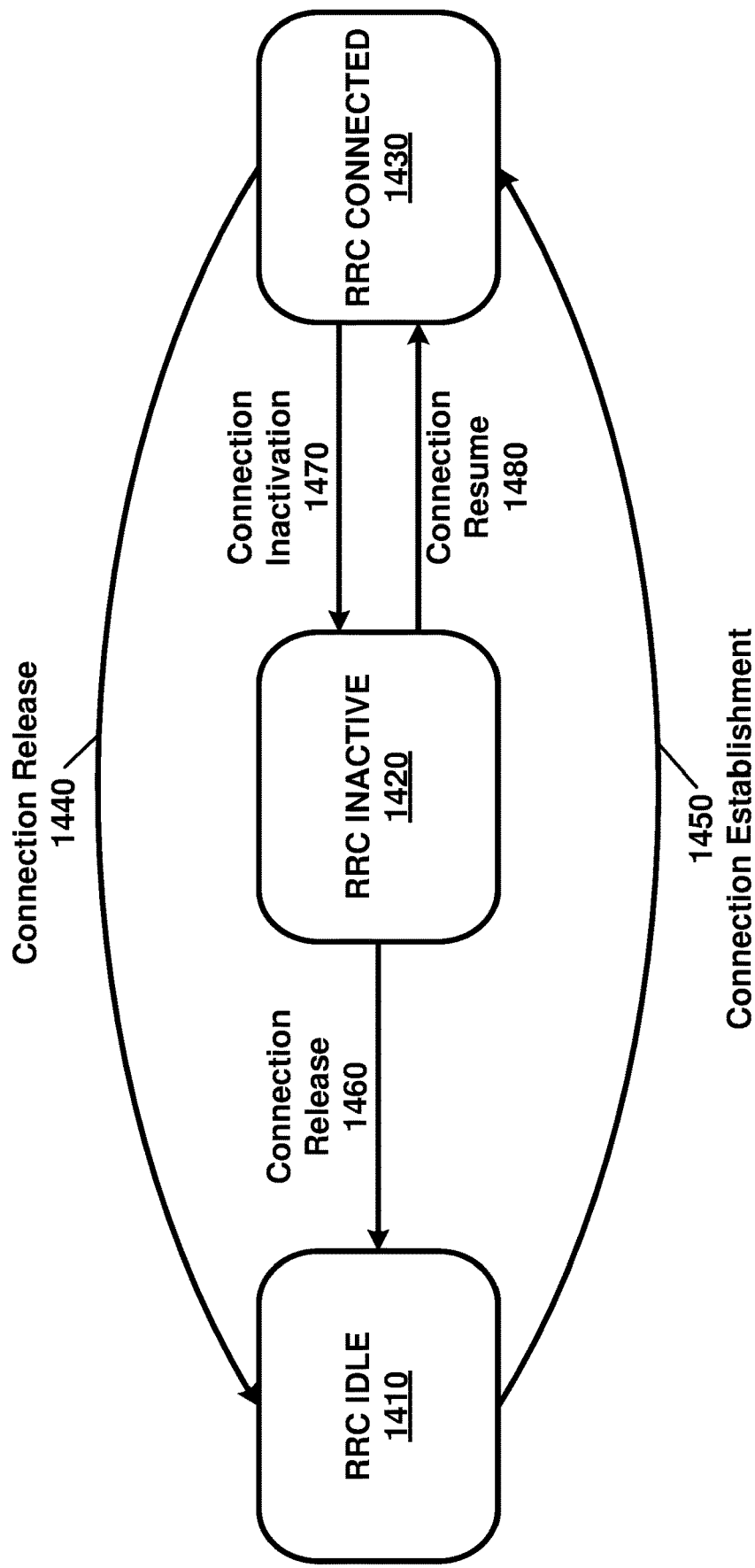
FIG. 14 is a diagram of an example RAN architecture as per an aspect of an embodiment of the present disclosure.

FIG. 14 is an example diagram of a RAN architecture comprising one or more base stations. In an example, a protocol stack (e.g. RRC, SDAP, PDCP, RLC, MAC, and PHY) may be supported at a node. A base station (e.g. 120A or 120B) may comprise a base station central unit (CU) (e.g. gNB-CU 1420A or 1420B) and at least one base station distributed unit (DU) (e.g. gNB-DU 1430A, 1430B, 1430C, or 1430D) if a functional split is configured. Upper protocol layers of a base station may be located in a base station CU, and lower layers of the base station may be located in the base station DUs. An F1 interface (e.g. CU-DU interface) connecting a base station CU and base station DUs may be an ideal or non-ideal backhaul. F1-C may provide a control plane connection over an F1 interface, and F1-U may provide a user plane connection over the F1 interface. In an example, an Xn interface may be configured between base station CUs.

In an example, a base station CU may comprise an RRC function, an SDAP layer, and a PDCP layer, and base station DUs may comprise an RLC layer, a MAC layer, and a PHY layer. In an example, various functional split options between a base station CU and base station DUs may be possible by locating different combinations of upper protocol layers (RAN functions) in a base station CU and different combinations of lower protocol layers (RAN functions) in base station DUs. A functional split may support flexibility to move protocol layers between a base station CU and base station DUs depending on service requirements and/or network environments.

In an example, functional split options may be configured per base station, per base station CU, per base station DU, per UE, per bearer, per slice, or with other granularities. In per base station CU split, a base station CU may have a fixed split option, and base station DUs may be configured to match a split option of a base station CU. In per base station DU split, a base station DU may be configured with a different split option, and a base station CU may provide different split options for different base station DUs. In per UE split, a base station (base station CU and at least one base station DUs) may provide different split options for different wireless devices. In per bearer split, different split options may be utilized for different bearers. In per slice splice, different split options may be applied for different slices.

Figure 15:
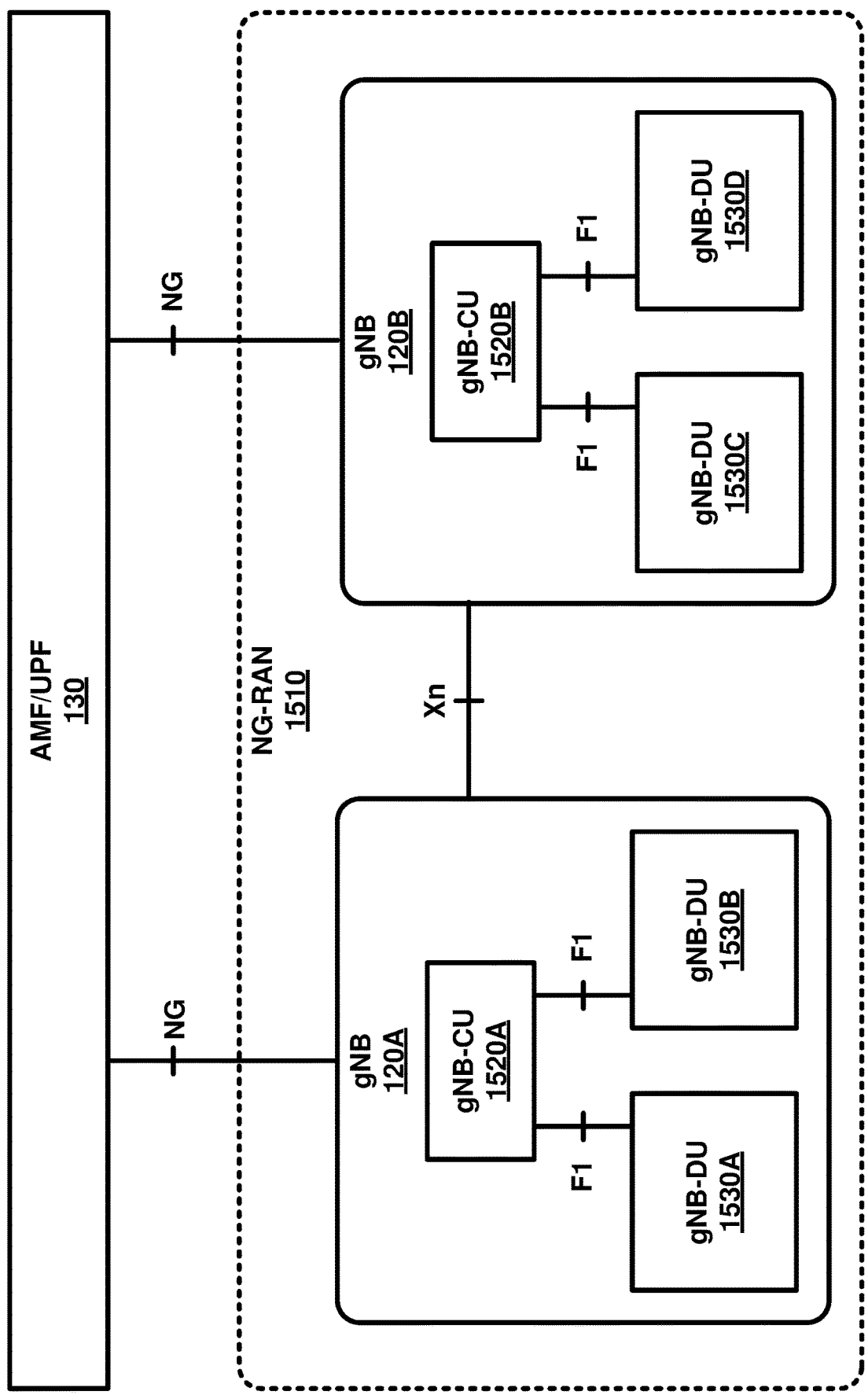
FIG. 15 is a diagram of example RRC states as per an aspect of an embodiment of the present disclosure.

FIG. 15 is an example diagram showing RRC state transitions of a wireless device. In an example, a wireless device may be in at least one RRC state among an RRC connected state (e.g. RRC Connected 1530, RRC_Connected), an RRC idle state (e.g. RRC Idle 1510, RRC_Idle), and/or an RRC inactive state (e.g. RRC Inactive 1520, RRC_Inactive). In an example, in an RRC connected state, a wireless device may have at least one RRC connection with at least one base station (e.g. base station and/or eNB), which may have a UE context of the wireless device. A UE context (e.g. a wireless device context) may comprise at least one of an access stratum context, one or more radio link configuration parameters, bearer (e.g. data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an example, in an RRC idle state, a wireless device may not have an RRC connection with a base station, and a UE context of a wireless device may not be stored in a base station. In an example, in an RRC inactive state, a wireless device may not have an RRC connection with a base station. A UE context of a wireless device may be stored in a base station, which may be called as an anchor base station (e.g. last serving base station).

In an example, a wireless device may transition a UE RRC state between an RRC idle state and an RRC connected state in both ways (e.g. connection release 1540 or connection establishment 1550; or connection reestablishment) and/or between an RRC inactive state and an RRC connected state in both ways (e.g. connection inactivation 1570 or connection resume 1580). In an example, a wireless device may transition its RRC state from an RRC inactive state to an RRC idle state (e.g. connection release 1560).

In an example, an anchor base station may be a base station that may keep a UE context (a wireless device context) of a wireless device at least during a time period that a wireless device stays in a RAN notification area (RNA) of an anchor base station, and/or that a wireless device stays in an RRC inactive state. In an example, an anchor base station may be a base station that a wireless device in an RRC inactive state was lastly connected to in a latest RRC connected state or that a wireless device lastly performed an RNA update procedure in. In an example, an RNA may comprise one or more cells operated by one or more base stations. In an example, a base station may belong to one or more RNAs. In an example, a cell may belong to one or more RNAs.

In an example, a wireless device may transition a UE RRC state from an RRC connected state to an RRC inactive state in a base station. A wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

In an example, an anchor base station may broadcast a message (e.g. RAN paging message) to base stations of an RNA to reach to a wireless device in an RRC inactive state, and/or the base stations receiving the message from the anchor base station may broadcast and/or multicast another message (e.g. paging message) to wireless devices in their coverage area, cell coverage area, and/or beam coverage area associated with the RNA through an air interface.

In an example, when a wireless device in an RRC inactive state moves into a new RNA, the wireless device may perform an RNA update (RNAU) procedure, which may comprise a random access procedure by the wireless device and/or a UE context retrieve procedure. A UE context retrieve may comprise: receiving, by a base station from a wireless device, a random access preamble; and fetching, by a base station, a UE context of the wireless device from an old anchor base station. Fetching may comprise: sending a retrieve UE context request message comprising a resume identifier to the old anchor base station and receiving a retrieve UE context response message comprising the UE context of the wireless device from the old anchor base station.

In an example embodiment, a wireless device in an RRC inactive state may select a cell to camp on based on at least a on measurement results for one or more cells, a cell where a wireless device may monitor an RNA paging message and/or a core network paging message from a base station. In an example, a wireless device in an RRC inactive state may select a cell to perform a random access procedure to resume an RRC connection and/or to transmit one or more packets to a base station (e.g. to a network). In an example, if a cell selected belongs to a different RNA from an RNA for a wireless device in an RRC inactive state, the wireless device may initiate a random access procedure to perform an RNA update procedure. In an example, if a wireless device in an RRC inactive state has one or more packets, in a buffer, to transmit to a network, the wireless device may initiate a random access procedure to transmit one or more packets to a base station of a cell that the wireless device selects. A random access procedure may be performed with two messages (e.g. 2 stage random access) and/or four messages (e.g. 4 stage random access) between the wireless device and the base station.

In an example embodiment, a base station receiving one or more uplink packets from a wireless device in an RRC inactive state may fetch a UE context of a wireless device by transmitting a retrieve UE context request message for the wireless device to an anchor base station of the wireless device based on at least one of an AS context identifier, an RNA identifier, a base station identifier, a resume identifier, and/or a cell identifier received from the wireless device. In response to fetching a UE context, a base station may transmit a path switch request for a wireless device to a core network entity (e.g. AMF, MME, and/or the like). A core network entity may update a downlink tunnel endpoint identifier for one or more bearers established for the wireless device between a user plane core network entity (e.g. UPF, S-GW, and/or the like) and a RAN node (e.g. the base station), e.g. changing a downlink tunnel endpoint identifier from an address of the anchor base station to an address of the base station.

A base station may communicate with a wireless device via a wireless network employing one or more new radio technologies. The one or more radio technologies may comprise at least one of: multiple technologies related to physical layer; multiple technologies related to medium access control layer; and/or multiple technologies related to radio resource control layer. Example embodiments of enhancing the one or more radio technologies may improve performance of a wireless network. Example embodiments may increase the system throughput, or data rate of transmission. Example embodiments may reduce battery consumption of a wireless device. Example embodiments may improve latency of data transmission between a base station and a wireless device. Example embodiments may improve network coverage of a wireless network. Example embodiments may improve transmission efficiency of a wireless network.

In an example, a base station may transmit one or more RRC messages. The one or more RRC messages may comprise a measurement configuration for a cell group (e.g., master cell group, secondary cell group, a cell group, or a CG). The measurement configuration may further comprise a list of measurement objects, a list of measurement report configurations, a list of measIds (e.g., a measId may configure a linkage between a measurement object and a report configuration), a s-MeasureConfig, and/or a Measurement-GapConfiguration. If configured, one or more parameters of s-MeasureConfig may comprise a reference signal type (e.g., SSB (SS block, or synchronization signals block) or CSI-RS) used for RRM measurement of a serving cell (e.g., a PCell, a sPCell) and/or a threshold value (e.g., s-Measure).

A wireless device may perform RRM measurements on a measurement object of a carrier frequency of the serving cell regardless of s-MeasureConfig. When the wireless device is configured with a s-MeasureConfig in the cell group, the wireless device may determine whether to perform or skip RRM measurements on the list of measurement objects based on the one or more parameters of s-MeasureConfig. For example, the wireless device may be configured with a threshold (e.g., s-Measure) of ssb-RSRP (a RSRP threshold value based on measurements on SSBs) or csi-RSRP (a RSRP threshold value based on measurements on CSI-RSs). The wireless device may perform RRM measurements on the one or more measurement objects when the measured quality (e.g., L3 filtered ssb-RSRP, or L3-filtered csi-RSRP) of the serving cell is lower than the threshold. The wireless device may skip RRM measurements on the one or more measurement objects when the measured quality of the serving cell is equal to or greater than the threshold.

The wireless device may perform or may not perform RRM measurement based on the list of measurement objects added under the measurement configuration depending on s-MeasureConfig (if any). If s-MeasureConfig is not configured, the wireless device may perform RRM measurement based on the one or more measurement objects. A measurement object (e.g., measObject) may comprise an ARFCN-value (e.g., a frequency (layer) information), a subcarrier spacing information, one or more SMTCs (SSB-measurement time configurations), CSI-RS measurement configurations, SSB measurement configurations, a list of white cells, and/or a list of black cells. The ARFCN-value and the subcarrier spacing may be used by the wireless device to determine a frequency layer/location and a subcarrier spacing of the configured measurement reference signals (e.g., SSB(s) or CSI-RS(s)). A measurement report configuration (e.g., ReportConfig) may comprise a report type (e.g., between periodic or event-triggered or report-CGI). For example, with a periodic report type is configured, a base station may configure a reference signal type, report interval and/or report amount. A wireless device may report periodic RRM reports based on the configuration. For example, when an event triggered report type is configured, a base station may further configure one or more events associated with the measurement report configuration. A measurement report configuration may comprise a list of events (one or more events), a reference signal type (e.g., SSB or CSI-RS) to measure, report interval and/or report amount.

A wireless device may transmit one or more RRM measurements when one or more conditions from the configured events associated with the measurement report configuration (e.g., ReportConfig, report configuration) are satisfied. When a reportCGI type is configured, a wireless device may report RRM measurements when the configured cell(s) with the reportCGI is detected.

A measId may link between a measurement object (e.g., measObject) and a report configuration (e.g., a ReportConfig) where a wireless device may collect RRM results based on the measurement object and the report configuration linked in each measId.

For an event-triggered type of a report configuration, a base station may define a set of events such as A1 event (A1), A2 event (A2), A3 event (A3), A4 event (A4), A5 event (A5), A6 event (A6), B1 event (B1), or B2 event (B2). For example, a wireless device may consider an A1 event (e.g., serving cell becomes better than threshold) is satisfied when the wireless device may detect that a condition of A1 event has been satisfied for a time period longer than a configured duration. The wireless device may consider that the condition of A1 event is satisfied when RRM result (e.g., ssb-RSRP, csi-RSRP) of the serving cell is greater than {a threshold (e.g., a configured threshold value for the event)–Hysteresis (e.g., a configured hysteresis)}. The wireless device may consider that the condition of A1 event is not satisfied when RRM result of the serving cell is smaller than {the threshold+Hysteresis}. A wireless device may receive a configured value of threshold and hysteresis in a report configuration.

For example, a wireless device may consider an A2 event (e.g., serving cell becomes worse than threshold) is satisfied when the wireless device may detect that a condition of A2 event has been satisfied for a time period longer than a configured duration. The wireless device may consider that the condition of A2 event is satisfied when RRM result of the serving cell is smaller than {a threshold (e.g., a configured threshold value for the event)–Hysteresis (e.g., a configured hysteresis)}. The wireless device may consider that the condition of A2 event is not satisfied when RRM result of the serving cell is greater than {the threshold+Hysteresis}. A wireless device may receive a configured value of threshold and hysteresis in a report configuration.

For example, a wireless device may consider an A4 event (e.g., neighbor cell becomes better than threshold) is satisfied when the wireless device may detect that a condition of A4 event has been satisfied for more than a configured duration. The wireless device may consider that the condition of A4 event is satisfied when RRM result of a first neighbor cell is greater {a threshold (e.g., a configured threshold value for the event)+Hysteresis (e.g., a configured hysteresis)–a first offset (e.g., a measurement object specific of a frequency, e.g., offsetMO)–a second offset (e.g., a measurement object specific offset of a neighbor cell, e.g., cellIndividualOffset)}. The first cell is determined from a list of cells detected in a frequency of a measurement object, which is associated with a report configuration where the event A4 is configured in the report configuration. The wireless device may consider that the condition of A4 event is not satisfied when RRM result of a second neighbor cell is lower than {the threshold+Hysteresis–the first offset–the second offset}. A wireless device may receive a configured value of threshold, hysteresis, the firs offset, and/or the second offset in a report configuration.

In legacy systems, a base station may configure a set of measurement objects for a set of frequencies (or a set of frequency layers), where one or more measurement objects may be configured for a frequency (or a frequency layer), for a wireless device to perform measurements. The wireless device is expected to perform radio resource management (RRM) measurements according to the set of measurement objects for the set of frequencies. One or more results of RRM measurements may be used for determination of one or more handover conditions, selection of one or more SCells, selection of a SCG, and/or the like. The base station may configure a report configuration associated with a measurement object where the report configuration may indicate one or more reporting based on one or more events or based on periodic triggering.

A wireless device may support more and more frequencies to support higher demands on data rates with advanced technology. In particular, a higher frequency spectrum (e.g., 28 GHz) may have wide bandwidth which may lead more numbers of measurement objects for a wireless device to measure in that frequency spectrum. With more frequency bands to support and more measurement objects per frequency region/spectrum/band, a burden on RRM measurements of a wireless device may increase. In many cases, a wireless device may perform RRM measurements based on a measurement gap. The increased burden on the measurement may require a larger measurement gap or more frequent measurement gaps to measure more measurement objects. As a wireless device may get a service interruption during a measurement gap, this may degrade overall performance of the wireless device. A wireless device may consume more power in performing measurements with more measurement objects to measure. To efficiently support more frequency bands by a wireless device, there is a need to enhance an RRM measurement.

In an example, a wireless device may skip one or more measurements on one or more frequencies based on a base station configuration (e.g., a plurality of conditions for a plurality of measurement objects). For example, a base station may operate a hot-spot operation where one or more first frequencies may be available only in one or more hot-spot locations. The base station may configure to measure the one or more first frequencies for a wireless device when the wireless device may be in a region of a hot-spot. For example, a wireless device may determine whether the wireless device is in the region of a hot-spot based on a location information of the wireless device. The base station may indicate one or more configured regions associated with one or more measurement objects. The one or more configured regions may indicate a set of locations where the wireless device may be in proximity of one or more of hot-spot TRPs (transmission and reception points). For example, a wireless device may determine whether the wireless device is in the region of a hot-spot based on one or more RRM results on one or more second frequencies configured by the base station. The base station may configure the one or more second frequencies from the one or more first frequencies. For example, if the one or more RRM results show good qualities, the wireless device may determine the wireless device is in the proximity of hot-spot TRPs.

In an example, a base station may configure one or more conditions for a measurement object. A wireless device may start RRM measurements on the measurement object when the one or more conditions are satisfied. The wireless device may stop RRM measurements on the measurement object otherwise. In an example, the wireless may start RRM measurements on the measurement object when the one or more conditions are not satisfied. The wireless device may stop RRM measurement on the measurement object when the one or more conditions are satisfied. By allowing a wireless device to skip unnecessary measurements, the wireless device may reduce a power consumption and may reduce unnecessary interruptions such as measurement gaps. For example, the wireless device may use the configured measurement gaps for some other services (e.g., sidelink services, V2X services, different systems, etc.) or perform a micro-sleep (e.g., sleep during a measurement gap). For example, a base station may configure one or more measurement gap configurations where different measurement gap configuration may be applied depending on active measurement objects. Based on starting and stopping RRM measurements on a frequency dynamically based on one or more conditions, a wireless device may skip unnecessary RRM measurements while the wireless quickly start performing RRM measurements and provide the results to a base station when situations change.

Figure 16:
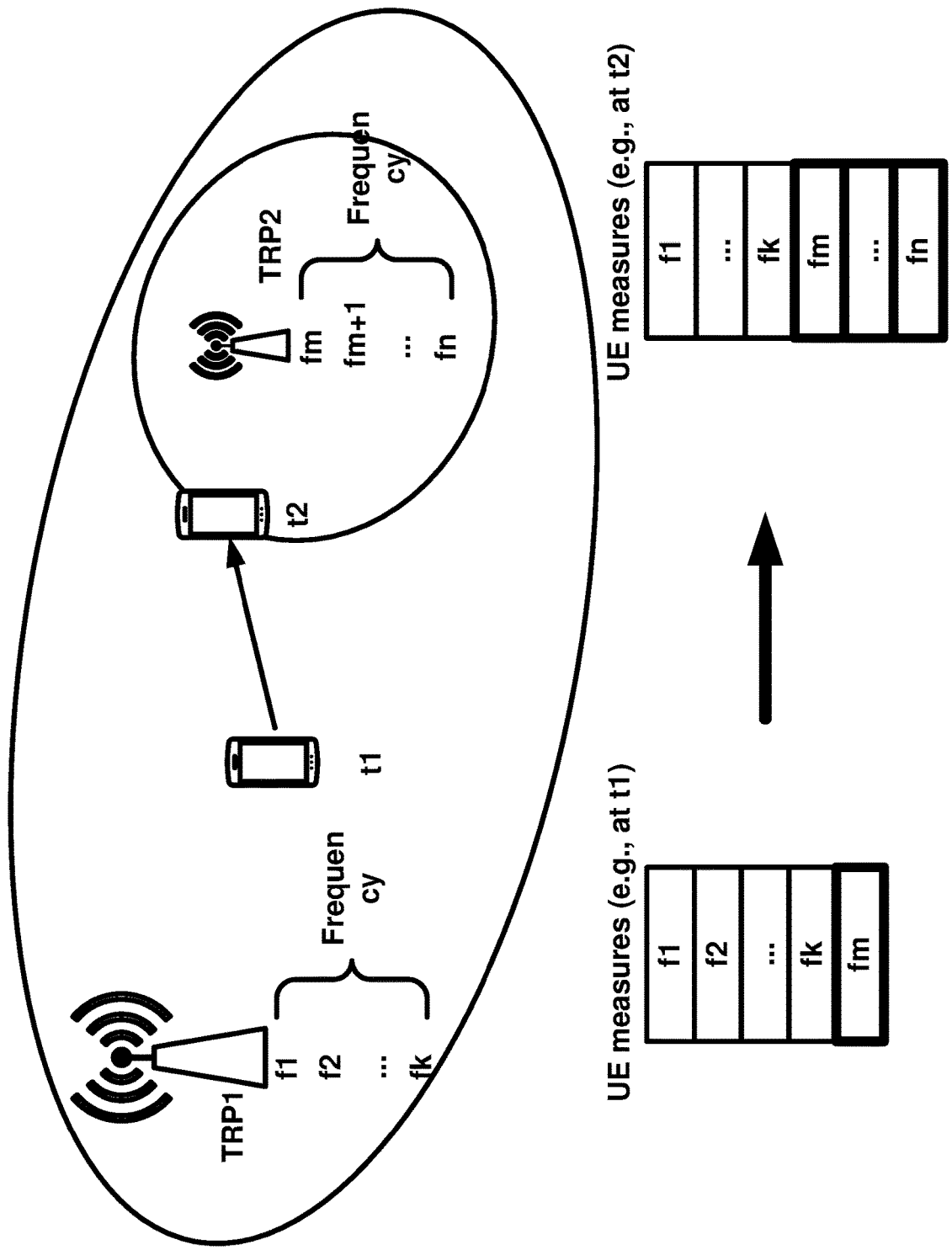
FIG. 16 is a diagram of an embodiment with a heterogeneous carrier aggregation scenario.

FIG. 16 illustrates an example of an embodiment. A wireless device may receive configuration parameters of one or more measurement objects for one or more frequencies (or frequency layers or carriers) of f1, f2, ..., fk, fm, fm+1, ..., and fn. A base station may operate a large coverage distributed unit (DU) and a remote distributed unit (DU) (or a remote radio head) with a small coverage for a hot-spot region. The base station may operate using a first TRP (e.g., a DU operating in one or more low frequencies, TRP1) and a second TRP (e.g., a DU operating in one or more high frequencies, TRP2) for a different set of frequencies (e.g., TRP1 operates in f1, f2, ..., and fk and TRP2 operates in fm, fm+1, ..., and fn). The wireless device may reside in a first location where the wireless device may not in a communication range of the second TRP at a time t1. The wireless device may move to the hot-spot region where the wireless device may be able to communicate with the second TRP (TRP2) at another time t2. When the wireless device moves out-of-range from TRP2 (e.g., at the time t1), it may not be effective for the wireless device to perform measurements on one or more frequencies of TRP2 (e.g., fm, fm+1, ..., fn). The wireless device may not detect any cell in such frequencies until it moves in the communication range of TRP2.

Considering a UE power consumption and potential benefits of the measurements, it would be beneficial for the wireless device to perform RRM measurements on the frequency of f1, f2, ..., fk when the wireless device is in a communication range of TRP1 only (e.g., at the time t1), and perform RRM measurements on the frequency of f1, f2, ..., fk, fm, fm+1, ..., fn when the wireless device is in a communication range of TRP2 and in a communication range of TRP1 (e.g., at the time t2). In FIG. 16, the base station may configure one or more first measurement objects on f1, f2, ..., fk, and fm in time t1. The base station may reconfigure one or more second measurement objects on f1, f2, ..., fk, fm, ..., and fn in time t2. To reconfigure the one or more second measurement objects, first, the base station needs to acquire information that the wireless device moves to a proximity of TRP2. For example, the base station may acquire this information from a location information of the wireless device if the wireless device provides the information. For example, the base station may acquire this information from a measurement report on the frequency fm when the base station may have configured a periodic reporting or an event triggering via a report configuration associated with a measurement object for the frequency fm.

In an example, in some cases, in a mechanism based on a UE feedback to inform that one or more conditions may have been changed for a new set of measurement objects (e.g., moves to a proximity of the second TRP, moves to a hot-spot area, higher traffic demands, etc.), there is a considerable latency between a first time when the one or more conditions occur and a second time when the base station acquires the information about the events. In response to the events, the base station may need to reconfigure the measurement objects, which may increase the overall latency further. With a high frequency, a cell coverage becomes smaller, and the overall time that a wireless device stays in a proximity of a cell with the high frequency may become shorter specially when the wireless device moves quickly. In that sense, relying on a UE feedback and RRC reconfiguration by the base station may not be so effective to address the necessity of supporting different sets of measurement objects corresponding to different situations/conditions/ events in fast time-varying conditions.

Figure 17:
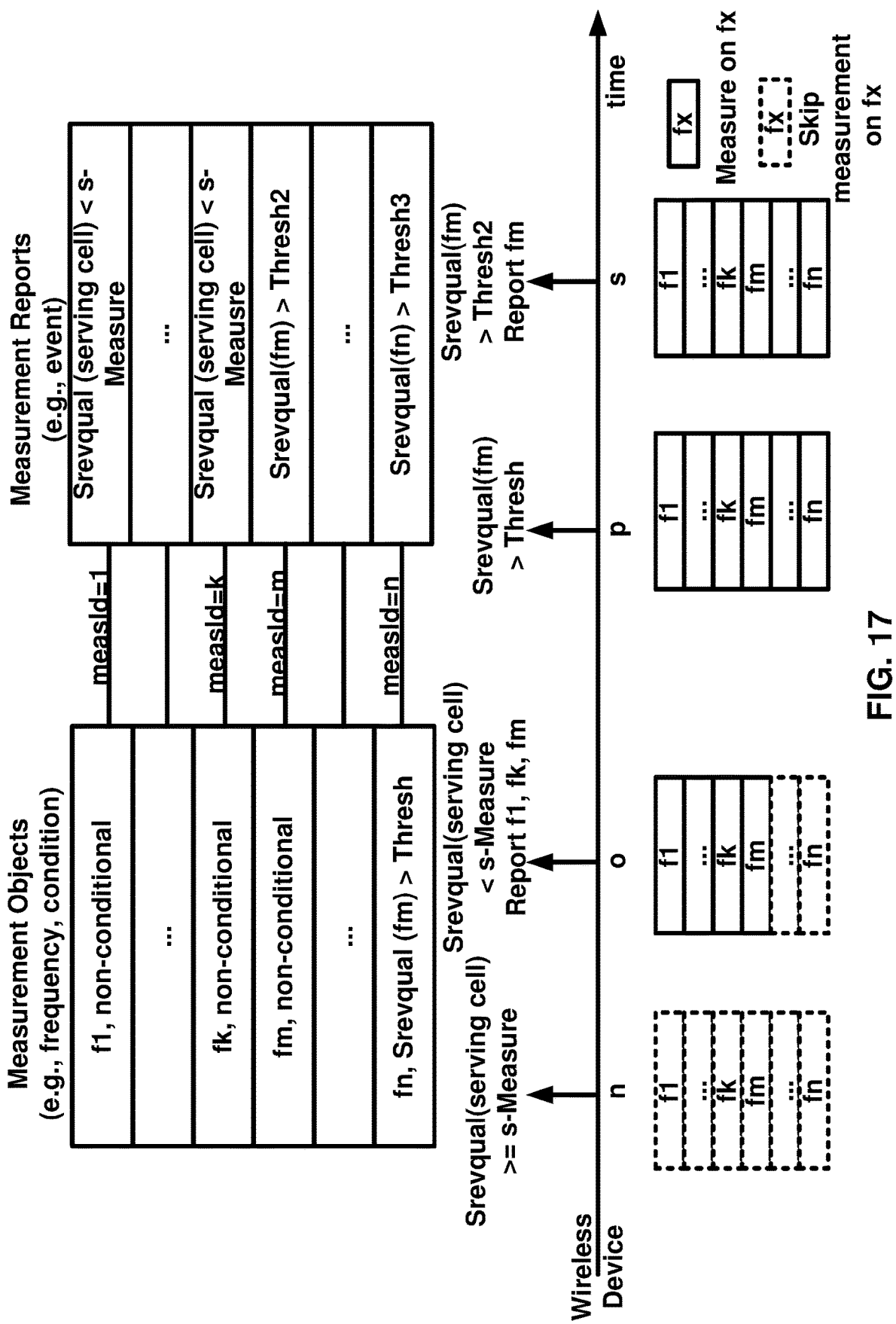
FIG. 17 is a diagram of an embodiment on conditional measurements based on measurement objects configurations.

In an embodiment, a base station may configure one or more conditions for a first measurement object where a wireless device may start or stop measurements on measurement objects based on the one or more conditions. FIG. 17 illustrates an example of condition configurations for a plurality of measurement objects. For example, a base station may configure a measurement config (e.g., MeasConfig) for a cell group (e.g., MCG or SCG). The measurement config (e.g., MeasConfig) may comprise one or more measurement objects on a set of frequency (e.g., f1, f2, ..., fk, fm, ..., fn) and/or s-MeasureConfig. The base station may configure no additional measurement condition for measurement objects of frequency f1, f2, ..., fk, and fm. A wireless device performs RRM measurements on the frequency f1, f2, ..., fk, and fm, based on the configuration and/or s-MeasureConfig. The base station configures a measurement condition for measurement objects on frequency of fm+1, ..., and fn. The measurement condition may comprise a threshold wherein if a signal quality of a frequency fm is better than the threshold (e.g., Srevqual (fm)>Thresh), the wireless device may perform RRM measurements on the frequency fm+1, ... and fn. The wireless device may perform RRM measurements on the frequency fm+1, ..., and fn based on s-MeasureConfig and the signal quality of the frequency fm. The wireless device may skip RRM measurements on the configured measurement objects of frequency f1, ..., fk, fm, ..., fn in response to a quality of a serving cell (e.g., a primary cell) being equal to or greater than s-Measure at a time n.

The wireless device may start RRM measurements on the measurement objects of the frequency f1, ..., fk, and fm when the serving cell quality becomes lower than s-Measure. Based on one or more report configurations (e.g., Srevqual(serving cell)<s-Measure for frequency f1, ..., fk), the wireless device may report RRM results on the frequency of f1, f2, ..., and fk at a time o. The wireless device performs RRM measurements on the frequency of f1, f2, ..., fm, fm+1, ..., and fn at time p in response to detecting that the signal quality of the frequency fm becomes better (e.g., the signal quality of frequency fm becomes larger than or equal to the Thresh) than a threshold value (e.g., Thresh). The wireless device triggers RRM results on the frequency of fm at time s based on an event that quality of the frequency fm is better than a threshold value (e.g., Thresh2), based on a measurement report corresponding to the frequency fm (e.g., Srevqual(fm)> Thresh2). For example, a first threshold value (e.g., Thresh) that is lower than a second threshold value (e.g., Thresh2) may be used to trigger one or more measurements. The second threshold value may be used to trigger RRM reports on the frequency fm. The wireless device may trigger reporting of a measurement report on frequency fn in response to a serving cell quality of the frequency fn becomes better than a third threshold value (Thresh3).

A wireless device may determine performing RRM measurements or skipping RRM measurements for a measurement object from the one or more measurement objects. The wireless device may perform RRM measurements on one or more first measurement objects while may skip RRM measurements on one or more second measurement objects, wherein the one or more first measurement objects and the one or more second measurement objects belong to the one or more measurement objects. In an example, the wireless device may determine whether to perform RRM measurements on a first measurement object of the one or more second measurement objects based on a set of conditions.

In an example, the wireless may perform RRM measurements on the first measurement object of a frequency when a first criteria and a second criteria are met. For example, an example of the first criteria may comprise/include: (a) s-MeasureConfig is not configured for the measurement configuration (e.g., MeasConfig for the cell group), or (b) s-MeasureConfig is set with a first threshold value of ssb-RSRP and L3-filered RSRP values based on measurements on SSBs of a PCell (if the cell group is MCG) or SSBs of a sPCell (if the cell group is SCG) are lower than the first threshold value (e.g., ssb-RSRP), or (c) s-Measure is set with a second threshold value of csi-RSRP and L3-filered csi-RSRP values based on measurements on CSI-RSs of the PCell (if the cell group is MCG) or CSI-RSs of the sPCell (if the cell group is SCG) are lower than the second threshold for csi-RSRP (e.g., csi-RSRP). An example of the second criteria may comprise/include: the first criteria are met (e.g., s-MeasureConfig is not configured) and the one or more conditions configured to the first measurement object are satisfied. For example, the second criteria may comprise the one or more conditions configured for the first measurement object, wherein the wireless device may initiate measurement based on the first measurement object in response to the one or more conditions are being met.

In an example, a base station may configure a first condition to a measurement object. For example, the first condition may be satisfied when RRM results (e.g., L3-filered RSRP values based on measurements on SSBs) of a cell in a second frequency layer is better than a threshold value. The base station may configure the first condition which comprises a threshold value of ssb-RSRP (or csi-RSRP) and a measurement object index (e.g., measObjectID). A wireless device may assume that the first condition is satisfied when L3-filered SSB-based RSRP (or CSI-RS based RSRP) result of a selected cell (e.g., a best quality cell, a candidate cell) in a frequency (or a frequency layer) indicated by the measObjectID is equal to and/or greater than the threshold of ssb-RSRP (or csi-RSRP).

For example, in FIG. 17, the base station configures a first condition on a measurement object for a frequency of fn. In the example, the wireless device may consider the first condition (e.g., a second criteria) is satisfied when a RSRP quality (e.g., ssb-RSRP) of the frequency fm is equal to and/or better than Thresh (e.g., a configured threshold value). When there is no serving cell in the frequency fm, the RSRP quality of a selected cell in the frequency (or frequency layer) may be used to determine the satisfaction of the condition. The wireless device may not initiate RRM measurements on the frequency fn when the RSRP quality of the selected cell in frequency fm is equal to and/or lower than the configured threshold (e.g., Thresh). The wireless device may consider that the second criteria is met for a measurement object when there is no condition configured for the measurement object. For example, a s-MeasureConfig may be configured in a MeasConfig for a cell group. A base station may configure the MeasConfig, where configuration parameters of the MeasConfig may be applied to one or more cells of the cell group. For example, the wireless device may skip measurements on all measurement objects of the cell group when a signal quality of a serving cell/a primary cell (e.g., PCell in MCG or sPCell in SCG) is equal to or greater than s-Measure (e.g., a threshold value configured in the s-MeasConfig). For example, the wireless device may skip measurements other than the primary cell/serving cell in response to the signal quality of the primary cell is equal to or better than the configured s-Measure (threshold value). When the serving cell quality becomes lower than (and/or equal to) the s-Measure, the wireless device may perform RRM measurements on the f1, . . . , fk and fm based on that one or more measurement objects with f1, . . . , fk and fm are not configured with one or more conditions for the second criteria. The wireless device may not perform RRM on a measurement object for fn as a quality of fm may not satisfy the configured threshold. In response to detecting the quality of fm becomes equal to or better than the configured threshold (e.g., Thresh), the wireless device may start/initiate RRM measurements based on the measurement object of fn.

In an example, a first condition for a second criteria may reuse one or more events defined for a measurement report configuration (e.g., A1, A2, . . . , A6, B1, or B2). For example, a condition with one or more parameters, based on a set of parameters (e.g., a threshold (e.g., ssb-RSRP, csi-RSRP, Hysteresis) used for defining A1 event of a report configuration, may be configured to a measurement object. For example, a base station may configure A1 as a first condition for a measurement object where the first condition may comprise a reference signal type for RRM measurement, a threshold value, and/or a Hysteresis value. A wireless device may assume that a serving cell is a PCell (if a cell group is MCG) or a sPCell (if a cell group is SCG) or a PCell (if a stand-alone without dual connectivity) at least when A1 or A2 is configured as the first condition for the second criteria. Note that a standalone operation without dual connectivity is assumed as the same operation to a master cell group. In response to configuring with a condition based on A1 event for a measurement object, the wireless device may perform RRM measurements on the measurement object when the serving cell quality (e.g., L3-RSRP based on SSBs of the serving cell) becomes better than {a threshold value–Hysteresis}. When a condition based on A4 event is configured for a measurement object, a wireless device may also expect a measurement object index or a frequency information where measurements on one or more neighbor cells are performed. For a first measurement object where a condition based on A4 event type is configured, the wireless device may be configured with a second measurement object ID (e.g., a second measObjectID).

The wireless device may perform RRM measurements on the first measurement object if the measurement result of the second measObjectID satisfies the condition of A4. For example, a neighbor cell in the frequency indicated by the second measObjectID may achieve better quality than a configured threshold value, the wireless device considers that the conditions for the first measurement object may be satisfied. Based on the conditions are being met, the wireless device may initiate performing RRM measurements on the first measurement object. In case same parameters to determine A4 event are configured for the first condition of the first measurement object and the A4 event of a report configuration associated with the second measObjectID, when an event is triggered on the second measObjectID based on A4, the wireless device may start RRM measurements based on the first measurement object.

When the wireless device may leave the condition for example based on A4 event for the second measurement object (e.g., second measObjectID), the wireless device may stop measurements based on the first measurement object. For example, the conditions are not being satisfied any longer, the wireless device may stop performing measurement based on the first measurement object. Similarly, when a base station may configure a first condition for a measurement object based on A5 event type with a frequency or a measObjectID, wherein a second measurement object indicated by the measObjectID or the frequency may be used to determine a quality of neighbor cell. For example, a base station may configure a first condition based on A6 event type for a measurement object. The base station may configure an SCell index that will be used in determining whether the first condition has been satisfied, and a measObjectID, wherein a wireless device may perform measurements based on a second measurement object indicated by the measObjectID to identify a neighbor cell. In an example, a base station may configure a first condition based on B1 event type or B2 event type for a measurement object. In configuring a first condition based on an event type, the base station may configure one or more parameters used in determining entering/leaving (satisfying/not-satisfying) conditions of the event (e.g., a threshold value, measurement reference signal type, Hysteresis, offset values, and/or the like).

In an example, a base station may configure a measurement object index (e.g., measObjectID) of a second measurement object as a first condition for a first measurement object. In response to receiving the measurement object index as the first condition, a wireless device may determine one or more events are satisfied based on the second measurement object indicated by the measurement object index. The wireless device may start performing RRM measurements based on the first measurement object in response to the one or more events associated with the second measurement object being satisfied. For example, the base station may configure A4 event for the second measurement object for a measurement report triggering condition. In response to triggering the measurement report based on the A4 event of the second measurement object, the wireless device may report the measurement report based on the second measurement object. The wireless device may start measuring one or more reference signals based on the first measurement object in response to entering/satisfying the A4 event of the second measurement object. For example, the wireless device may be configured with one or more measurement report triggering conditions for the second measurement object. The wireless device may trigger/initiate measurement reporting based on the second measurement object in response to the one or more measurement reporting conditions being entered/satisfied. The wireless device may initiate performing measurements based on the first measurement object in response to the one or more measurement reporting conditions being entered/satisfied. In the example, the wireless device may perform RRM measurements on the first measurement object when one or more events configured in a report configuration associated with the second measurement object is satisfied (e.g., the event is in entering state). In the example, the wireless device may skip RRM measurements on the first measurement object when the event configured in a report configuration associated with the second measurement object is not satisfied (e.g., the event is in leaving state).

This may reduce additional signaling overhead. In the example, the wireless device may not expect to receive a second measObjectID of a third measurement object as the first condition of the first measurement object, wherein the third measurement object is associated with a periodic reporting configuration. The wireless device may consider a measurement object configured with aperiodic/event triggering measurement reporting configuration may be configured as the first condition of the first measurement object.

In an example, a base station may configure first condition(s) of a first measurement object based on traffic demands. The traffic demands may be determined by a wireless device and/or by the base station. For example, the first condition(s) may comprise one category of one or more traffic demands categories, wherein the one or more traffic demands categories may comprise no traffic, low traffic, medium traffic and/or high traffic. Each category may have a certain range of bits/sec or data rate or buffer status level or latency requirement or a set of applications. The base station may configure one or more parameters and values for each category. For example, the base station may configure {a value of a latency threshold, a value of resource utilization, a value of QoS threshold, etc.} where a different set of values/parameters may be associated with a category. For example, a high traffic category may be associated with a high level of QoS. In an example, a wireless device may determine a category based on information available within the wireless device. Based on the set of values/parameters configured by the base station or based on the internal information, the wireless device may determine whether the first condition(s) are satisfied or not. The wireless device may perform RRM measurements on the first measurement object in response to the determining.

In an example, a base station may configure first condition(s) of a first measurement object based on a power state. For example, the base station and a wireless device may support a first power state, a second power state, . . . , and/or a K-th power state. In the example, the first power state is assumed to be a most power saving state. In the example, the K-th power state is assumed to be a normal mode operation. In an example, K may be two (2). In an example, K may be three (3). In response to receiving the first condition(s) as one of power saving states, the wireless device may perform RRM measurements based on the first measurements when the current power state of the wireless device in the cell group is the indicated first condition or the above (e.g., a wireless device performs RRM measurements based on the first measurement object, wherein a first condition is the second power state and the current power state of the wireless device is the third power state). The base station may adapt a number of measurement objects monitored/measured in each power state based on the mechanism. The wireless device may reduce power consumption with a power saving state (e.g., first power state) when the base station may configure a small number of measurement objects with a condition of the first power state.

In an example, a base station may configure one or more first conditions from one or more operation/deployment scenarios for a first measurement object. For example, the one or more operation/deployment scenarios may comprise at least one of: (a) a wireless device is configured with a carrier aggregation with more than N active cells (e.g., N=4) across one or more CGs, (b) a wireless device is configured with a carrier aggregation with more than M active cells (e.g., M=2) without a dual connectivity across different radio access technologies (RATs), (c) a wireless device is configured with a dual connectivity across a same RAT, (d) a wireless device is configured with a dual connectivity across different RATs, a wireless device is activated with more than M active cells (e.g., M=2) at least in a cell group where a dual connectivity is configured, (e) a wireless device is configured activated with a single cell, (f) a wireless device is configured/activated with a single cell and a current active BWP is a default BWP, (g) a wireless device is configured/activated with a long DRX cycle, (h) a wireless device is configured/activated with more than one TRP in at least one cell, and/or the like. The wireless device may perform RRM measurements on the first measurement object when the configured first conditions are satisfied. For example, the first condition may be configured that a wireless device is configured/activated with a single cell. The wireless device may initiate measurements based on the first measurement object wherein wireless device is not configured with a carrier aggregation or dual connectivity and the wireless device is configured/activated with a single cell.

In an example, a base station may configure one or more first condition on a measurement object from one or more UE assistance information related to overheating issue. In an example, the base station may configure a first condition as a lack of an event with an overheating triggering (e.g., the first condition may be entered/satisfied in response to lack of the overheating event or the first condition being released/not-satisfied in response to triggering the overheating event). A wireless device may assume that the first condition may not be satisfied when the wireless device triggers an overheating related issue (may inform the event to the base station) (e.g., the wireless device may request lowering a number of cells or the wireless device may request a number of MIMO layers). When the wireless device may report a normal operation to the base station (e.g., no overheating occurs), the wireless device may determine/assume that the first condition is satisfied. In response to determining/assumption, the wireless device may initiate performing RRM measurements based on the first measurement object. In the example, the wireless device may perform RRM measurements based on the first measurement object when the wireless device does not experience any overheating issue.

In an example, a first condition for a second criteria to determine whether to perform RRM measurements on a measurement object may be a (geographical) region (e.g., [x1, x2], [y1, y2], may also include [z1, z2], where x1 and x2 may represent a starting and an ending latitude, y1 and y2 may represent a starting and an ending longitude, and z1 and z2 may represent a starting and an ending elevation) for example based on a GPS coordinate. When a wireless device may detect its current GPS coordination may belong to the configured region for the second condition, the wireless device may start RRM measurements based on the measurement object. The wireless device may stop RRM measurements on the measurement object when the wireless device moves out from the configured region.

In an example, a first condition for a second criteria may be a range of moving speed of a wireless device (e.g., [s1, s2] where s1 is a minimum speed e.g., m/s, and s2 is a maximum speed e.g., m/s). For example, a first criteria may be determined based on a configuration of s-MeasureConfig. The wireless device may start RRM measurements on the measurement object when the first criteria is satisfied (e.g., a signal quality of a serving cell or a primary cell is below than a configured s-Measure by the s-MeasureConfig) and the first condition of the second criteria is satisfied. For example, the wireless device may determine whether the first condition is satisfied based on the internal measurement on a UE speed. For example, the wireless device may determine the first condition is satisfied that the UE speed may be within the range of moving speed. In an example, a first condition may be a 'low speed' or 'high speed' where a low speed may be defined in a constant value (e.g., 3 km/h) and a high speed may be defined in another constant value (e.g., 30 km/h). If the low speed is configured as the first condition, the wireless device may start/initiate/performs RRM measurements when the moving speed of the wireless device becomes lower than or equal to the low speed (e.g., 3 km/h). For example, when the high speed is configured as the first condition, the wireless device may initiate/start/perform RRM measurements when the moving speed of the wireless device becomes higher than or equal to the high speed (e.g., 30 km/h). A condition of starting a measurement at the low speed and stopping a measurement at the high speed (e.g., a speed in a range of [a low speed, a high speed]) may be configured as a second condition to a wireless device. For example, the wireless device may perform the measurements when the UE speed is between the low speed and the high speed (e.g., between 3 km/h and 30 km/h).

In an example, a first condition for a second criteria may be a first tracking area code. A wireless device may start RRM measurements based on a measurement object configured with the first condition when the configured first tracking area code matches to a tracking area code advertised by PCell (if a cell group is MCG) or sPCell (if the cell group is SCG) or by a lowest indexed serving cell. A region or a zone ID advertised by a serving cell may be also used. The wireless device may not perform or may stop RRM measurement based on the measurement object in response to the tracking area code advertised by the PCell or sPCell or the lowest indexed serving cell being different from the first tracking area code.

Figure 18:
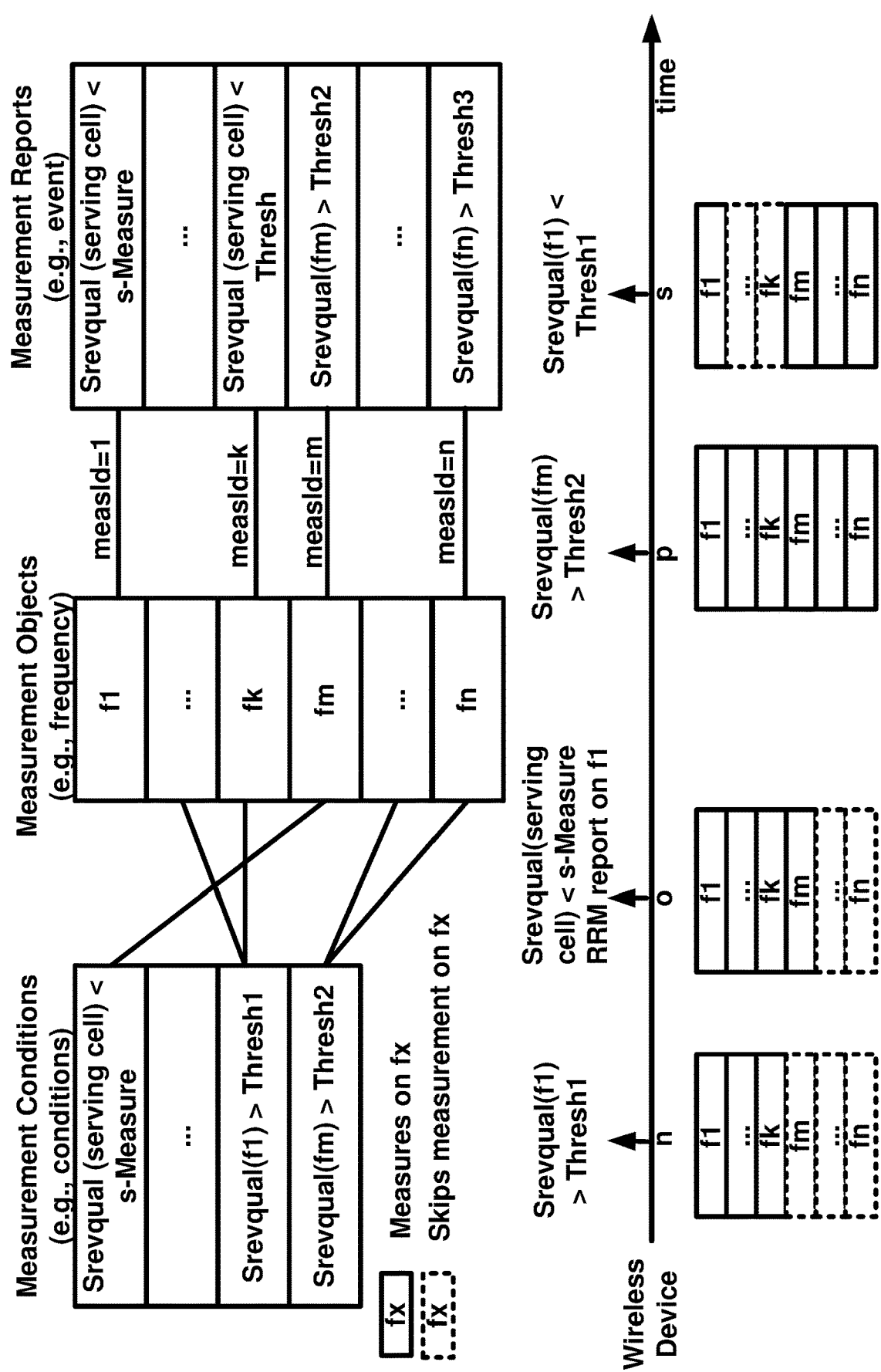
FIG. 18 is a diagram of an embodiment on conditional measurements based on measurement conditions configurations.

In an example, one or more first conditions for a second criteria may be configured independently from one or more measurement objects. A base station may associate a first condition to a measurement object. For example, the base station may configure a first condition index from the one or more first conditions in a measurement object configuration to configure a first condition for the measurement object. FIG. 18 illustrates an example of an embodiment where a base station may associate one or more first conditions for a measurement object via mapping between a set of conditions and a set of measurement objects. The base station may configure a set of conditions, wherein a condition of the set of conditions may comprise measurement reference signal, a threshold value, and/or a target frequency or cell. For example, a first condition is a similar to s-MeasureConfig wherein the first condition may be satisfied when a signal quality of a serving cell (a PCell or sPCell) is lower than a threshold value (e.g., s-Measure) based on measurements on SSBs or CSI-RSs. For example, a second condition may be satisfied when a signal quality of a selected cell becomes higher than (or equal to) a threshold value (e.g., Thresh1) in a frequency of f1. For example, a third condition may be satisfied when a signal quality of a selected cell of a frequency fm becomes higher than (or equal to) a second threshold value (e.g., Threshd2).

The base station may associate the first condition to a measurement object of a frequency fm. The base station may associate the second condition to a measurement object of a frequency fk. The base station may associate the third condition to a measurement object of a frequency fn. The base station may configure one or more report configurations. For example, a report configuration where an event is satisfied when a signal quality of a serving cell is lower than a threshold value (e.g., Thresh) may be associated with the measurement object of the frequency fk. The base station may map one or more measurement report configurations for a measurement object. In FIG. 18, the base station may map a measurement object and a measurement report configuration based on a measId. FIG. 18 illustrates a one-to-one mapping between each measurement object of the measurement objects and each measurement reporting configuration of the measurement reports.

Based on the association, the wireless device may perform RRM measurements on the frequency of f1, . . . , and fk in a time n in response to a serving cell quality of the frequency f1 being higher than a first threshold (Thresh1). The wireless device may not perform measurements on the frequency fm at the time n in response to the serving cell quality of a serving cell (e.g., the serving cell is in f1) is equal to or higher than a s-Measure. The wireless device initiate RRM measurements on the frequency fm in response to detecting that a serving cell quality becomes lower than s-Measure at a time o. The wireless device may continue measurements on the frequency of f1, . . . , fk at the time o in response to a condition (Srevqual(f1)>Thresh1) being satisfied. The wireless device may trigger RRM reports based on a measurement object of the frequency f1 at the time o based on a measurement report configuration (e.g., Srevqual(serving cell)<s-Measure) associated with the measurement object of the frequency f1. The wireless device performs measurements on the frequency of fm+1, . . . , and fn at a time p in response to a signal quality of a frequency fm becomes better than Thresh2 based on a measurement condition (Srevqual(fm)>Thresh2) associated with a measurement object of the fm+1, . . . , fn. The wireless device may continue measurements on frequency of f1, . . . , fk, and fm at the time p in response to the signal quality of the frequency of f1 is higher than the Thresh1 and the signal quality of the serving cell is lower than the s-Measure. The wireless device may stop measurements on the frequency of f2, . . . , fk and may continue performing measurements on f1, fm, fm+1, . . . , and fn at a time s in response to the signal quality of f1 becomes lower than Thresh1. The wireless device may skip RRM measurement on the measurement objects of the condition that has not been satisfied, e.g., the wireless device may skip measurements based on the measurement object of the frequency f2, . . . , and fk at the time s.

In an example, a wireless device is configured with a condition where a signal quality of a selected cell in a frequency fx is higher than a threshold value. In determining whether the condition is satisfied or not when the wireless device may have not detect any cell in the frequency fx, the wireless device may assume a minimum quality for this case for a cell. In response to detecting no cell in a frequency, the wireless device may assume that a condition based on the measurement results may not be satisfied.

In an example, a base station may transmit one or more RRC messages comprising one or more measurement conditions, one or more measurement objects, and/or one or more measurement report configurations. The base station may configure, in a measId, one or more first conditions from the one or more measurement conditions, a measurement object, and one or more measurement report configurations. In an example, the base station may configure indices for one or more first conditions from the one or more measurement conditions in a measurement object. The base station may use a measId to linkage between a measurement object and a report configuration. When there are more than one first conditions associated/configured with a measurement object, a wireless device may perform RRM measurements on the measurement object when any condition from the first conditions is met and may skip RRM measurements when all of the first conditions are not satisfied. When there are more than one report configurations associated with a measurement object, a report may be triggered at least one report configuration is satisfied.

In an example, s-MeasureConfig may be considered as a measurement condition configuration. A base station may configure one or more parameters of s-MeasureConfig in a first condition of a measurement object. In response to receiving s-MeasureConfig as the first conditions of a measurement object, a wireless device may not expect to configure with s-MeasureConfig in a measurement config for a cell group where the measurement object is configured. In an example, in response to receiving a second s-MeasureConfig as a first condition of a measurement object, a wireless device may not apply a first s-MeasureConfig in a measurement config for a cell group where the measurement object is configured (if any). When s-MeasureConfig is configured to a measurement object, the wireless device may perform RRM measurements on the measurement object when the condition based on s-MeasureConfig (e.g., a signal quality of a serving cell or a primary cell is lower than a s-Measure configured in the s-MeasureConfig) is satisfied. For example, the base station may configure a first s-Measure (a threshold) for a first measurement object. The wireless device may start measurement based on the first measurement object based on a measurement of a serving cell. The wireless device may start the measurement in response to a signal quality of the serving cell (or a primary cell) becomes lower than the first s-Measure threshold.

In an example, a base station may configure s-MeasureConfig for a cell group with a bitmap to indicate whether the condition of s-MeasureConfig is applied to a measurement object or not. For example, a wireless device may be configured with N measurement objects or may be configured with up to N measurement objects. The wireless device may receive N bits of the bitmap where each i-th bit of the bitmap may correspond to a measurement object with an index of i or a measurement object mapped to a meadId=i. In response to 'enabled' bit (e.g., set as TRUE) in i-th bit of the bitmap, the wireless device may apply s-MeasureConfig to the measurement object. In response to 'disabled' bit (e.g., set as FALSE) in i-th bit of the bitmap, the wireless device may not apply s-MeasureConfig to the measurement object. The wireless device may perform RRM measurements on the measurement object regardless of a serving cell quality when the wireless device does not apply s-MeasureConfig to the measurement object. The base station may configure a bitmap with a size of N, where each bit of the bitmap may correspond to a measurement object with a measurement object index being equal to an order of each bit. The bitmap may apply to one or more measurement objects in an order of measurement object index of the one or more measurement objects. The wireless device may start measurements on a first measurement object, wherein a bit corresponding to the first measurement object is enabled in the bitmap, in response to a signal quality of a serving cell or a primary cell becomes lower than a s-Measure of s-MeasureConfig. The wireless device may continue measurement on a second measurement object, wherein a bit corresponding to the second measurement object is disabled in the bitmap, regardless of the signal quality of the serving cell or the primary cell.

For example, the base station may enable applying s-MeasureConfig to a measurement object of a first frequency, wherein the base station may not configure any serving cell on the first frequency. For example, the base station may disable applying s-MeasureConfig to a measurement object of a second frequency, wherein the base station may configure one or more serving cell(s) on the second frequency. In an example, the wireless device may be configured with a s-MeasureConfig for a cell group. The wireless device may start measurement on one or more measurement objects of one or more first frequencies, in response to a signal quality of a primary cell of the cell group becomes lower than a s-Measure of the s-MeasureConfig. The wireless device may not perform measurement on the one or more measurement objects of the one or more first frequencies, in response to the signal quality of the primary cell of the cell group becomes equal to or larger than the s-Measure of the s-MeasureConfig. The wireless device may determine the one or more first frequencies, wherein the one or more first frequencies may not comprise a frequency of a serving cell configured to the wireless device. The wireless device may continue measurement on one or more second frequencies, wherein the one or more second frequencies may comprise the frequency of the serving cell.

In an example, a base station may configure a priority value for a measurement object. The base station may configure a s-MeasureConfig per each priority value where different measurement reference signals (e.g., SSB or CSI-RS) and/or a threshold value (e.g., ssb-RSRP, csi-RSRP) may be assigned to each priority value. For example, a first priority may have a higher threshold value (e.g., a first ssb-RSRP) and a second priority may have a lower threshold value (e.g., a second ssb-RSRP where the second ssb-RSRP is a lower value than the first ssb-RSRP). Based on different threshold values, when a serving cell quality is between the second ssb-RSRP and the first ssb-RSRP (e.g., greater than or equal to the second ssb-RSRP and lower than the first ssb-RSRP), a wireless device may perform measurements based on the measurement objects associated with the first priority while the wireless device may skip measurements based on the measurement objects associated with the second priority. When the serving cell quality is lower the second ssb-RSRP, the wireless device may perform measurements based on the measurement objects of both priorities. When the serving cell quality may be equal to or higher than the second ssb-RSRP, the wireless device may skip measurements based on the measurement objects of both priorities.

In an example, a base station may configure one or more measurement conditions for a priority based on one or more parameters that comprise a frequency (or a measObject ID or a measId where measurement results are used to determine whether condition(s) are met), a measurement reference signal type (e.g., SSB or CSI-RS), and a threshold value (e.g., ssb-RSRP, csi-RSRP, ssb-RSRQ, csi-RSRQ, SINR, etc.). The one or more parameters may also comprise/indicate one or more reference signals based on the measurement reference signal type. For example, a signal quality of a frequency layer/measurement object of f1 (e.g., ssb-RSRP) may be associated with a second priority. In an example, a wireless device may assume a first priority for a measurement object when any priority value is not configured or when any condition is not specifically configured for the measurement object (or a corresponding measId) by a base station. For example, the base station may configure a s-MeasureConfig for a cell group, wherein the wireless device may not consider a condition may be configured for a measurement object based on the s-MeasureConfig. The base station may configure one or more conditions for a first measurement object, wherein the one or more conditions may not comprise the s-MeausureConfig configured for the cell group. For example, the one or more conditions may comprise a parameter to indicate whether the s-Measure-Config may be applicable to the first measurement object. For example, the one or more conditions may comprise a parameter to apply a second threshold of s-Measure different from a first s-Measure of the s-MeasureConfig for the first measurement object.

Figure 19:
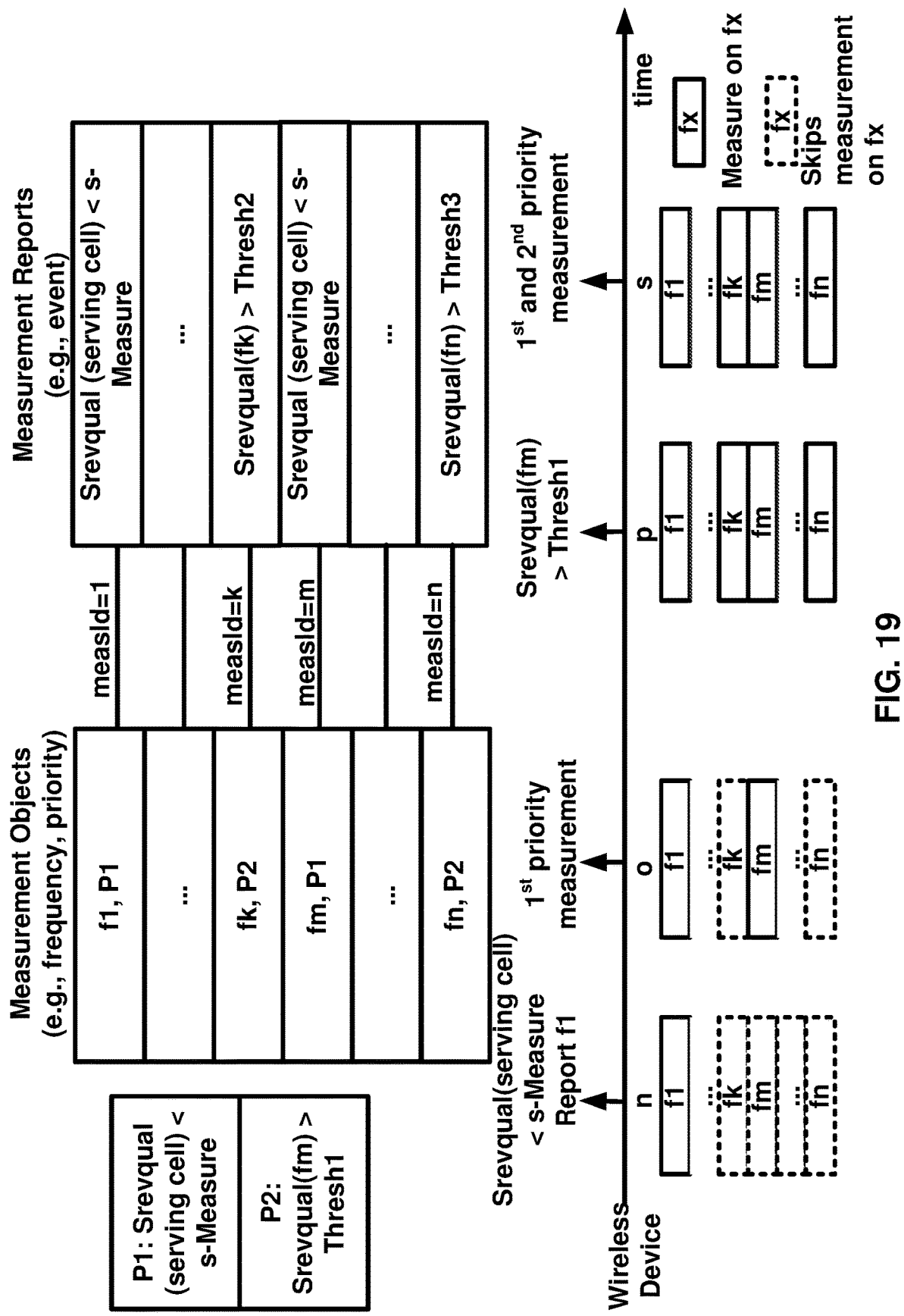
FIG. 19 is a diagram of an embodiment of a measurement priority.

The wireless device may assume a configured priority value for a measurement object when the configuration is provided. FIG. 19 illustrates an example of association of one or more measurement conditions with one or more priority values. For a first priority (e.g., $1^{st}$ priority, P1), a base station may configure a first measurement condition based on s-MeasureConfig with s-Measure threshold of ssb-RSRP. The base station may configure the first measurement condition, wherein the wireless device may determine the first measurement condition is satisfied when a signal quality of a serving cell or a primary cell is lower than the s-Measure. For a second priority (e.g., $2^{nd}$ priority, P2), the base station may configure a second measurement condition wherein a signal quality of a frequency fm becomes better than Thresh1. The base station may configure the second measurement condition, wherein the wireless device may determine the second measurement condition is satisfied when the signal quality of the frequency fm becomes better than a first threshold value of Thresh1.

The base station may indicate a priority value for a measurement object. In FIG. 19, the base station indicates the first priority for a measurement object of a frequency f1, fm, etc. The base station indicates the second priority for a measurement object of a frequency fk, . . . , and fn. The wireless device may perform a measurement based on a measurement object of the frequency f1 at a time n, in response to a signal quality of the primary cell or the serving cell (e.g., the primary cell is in the frequency f1) being equal to or larger than the s-Measure. The wireless device may perform one or more first measurement objects (e.g., measurement objects of frequency f1 and fm) indicated with the first priority in response to the signal quality of the primary cell or the serving cell being lower than the s-Measure. The wireless device performs measurements on the frequency of f1 and fm at a time o based on the first measurement condition. When the serving cell quality becomes lower than s-Measure, the wireless device may trigger a report on f1 based on a report configuration (e.g., Srevqual(serving cell)<s-Measure) associated with the measurement object of f1 (a serving cell measurement object/frequency) at the time n. The wireless device may start RRM measurements based on one or more second measurement objects associated with the second priority (e.g., measurement objects of frequency fk, fn) at a time p in response to a signal quality based on measurement results of the frequency fm becomes better than a threshold value (e.g., Thresh1.

The wireless device may report RRM reports when one or more events are triggered for the performed measurements. The wireless device may continue measurements based on the one or more first measurement objects associated with the first priority at the time p. The wireless device may continue measurements on the one or more first measurement objects and the one or more second measurement objects at a time s, wherein the first measurement condition and the second measurement conditions may be satisfied.

In an example, a base station may also configure a duration value, additionally to one or more parameters for a condition, wherein a wireless device may determine the condition is met based on the duration. For example, the wireless device may determine the condition is met when the condition may present at least for the configured duration. The base station may configure a number of events (a number conditions to occur), a offset, Hysteresis, and/or the like for one or more conditions configured in a measurement object or one or more parameters for a condition configuration. The wireless device may determine whether the condition is met based on the one or more parameter (e.g., the event may occur consecutively more than the number of events, the event may be determined as an occurrence based on a measurement result may be greater than or equal to a threshold value+Hysteresis or the threshold value+offset).

Figure 20:
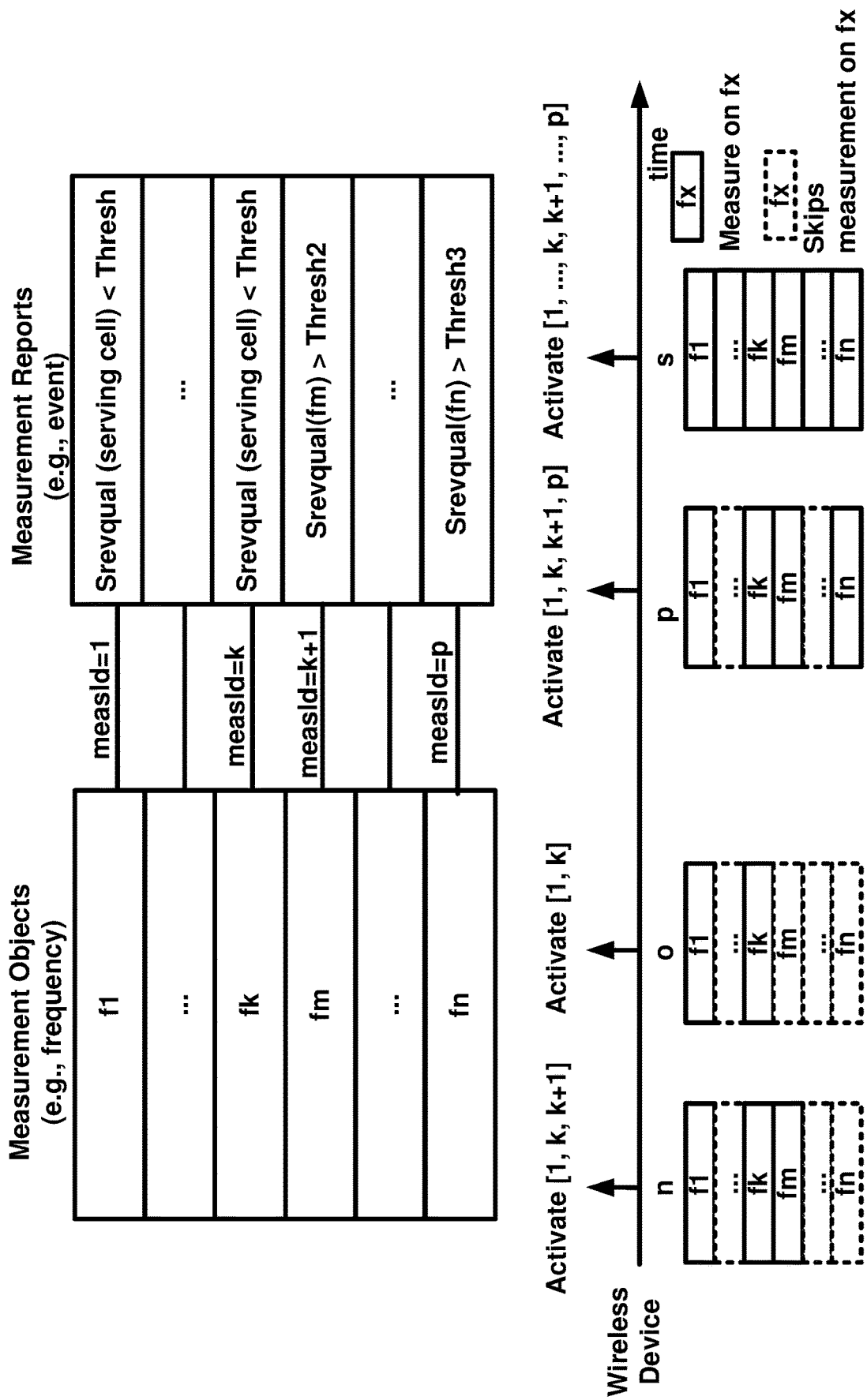
FIG. 20 is a diagram of an embodiment of activation/deactivation of measurement objects.

In an example, a base station may dynamically activate and/or deactivate one or more measurement objects as illustrated in FIG. 20. The base station may configure one or more measurement objects of frequency f1, . . . fk, fm, . . . , fn. The base station may configure one or more measurement reporting configurations corresponding to the one or more measurement objects. The base station may configure one or more measIds, wherein a measId may represent a linkage between a measurement object and a measurement reporting configuration. The measId may be 1, . . . , k, k+1, . . . , p. For example, based on meadId (e.g., a measurement id mapping/connecting/associating a measurement object and a measurement report configuration), the base station may send N bitmaps where i-th bit may correspond to activation or deactivation of a measId=i or i-th measId. When a number of measId is a large (e.g., 32, 64, 128), each bit may be used for a group of measurement Ids (e.g., a group of measurement objects) instead of being used for each measurement object/measurement Id. In an example, the base station may configure a group index for each measurement object where the base station may use the group index to activate or deactivate a set of measurement objects. A group may be determined based on a priority mentioned in the specification. A group may be determined implicitly based on a frequency region. For example, a group index 1 may represent a frequency region of FR1 (e.g., frequency below 6 GHz/7 GHz), and a group index 2 may represent a frequency region of FR2 (e.g., a frequency below 52.6 GHz and above FR1). More groups may be defined for different frequency regions or different set of frequency regions. The base station may send an activation/ deactivation via MAC CEs and/or DCIs. For example, there are 1, 2, . . . , k, k+1, . . . , p measIds where each measId may correspond to a frequency of f1, f2, . . . , fk, fm, . . . , fn. A wireless device may receive a dynamic signaling of a bitmap (e.g., [1, 0, 0 . . . 0, 1, 1, 0 . . . 0, 0]) to activate measId=1, k and k+1 at a time n. The wireless device may start RRM measurements based on measurement objects of frequency f1, fk and fm, at the time n, in response to receiving the bitmap to activate the meadId=1, k and k+1, wherein the meadId 1, k and k+1 may correspond to measurement objects of frequency f1, fk and fm. The base station may activate the measId 1 and k at a time o, wherein the base station may deactivate the measId of k+1. In response to receiving the activation, the wireless device may continue measurement on measurement objects of frequency f1 and fk. The wireless device may stop measurement based on the measurement object of frequency fm. The base station may transmit an activation of measId of 1, k, m and p at a time p, wherein meadId of 1, k, m and p may correspond to measurement object of frequency f1, fk, fm, and fn. In response to receiving the activation, the wireless device may continue measurement based on the measurement object of frequency f1 and fk. The wireless device may start measurement based on the measurement objects of frequency fm and fn at the time p. The base station may activate measurement objects of frequency f1, . . . fk, fm, . . . , fn at a time s. In response to the activation, the wireless device may start measurement based on measurement objects of frequency f2, . . . , fk+1, fm+1, . . . , fn−1. The wireless device may continue measurements on frequency f1, fk, fm and fn.

A base station may request to receive a serving cell quality in case the base station may have configured s-Measure-Config. When a signal quality of a serving cell is good (e.g., the signal quality may be equal to or better than a s-Measure configured in s-MeasureConfig), the base station may not activate any measurement object except for a measurement object of a serving cell frequency, wherein the signal quality of the serving cell is measured. The base station may configure enabling of MAC-CE/DCI based activation/deactivation of measurement of a measurement object for a measurement object. The wireless device may activate or deactivate (or start or stop) measurement based on the measurement object based on the MAC-CE/DCI indication when the MAC-CE/DCI is enabled for the measurement object. The base station may configure s-MeasureConfig for a cell group. The wireless device may perform the measurement based on the measurement object, wherein the base station may have activated the measurement based on the measurement object and the signal quality of the serving cell is equal to or greater than the s-Measure. The wireless device may determine start or stop measurement based on the measurement object based on the MAC-CE/DCI activation/ deactivation in response to being enabled with the MAC-CE/DCI activation/deactivation indication. When s-MeasureConfig is configured, if dynamic activation is enabled, s-MeasureConfig may not be used for determining to start or stop measurement based on a measurement object. A wireless device may ignore s-MeasureConfig when the wireless device is enabled with a dynamic signaling to activate and/or deactivate one or more measIds (e.g., measurement objects). The wireless device may perform explicitly activated measurement objects by the base station regardless of s-MeasureConfig when the s-MeasureConfig is available for the measurement config for a cell group.

Figure 21:
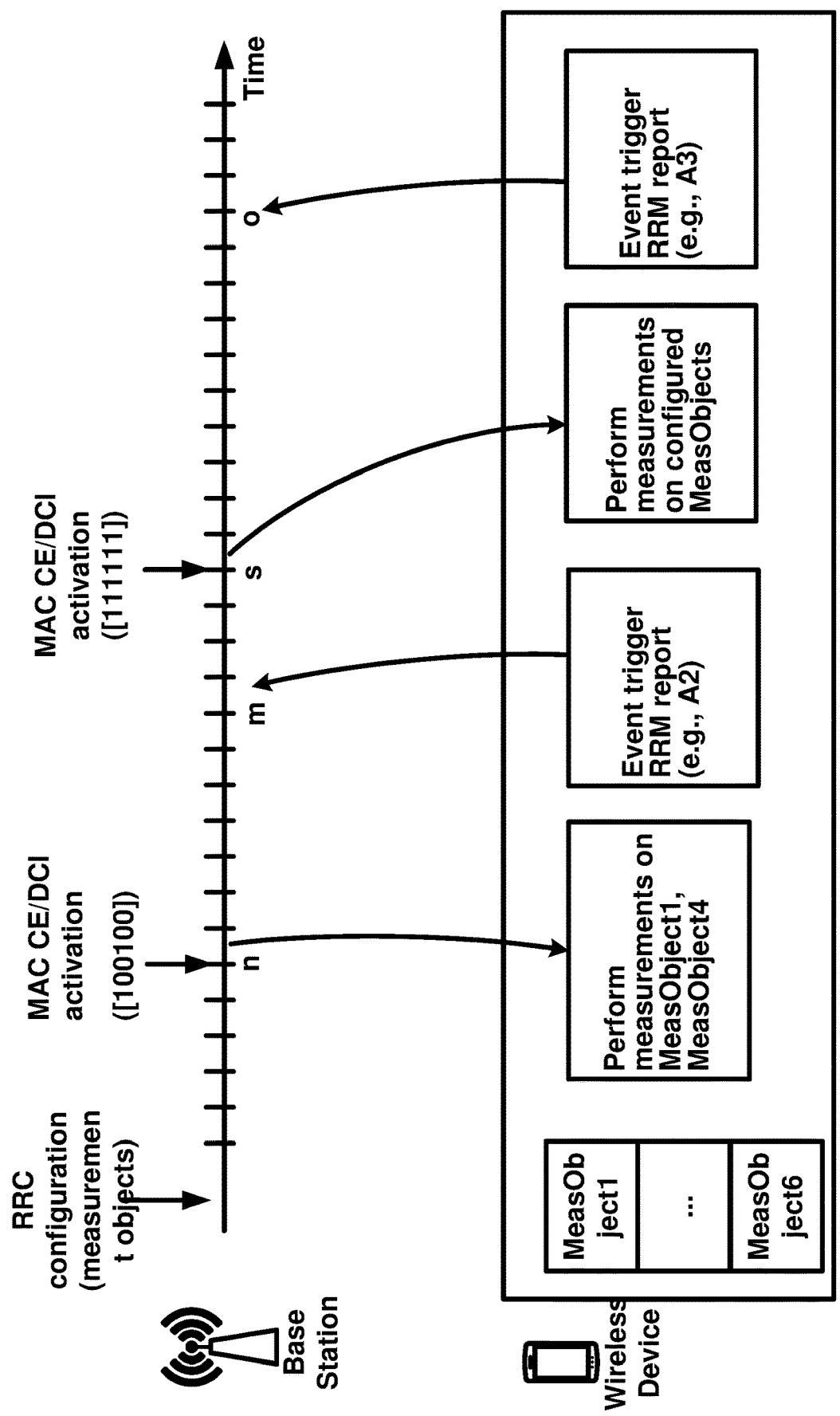
FIG. 21 is a diagram of an embodiment of activation/deactivation of measurement objects.

In an example, a base station may activate and/or deactivate one or more measurement objects based on one or more measurement reports triggered based on one or more report events. FIG. 21 illustrates an example. For example, a base station activates a measurement object #1 and measurement object #4 at a time n. An event (e.g., A2–serving cell becomes worse than a threshold) is triggered. In response to the event, the wireless device may report measurement reporting of one or more second measurement objects of the measurement object #1 and the measurement object #4 at a time m. Based on receiving the measurement reporting of the one or more second measurement objects, the base station may activate the one or more measurement objects for the wireless device for accelerating a potential hand-over. The event may indicate potential necessity of hand-over for the wireless device. To expedite the hand-over, the base station may activate the one or more measurement objects for more measurements. The wireless device may start measurements on measurement object #2, #3, #5 and #6 at a time s. The wireless device may continue measurement based on measurement object #1 and #4. The wireless device may trigger an event based on A3. The wireless device may report one or more second measurement reports based on measurement results of the measurement objects at a time o.

In an example, a base station may configure one or more parameters for a conditional handover to a wireless device. In response to receiving the one or more parameters for the conditional handover, the wireless device may activate one or more measurement objects configured to the wireless device and may start measurement based on the one or more measurement objects. The wireless device may consider receiving the one or more parameters for the conditional handover as a condition to start measurement. The wireless device may perform measurements based on the one or more measurement objects, wherein a signal quality of a serving cell/a primary cell may be equal to or higher than a s-Measure configured in a s-MeasureConfig (if configured). The wireless device may perform RRM measurements on the configured one or more measurement objects regardless of one or more conditions associated with the one or more measurement objects and s-MeasureConfig.

In an example, a base station may activate a first set of measurement objects in a first scenario and a second set of measurement objects in a second scenario. The base station may configure a set of measurement objects associated with a scenario. The wireless device may activate and perform measurements on the se of measurement objects when the scenario occurs with or without explicit indication from the base station. One measurement object may be associated with more than one scenario or may not associate with any scenario. For example, a scenario may include a handover command, a condition handover command, a SCell addition, SCG addition, removing SCG, removing SCell(s), RRC-Inactive state, power saving, and/or the like. For example, the base station may activate one or more measurement objects when a serving quality is good mainly for identifying one or more frequencies/cells to attach to a wireless device for one or more SCells and/or a SCG. When the serving quality becomes lower than a threshold, there is an increased need to search cells for hand-over purposes. For example, for a hand-over purpose, a base station may not activate one or more frequencies in a high frequency band (e.g., frequency region 2) as those frequencies may not good for a hand-over. Dynamic activation and/or deactivation of one or more measurement objects may allow a base station to dynamically change a set of measurements depending on a situation.

For example, the base station may activate and/or deactivate one or more configured measurement objects based on the scenario. For example, the base station may configure one or more scenarios for a measurement object, wherein the wireless device may activate or start measurement based on the measurement object when the wireless device may be in the one or more scenarios in response to the configuration. For example, the base station may configure one or more events associated with a second measurement object. The wireless device may start measurement based on the second measurement object in response to triggering an event of the one or more events.

In an example, a base station may configure one or more reference measurement object for each frequency region (e.g., frequency region 1, frequency region 2, frequency region 3 where frequency region 1 is a range of frequencies below for example 7 GHz, frequency region 2 is a range of frequencies after frequency region 1 and below for example 52 GHz, frequency range 3 is a range of frequencies after frequency region 2 and below for example 100 GHz, and so on). For example, the base station may configure a first reference measurement object for a first measurement object of the first frequency region. Based on the configuration, the wireless device may perform or skip (e.g., start or stop) RRM measurements based on the first measurement objects based on a signal quality measured based on reference signal(s) associated/configured with the reference measurement object. The wireless device may continue measurement based on the reference measurement object, wherein the wireless device may not expect to be configured with one or more conditions (except for s-MeasureConfig) with the reference measurement object. The base station may configure a threshold for the reference measurement object and a RS type. The threshold value may be used to determine whether the signal quality may satisfy a condition to start measurement based on the first measurement object associated with the reference measurement object.

A similar mechanism to s-MeasureConfig may be considered. For a frequency region where there is at least one serving cell is currently active/configured, a wireless device may assume the frequency of the serving cell or the serving cell as the reference measurement object for the frequency region. When there are more than one serving cell frequencies in the frequency region, the lowest frequency or the best quality frequency or the frequency where PCell (for MCG) or sPCell (for SCG) presents may be selected for the reference measurement object. For example, when a wireless device has a PCell in f1 in FR1, the wireless device may perform measurement objects of other frequencies of FR1 depending on the quality of f1 or the serving cell (PCell). In an example, a base station may configure one or more reference measurement objects for a set of measurement objects. A wireless device may firstly perform measurements on the one or more first reference measurement objects of a first set of measurement objects. In response to detecting qualities of the measurements of the one or more first reference measurement objects are good (or meeting a condition/threshold, e.g., a signal quality of a measurement object of the one or more first reference measurement objects may be equal to or better than a threshold), the wireless device may start and/or continue measurement based on each measurement object of the first set of measurement objects.

In an example, to make a robust coverage of a wireless device, this may be allowed only for frequencies not in FR1 (e.g., measurement objects in FR2, FR3, and so on). For example, the wireless device may perform measurements of a first measurement object for a frequency of FR1 regardless of a signal quality of a reference measurement object. For example, the wireless device may determine to start or stop measurement for a second measurement object for a second frequency of FR2 or FR3 based on the signal quality of the reference measurement object. A set of frequencies or frequency ranges where the operation is not allowed may be also configured by a base station.

In an example, a wireless device may be configured with one or more measurement objects of one or more frequencies that belong to a single band or adjacent bands. In an example, a wireless device may detect/measure/determine similar measurements results for the one or more measurement objects. For example, one or more measurement objects configured for intra-band carriers may show similar channel conditions to a wireless device. For example, the wireless device, which triggers a first RRM reporting corresponding to a first frequency, likely triggers a second RRM reporting corresponding to a second frequency when the first frequency and the second frequency belong to a same band or adjacent bands of a same base station.

Figure 22:
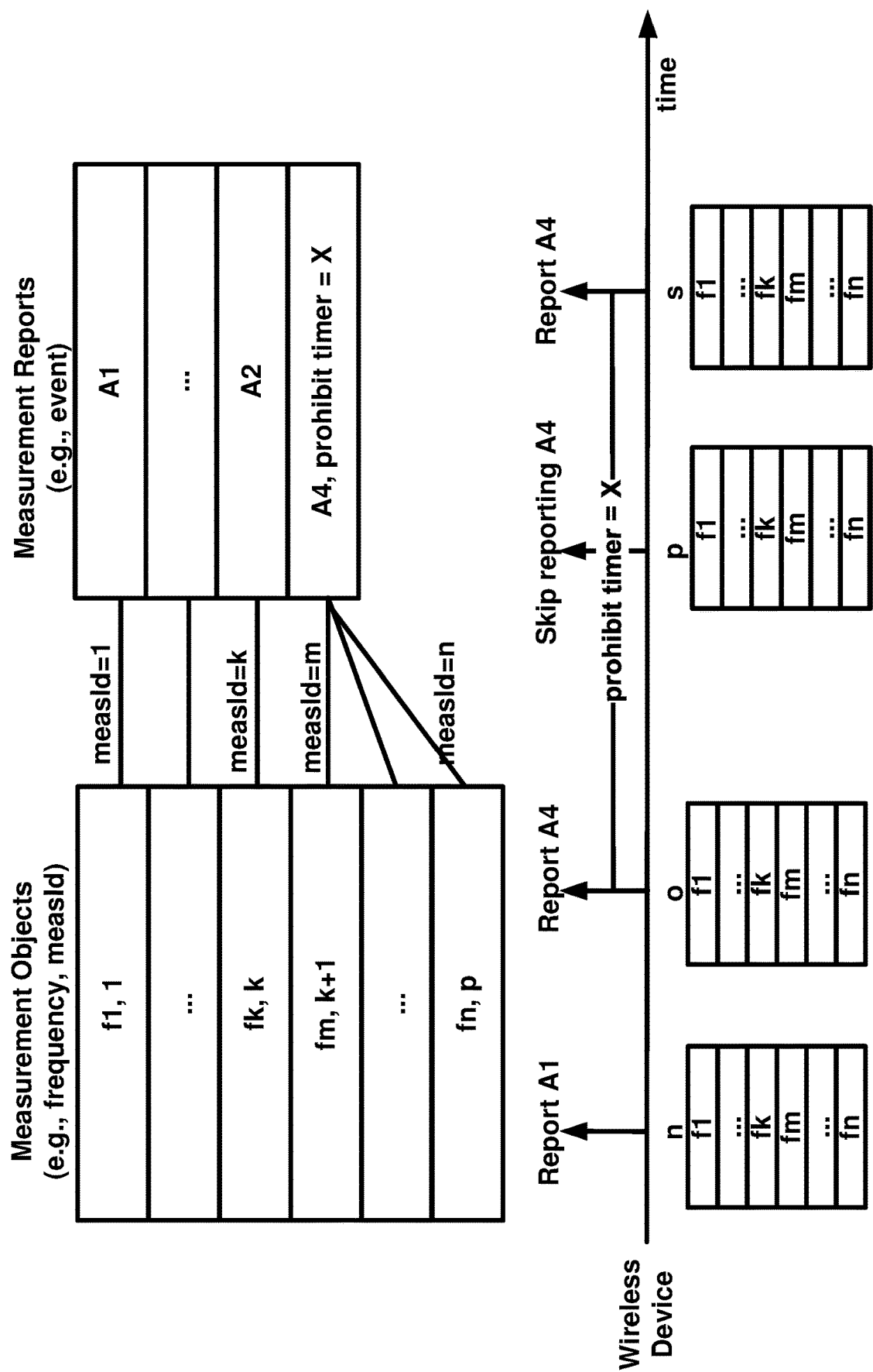
FIG. 22 is a diagram of an embodiment of a prohibit timer for a report configuration.

For example, a wireless device may be configured with an A4 event (a neighbor cell becomes better than a threshold) for a frequency of fm, . . . , and fn in a scenario illustrated in FIG. 16 and FIG. 22. For example, the fm, . . . , fn may belong to a same frequency band or adjacent frequency bands, wherein a first channel quality of a first frequency of the fm, . . . , fn and a second channel quality of a second frequency of the fm, . . . , fn may show similar results. When the wireless device moves to a proximity of a second TRP (e.g., TRP2) shown in FIG. 16, the wireless device may like to trigger RRM reports on the frequency of fm, . . . , and fn. In an example, a base station may configure a prohibit timer for a measurement report configuration to avoid multiple reports from one or more measurement objects sharing similar channel conditions. A wireless device may start a prohibit timer in response to send a reporting based on a trigger event associated with the report configuration. The wireless device may skip, based on the prohibit timer, reporting of the one or more measurement objects, wherein the one or more measurement objects may be associated with the measurement report configuration. For example, the wireless device may not send (or may skip sending/transmitting) one or more RRM reports, triggered on one or more measurement objects associated with a same report configuration of a same event, for a prohibit timer of M (e.g., M=3) seconds.

In an example, a base station may configure a report configuration to be associated with one or more measurement objects. For the one or more measurement objects, a wireless device may trigger an RRM/measurement report when the event associated with the report configuration is satisfied for a certain duration (based on the report configuration) and also there is no running prohibit timer. The base station may configure a prohibit timer duration/value for the report configuration. For example, the prohibit timer may expire after the configured prohibit timer duration/value. For example, the wireless device may start the prohibit timer in response to transmitting the measurement report. While the prohibit timer is running, the wireless device may skip transmitting/sending/reporting a RRM/measurement report triggered by a measurement object from the one or more measurement objects, or delay the triggering. In response to an expiry of the prohibit timer, the wireless device may check each measurement object of the one or more measurement objects associated with the report configuration. The wireless device may trigger RRM report(s) if any measurement object of the one or more measurement objects may satisfy the event condition. For example, when there is a pending report triggering event of the one or more measurement objects, the wireless device may report measurement result(s) based on the pending report triggering event. When a prohibit timer is configured for a report configuration, a wireless device may select a selected cell/frequency, which may meet the condition/event, from one or more measurement objects associated with the report configuration. The wireless device may determine a selected measurement object with a highest signal quality based on measurement results of the one or more measurement objects. The wireless device may transmit a measurement result based on the highest signal quality of the selected measurement object. The wireless device may feedback an index of the selected measurement object.

In an example, when a wireless device is configured with a report configuration with a plurality of measurement objects, the wireless device may determine a selected measurement object and feedback on the selected measurement object. For example, the wireless device may detect an event, associated with the report configuration, is triggered. The wireless device may determine a measurement object among the plurality of measurement objects associated with the report configuration. The wireless device may determine the measurement object, wherein a signal quality of the measurement object may show a highest signal quality among measurement results based on the plurality of measurement objects. The wireless device may assume that reference signal type or RRM criteria (e.g., ssb-RSRP, csi-RSRP, ssb-RSRQ, csi-RSRQ, SINR, etc.) is a common across the plurality of measurement objects.

FIG. 22 illustrates an example of a prohibit timer. In the example, measurement objects for fm, . . . , and fn are associated with a single report configuration (e.g., a report config with an event A4) with a prohibit timer of X. The base station may configure a respective measurement report configuration for a respective measurement object of frequency f1, . . . , fk. At a time n, the wireless device may send a report based on an event of A1, wherein the wireless device may transmit a measurement result based on the measurement object of frequency f1. At a time o, the wireless device may transmit a second measurement result based on one or more measurement objects from measurement objects of frequency fm, . . . , fn, in response to detecting/entering the A4 event. In response to transmitting the second measurement result based on the A4 event at the time o, the wireless device may start a prohibit timer based on the prohibit timer value X. In response to the prohibit timer being running, the wireless device skips sending another an RRM report based on the same report configuration within a prohibit timer duration of X. The wireless device may skip transmitting a measurement result based on the event A4 at a time p. When the prohibit timer expires, the wireless device may report a RRM based on the event A4. The wireless device may transmit a third measurement result based on the event A4 at a time s.

In an example, a base station may configure a plurality of frequencies and a measurement duration for a measurement object and indicate a reference frequency for the plurality of measurement objects. A wireless device may perform RRM measurements on the reference frequency for the plurality of measurement objects. The wireless device may trigger a RRM reporting on the plurality of measurement object based on RRM measurements of the reference frequency. In response to the RRM reporting/event triggering, the wireless device may perform measurements on other frequencies of the plurality of measurement objects for the measurement duration. The wireless device may stop measurements on the other frequencies of the plurality of measurement object after the measurement duration. When the measurement duration of the report configuration expires, the wireless device skip/stop measurements on the other frequencies except for the reference (e.g., the lowest) frequency from one or more frequencies configured to the plurality of measurement objects. In an example, a base station may configure one or more frequencies associated with a measurement object. A wireless device may select a lowest (or a highest) frequency from the one or more frequencies associated with the measurement object as a reference frequency or the base station may configure a reference frequency for the measurement object.

Figure 23:
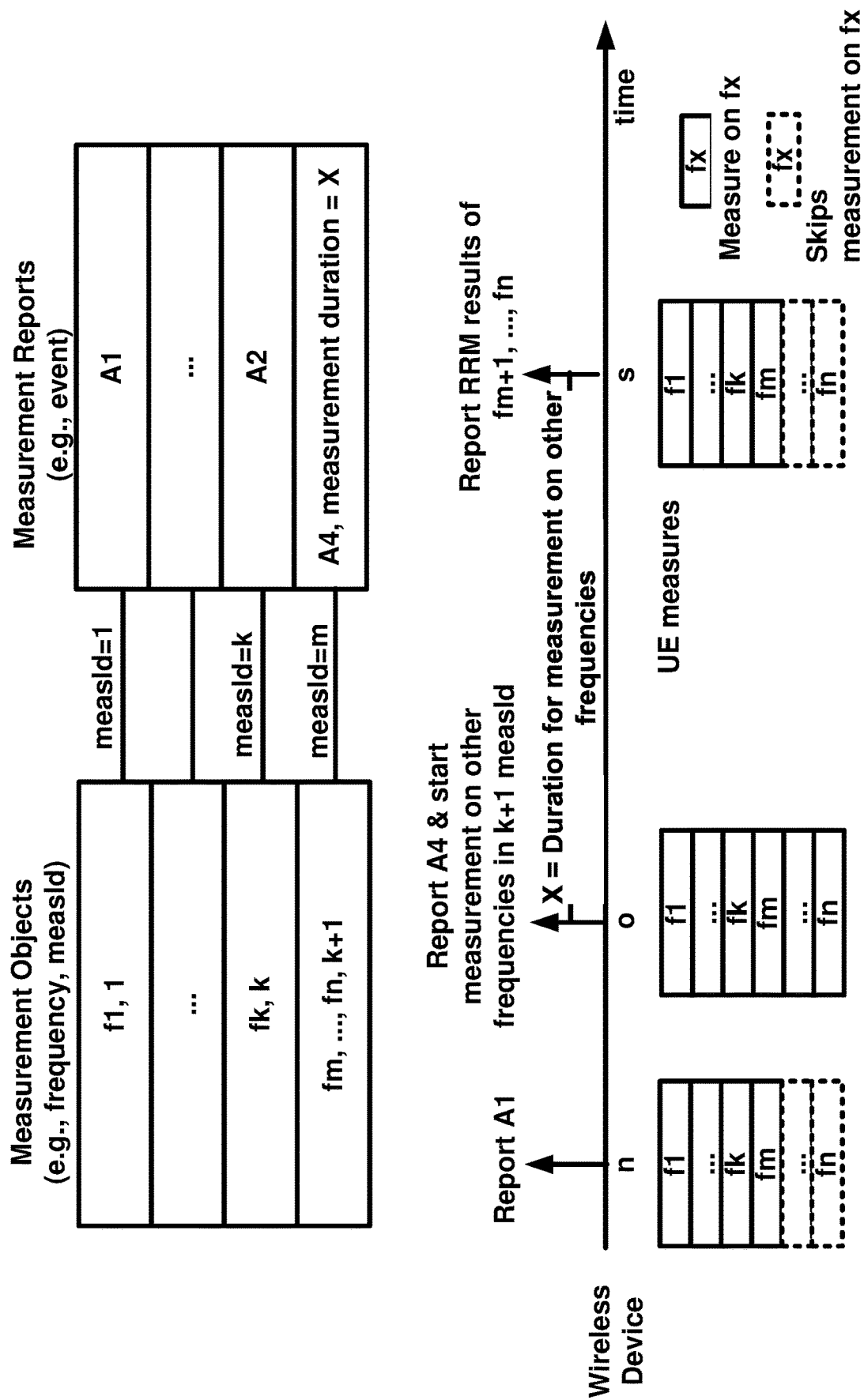
FIG. 23 is a diagram of an aspect of an example embodiment of the present disclosure.

FIG. 23 illustrates an example of a duration, wherein the wireless device may perform measurements on one or more frequencies/measurement objects based on the duration. In an example, a measurement object k+1 may be configured with a set of frequencies of fm, . . . , and fn. At a time n, the wireless device may perform RRM measurements on a frequency of fm that is a lowest frequency from the set of frequencies of fm, . . . , and fn that are associated with the measurement object (e.g., measId=m). The wireless device may transmit a measurement result of the measurement object of frequency f1 in response to the event A1 being satisfied at the time n. In response to a triggering of an event A4 at a time o based on a report configuration of the frequency fm, the wireless device starts RRM measurements on other frequencies (e.g., fm+1, . . . , and fn) for a configured measurement duration X (e.g., until a time s). When the configured measurement duration expires (time s), the wireless device may report the measurement results of the other frequencies and stop measurements on the other frequencies.

Figure 24:
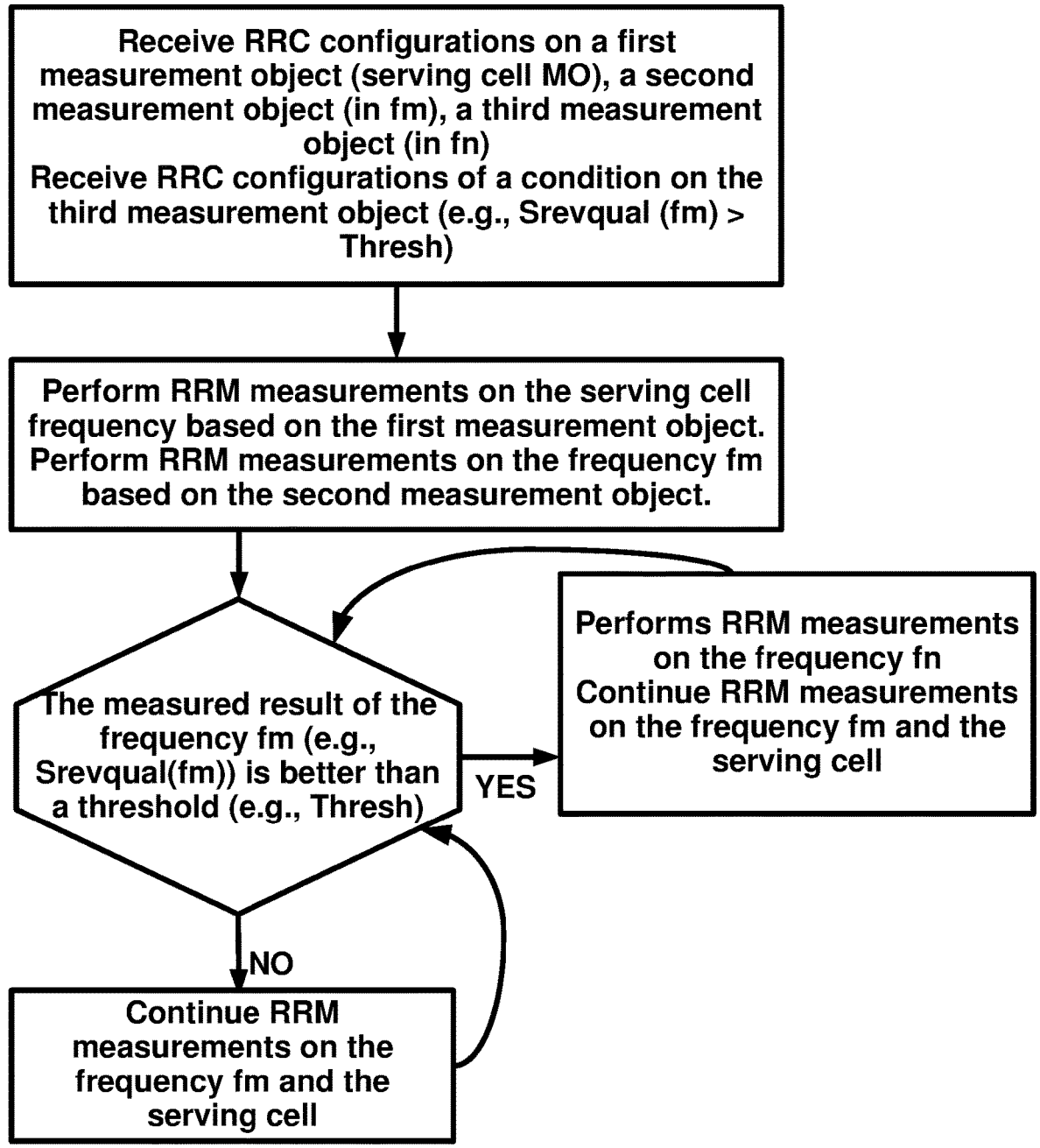
FIG. 24 is a flow diagram of an aspect of an example embodiment of the present disclosure.

FIG. 24 illustrates a flow diagram of an embodiment. A wireless device may be configured with a first measurement object (e.g., a serving cell measurement object), a second measurement object (e.g., a measurement object of a frequency fm), and a third measurement object (e.g., measurement object of a frequency fn). The wireless device may receive RRM configurations of a condition on the measurement object of fn that the wireless device may perform measurements when a signal quality of the second measurement object (the frequency fm) is greater than a threshold value (e.g., Thresh). The wireless device performs measurements on the serving cell frequency and the frequency fm based on the first and the second measurement objects. When the measurement result of the frequency fm is greater than the threshold value, the wireless device performs measurements on the frequency fn. If the measurement result of the frequency fm is not greater than the threshold value, the wireless device skip measurements on the frequency fn and continue measurements on the serving cell frequency and the frequency fm.

Figure 25:
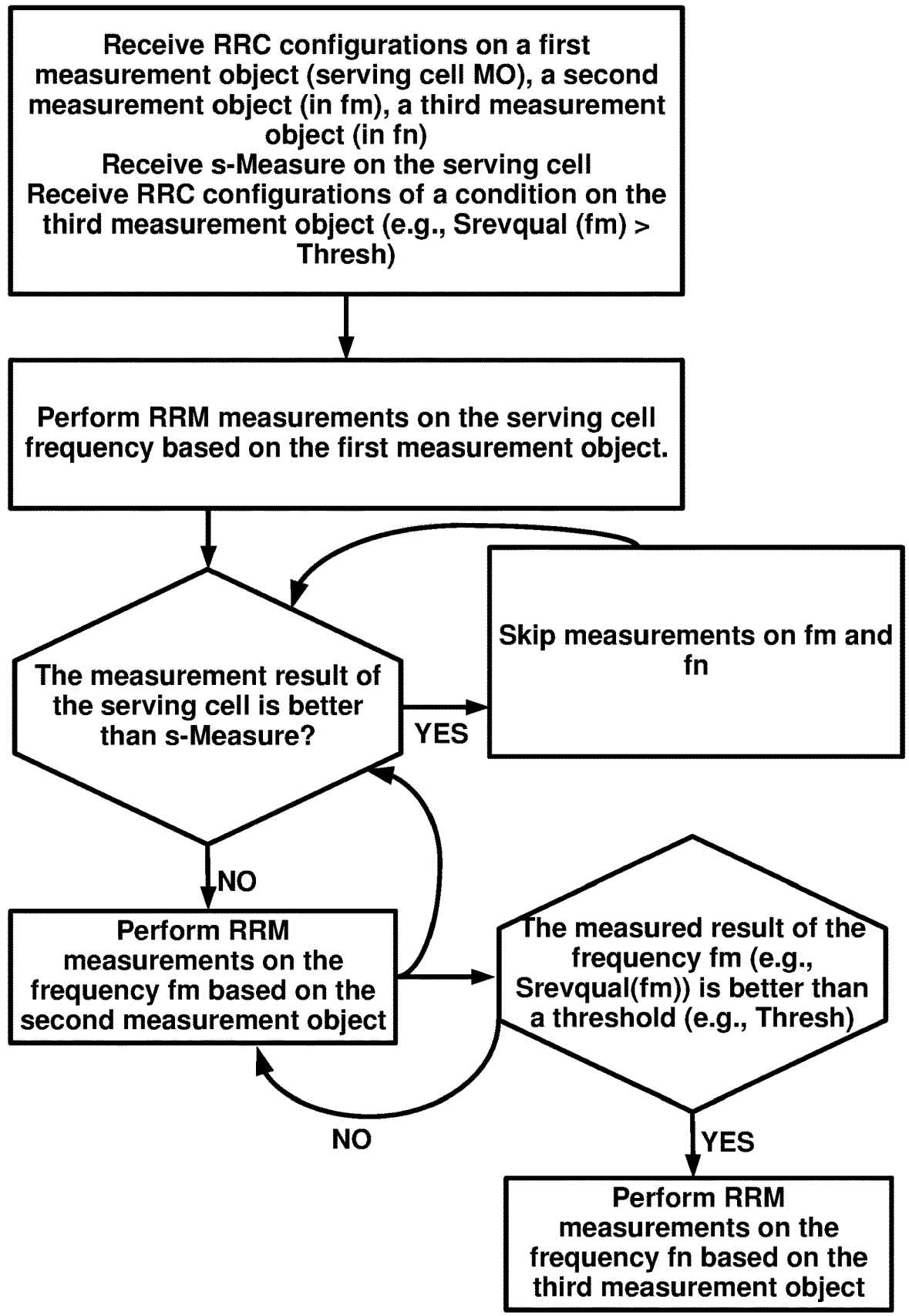
FIG. 25 is a flow diagram of an aspect of an example embodiment of the present disclosure.

FIG. 25 illustrates a flow chart of an embodiment. A wireless device may be configured with a first measurement object (e.g., a serving cell measurement object), a second measurement object (e.g., a measurement object of a frequency fm), and a third measurement object (e.g., measurement object of a frequency fn). The wireless device may receive RRM configurations of a condition on the measurement object of fn that the wireless device may perform measurements when a signal quality of the second measurement object (the frequency fm) is greater than a threshold value (e.g., Thresh). The wireless device receives s-Measure that is a threshold value for s-MeasureConfig to determine whether to perform measurements on non-serving cell frequency measurement objects. The wireless device performs measurements on the serving cell frequency based on the first measurement object. The wireless device determines whether quality of the serving cell (based on the measurement) is better than s-Measure. When the wireless device skips measurements on the second and third measurement objects if the quality of the serving cell is better than s-Measure. The wireless device performs measurements on the measurement object of frequency fm when the quality of the serving cell is not greater than s-Measure. When the measurement result of the frequency fm is greater than the threshold value, the wireless device performs measurements on the frequency fn. If the measurement result of the frequency fm is not greater than the threshold value, the wireless device skip measurements on the frequency fn and continue measurements on the serving cell frequency and the frequency fm.

In an example, a base station may configure one or more measurement gap patterns for each frequency region (e.g., frequency region 1). The base station may activate one measurement gap pattern from the one or more measurement gap patterns based on one or more measurement objects activated. In an example, a base station may configure a measurement gap associated with a measurement object. In response to performing measurements based on the measurement object, a wireless device may assume to use the measurement gap associated with the measurement object.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 26:
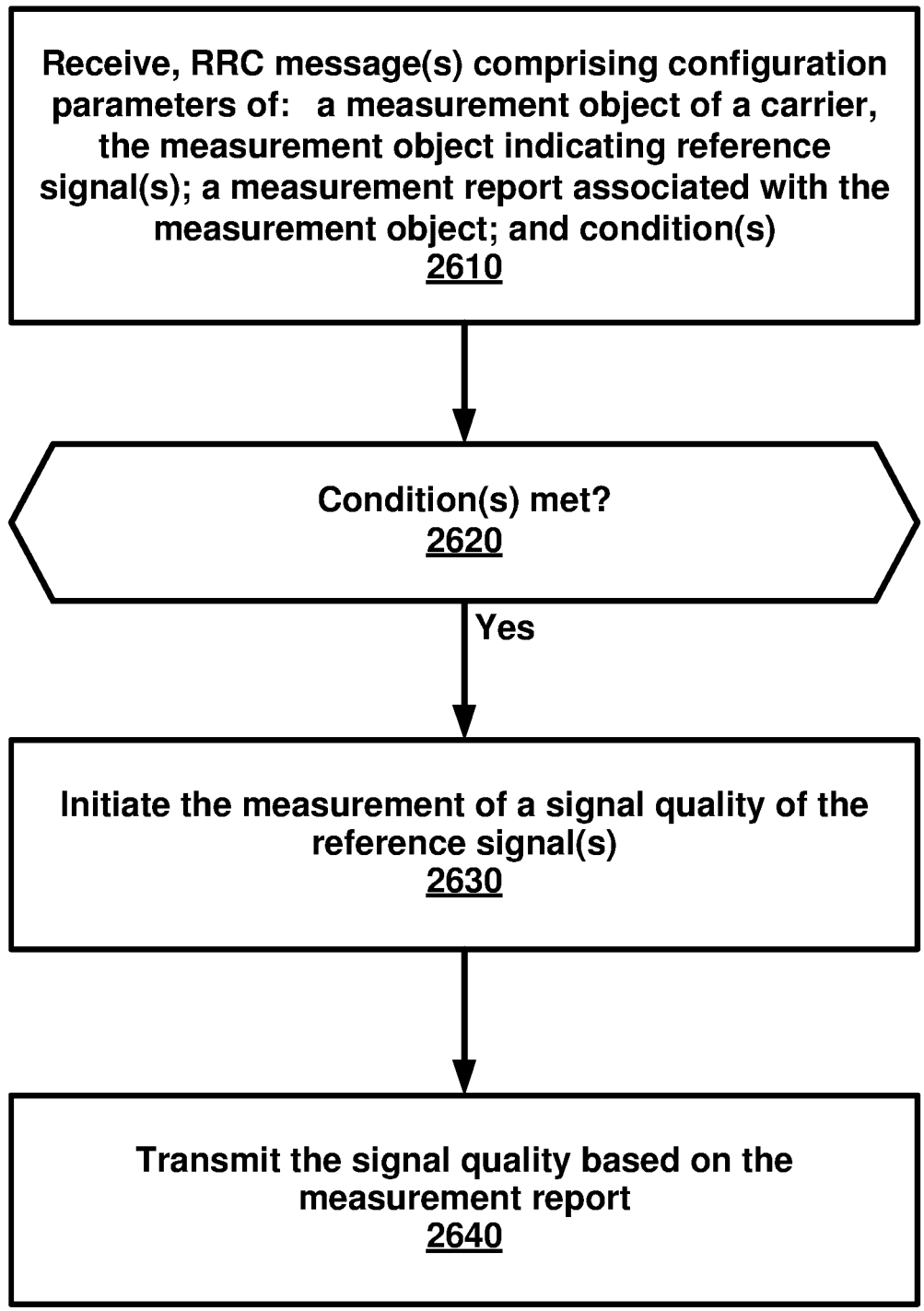
FIG. 26 is a flow diagram of an aspect of an example embodiment of the present disclosure.

FIG. 26 is a flow diagram as per an aspect of an example embodiment of the present disclosure. At 2610, a wireless device may receive one or more radio resource control (RRC) messages by a base station. The RRC messages may comprise configuration parameters. The configuration parameters may comprise a measurement object of a carrier. The measurement object may indicate one or more reference signals. The configuration parameters may comprise a measurement report associated with the measurement object. The configuration parameters may comprise one or more conditions to initiate, based on the measurement object, a first measurement of a signal quality of the one or more reference signals. At 2620, the wireless device may determine if the one or conditions are met. At 2630, the wireless device may initiate, in response to the determining indicating that the one or more conditions are met, the first measurement of a signal quality of the one or more reference signals. At 2640, the wireless device may transmit the signal quality based on the measurement report.

According to an example embodiment, the wireless device may receive one or more second RRC messages comprising second configuration parameters of one or more second measurement objects; a first threshold value to be applied based on a signal quality of a primary cell; and a second threshold value based on the signal quality of the primary cell. According to an example embodiment, based on the signal quality of the primary cell being lower than or equal to the first threshold value and the signal quality of the primary cell being higher than the second threshold value, the wireless device may initiate the first measurement based on the measurement object; and may skip a second measurement based on the one or more second measurement objects. According to an example embodiment, based on the signal quality of the primary cell being lower than or equal to the second threshold value, the wireless device may continue the first measurement, based on the measurement object; and may initiate the second measurement based on one or more second measurement objects.

According to an example embodiment, the wireless device may receive one or more medium access control-control elements (MAC-CEs) indicating an activation of the measurement object; or a deactivation of the measurement object. According to an example embodiment, the one or more conditions may be met when the one or more MAC CEs indicate the activation of the measurement object.

According to an example embodiment, the determining the one or more conditions are met may comprise determining, based on a signal quality threshold of a second carrier, that a signal quality of the second carrier may become better than the signal quality threshold. According to an example embodiment, the determining the one or more conditions are met may comprise determining, based on a region, that a location of the wireless device may belong to the region. According to an example embodiment, the determining the one or more conditions are met may comprise determining, that a power state may change to a normal state from a dormant state or a power saving state.

According to an example embodiment, the wireless device may determine the one or more conditions are not met to stop the first measurement based on the measurement object. According to an example embodiment, the wireless device may skip measuring based on the one or more reference signals in response to stopping the measurement based on the measurement object. According to an example embodiment, the wireless device may receive one or more second RRC messages comprising a s-MeasureConfig for a measurement config for a cell group, wherein the measurement config comprising one or more measurement objects including the measurement object. According to an example embodiment, the wireless device may measure the one or more reference signals on the carrier based on first determining whether a condition being met based on the s-MeasureConfig and measurement results of a serving cell; and in response to the first determining, second determining the one or more conditions are met for the measurement object of the carrier. According to an example embodiment, the wireless device may stop measuring the one or more reference signals based on the measurement object. The condition not being met may be based on the s-MeasureConfig and measurement results of the serving cell. According to an example embodiment, the serving cell may be a PCell or sPCell According to an example embodiment, a wireless device may receive one or more radio resource control (RRC) messages comprising configuration parameters. The configuration parameters may comprise a measurement object of a carrier, the measurement object indicating one or more reference signals; a measurement report associated with the measurement object; and one or more conditions to initiate measurement based on the measurement object. The wireless device may determine the one or more conditions are met to initiate the measurement based on the measurement object. In response to the determining, the wireless device may measure a signal quality of the one or more reference signals. The wireless device may transmit the signal quality based on the measurement report.

According to an example embodiment, the one or more conditions may comprise a serving cell signal quality (s-Measure), wherein the wireless device may initiate the measurement when a signal quality of a primary cell becomes lower than the serving cell signal quality. According to an example embodiment, the one or more conditions may comprise a triggering event, wherein the wireless device may initiate the measurement when the triggering event has occurred. According to an example embodiment, the one or more conditions may comprises a measurement threshold and a second measurement object, wherein the wireless device may initiate the measurement based on the measurement object in response to determining that a signal quality of a carrier based on the second measurement object may become better than the measurement threshold.

According to an example embodiment, the measurement object of the carrier may comprise a frequency of the carrier, a subcarrier spacing of the carrier, one or more SMTCs (SSB-measurement time configurations), CSI-RS measurement configurations, SSB measurement configurations, a list of white cells, and/or a list of black cells.

According to an example embodiment, the wireless device may transmit the signal quality based on configuration parameters of the measurement report. According to an example embodiment, the configuration parameters may comprise a periodic report configuration or an event triggered report configuration. According to an example embodiment, the wireless device may transmit the signal quality in response to the signal quality satisfying the event, wherein the event triggered report configuration is configured for the measurement report. According to an example embodiment, the signal quality may be a RSRP and/or a RSRQ and/or SINR According to an example embodiment, a wireless device may receive one or more radio resource control (RRC) messages comprising configuration parameters. The configuration parameters may comprise one or more first measurement objects; one or more second measurement objects; a first threshold value applied based on a signal quality of a serving cell; and a second threshold based on the signal quality of the serving cell. The wireless device may perform measurements based on the one or more first measurement objects when the quality of the serving cell being below the first threshold. The wireless device may perform measurements based on the one or more first measurement objects and the one or more second measurement objects when the quality of the serving cell being below the second threshold. The wireless device may transmit one or more signal qualities based on one or more measurement reports.

According to an example embodiment, the serving cell may be a primary cell of a cell group. According to an example embodiment, the first threshold value may be a first RSRP threshold of the signal quality of the serving cell. According to an example embodiment, the second threshold value may be a second RSRP threshold of the signal quality of the serving cell. According to an example embodiment, the first threshold may be higher than the second threshold According to an example embodiment, a wireless device may receive one or more radio resource control (RRC) messages indicating one or more measurement objects for a cell group. Each measurement object of the one or more measurement objects may indicate a frequency of a carrier, where the measurement object is applied; one or more reference signals; and a measurement object index. The wireless device may receive one or more medium access control-control elements (MAC-CEs) indicating an activation or deactivation of each measurement object of the one or more measurement objects. The wireless device may initiate a measurement based on a first measurement object in response to the first measurement object receives an indication of the activation. The wireless device may stop a measurement based on a second measurement object in response to the second measurement object receives an indication of the deactivation. The wireless device may measure a signal quality of one or more reference signals based on the first measurement object. The wireless device may transmit the signal quality based on a measurement report configuration associated with the first measurement object.

A wireless device may receive one or more radio resource control (RRC) messages. The one or more RRC messages may comprise one or more conditions for a frequency, a measurement object configured with the frequency. The one or more RRC messages may comprise a measurement report configuration that is linked to the measurement objects based on a measId. The wireless device may determine whether the one or more conditions configured for the frequency of the measurement object are satisfied. The wireless device may measure one or more reference signals on the frequency when the wireless device determines that the one or more conditions are met. The wireless device may report one or more results of the measurements.

The wireless device may skip measurements on the one or more reference signals on the frequency when the wireless device determines that the one or more conditions are not met.

A wireless device may receive one or more radio resource control (RRC) messages. The one or more RRC messages may comprise one or more measurement objects for a cell group. The measurement object may comprise a frequency or a measurement object index. The wireless device may receive one or more MAC CEs indicating a first list of measurement objects and a second list of measurement objects where the first list of measurement objects are activated and the second list of measurement objects are deactivated for the measurement. The wireless device may perform measurements on the first list of measurement objects in response to receiving the MAC CEs activating the first list of measurement objects. The wireless device may skip measurements on the second list of measurement objects in response to receiving the MAC CEs activating the second list of measurement objects.

A wireless device may receive one or more radio resource control (RRC) messages. The one or more RRC messages may comprise one or more first measurement objects and one or more second measurement objects. The one or more RRC messages may comprise a first threshold value applied based on a quality of a serving cell and a second threshold value applied based on the quality of the serving cell. The wireless device may measure one or more reference signals of the serving cell and determine a measurement result of the serving cell is below the first threshold. In response to detecting that the measurement result of the serving cell is below the first threshold, the wireless device may perform measurements for the one or more first measurement objects. The wireless device may determine a measurement result of the serving cell is below the second threshold. In response to detecting that the measurement result of the serving cell is below the second threshold, the wireless device may perform measurements for the one or more second measurement objects.

A wireless device may receive one or more radio resource control (RRC) messages. The one or more RRC messages may comprise one or more measurement objects and one or more measurement report configurations. The one or more RRC messages may comprise one or more measIds. The wireless device may be configured with a first measurement report configuration that is linked to a plurality of first measurement objects. The first measurement report configuration may comprise an event to trigger a measurement reporting, an event duration or a prohibit timer duration. The wireless device may trigger a measurement report based on the first measurement reporting configuration when one or more measurement objects from the plurality of first measurement objects satisfy the event to trigger the reporting. In response to the triggering the measurement report, the wireless device may transmit a measurement report to a base station and skip one or more measurement reports during the prohibit timer duration.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, because those wireless devices or base stations perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments.

If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state In this disclosure, various embodiments are disclosed. Limitations, features, and/or elements from the disclosed example embodiments may be combined to create further embodiments within the scope of the disclosure.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more (or at least one) message(s)

comprise a plurality of parameters, it implies that a parameter in the plurality of parameters is in at least one of the one or more messages, but does not have to be in each of the one or more messages. In an example embodiment, when one or more (or at least one) message(s) indicate a value, event and/or condition, it implies that the value, event and/or condition is indicated by at least one of the one or more messages, but does not have to be indicated by each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (i.e. hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed:

1. A method comprising:
receiving, by a wireless device, one or more radio resource control (RRC) messages comprising configuration parameters of:
a measurement object of a carrier, the measurement object indicating one or more reference signals;
a measurement report associated with the measurement object; and
one or more conditions to initiate, based on the measurement object, a first measurement of a signal quality of the one or more reference signals;
receiving one or more second RRC messages comprising second configuration parameters of:
one or more second measurement objects;
a first threshold value to be applied based on a signal quality of a primary cell; and
a second threshold value based on the signal quality of the primary cell;
determining if the one or more conditions are met;
in response to the determining indicating that the one or more conditions are met and based on the signal quality of the primary cell being lower than or equal to the first threshold value and the signal quality of the primary cell being higher than the second threshold value:
initiating the first measurement based on the measurement object; and
skipping a second measurement based on the one or more second measurement objects; and
transmitting the signal quality based on the measurement report.

2. The method of claim 1, further comprising, based on the signal quality of the primary cell being lower than or equal to the second threshold value:
continuing the first measurement, based on the measurement object; and
initiating the second measurement based on one or more second measurement objects.

3. The method of claim 1, further comprising receiving one or more medium access control-control elements (MAC-CEs) indicating:
an activation of the measurement object; or
a deactivation of the measurement object.

4. The method of claim 3, wherein the one or more conditions are met when the one or more MAC CEs indicate the activation of the measurement object.

5. The method of claim 1, wherein the determining the one or more conditions are met comprises determining, based on a signal quality threshold of a second carrier, that a signal quality of the second carrier becomes better than the signal quality threshold.

6. The method of claim 1, wherein the determining the one or more conditions are met comprises determining, based on a region, that a location of the wireless device belongs to the region.

7. The method of claim 1, wherein the determining the one or more conditions are met comprises determining, that a power state changes to a normal state from:
 a dormant state; or
 a power saving state.

8. The method of claim 1, further comprising determining the one or more conditions are not met to stop the first measurement based on the measurement object.

9. A wireless device comprising:
 one or more processors; and
 memory storing instructions that, when executed by the one or more processors, cause the wireless device to:
  receive, one or more radio resource control (RRC) messages comprising configuration parameters of:
   a measurement object of a carrier, the measurement object indicating one or more reference signals;
   a measurement report associated with the measurement object; and
   one or more conditions to initiate, based on the measurement object, a first measurement of a signal quality of the one or more reference signals;
  receive one or more second RRC messages comprising second configuration parameters of:
   one or more second measurement objects;
   a first threshold value to be applied based on a signal quality of a primary cell; and
   a second threshold value based on the signal quality of the primary cell; determine if the one or more conditions are met;
  in response to the determination indicating that the one or more conditions are met and based on the signal quality of the primary cell being lower than or equal to the first threshold value and the signal quality of the primary cell being higher than the second threshold value:
   initiate the first measurement based on the measurement object; and
   skip a second measurement based on the one or more second measurement objects; and
  transmit the signal quality based on the measurement report.

10. The wireless device of claim 9, wherein the instructions, when executed by the one or more processors, further cause the wireless device to, based on the signal quality of the primary cell being lower than or equal to the second threshold value:
 continue the first measurement, based on the measurement object; and
 initiate the second measurement based on one or more second measurement objects.

11. The wireless device of claim 9, wherein the instructions, when executed by the one or more processors, further cause the wireless device to receive one or more medium access control-control elements (MAC-CEs) indicating an:
 an activation of the measurement object; or
 a deactivation of the measurement object.

12. The wireless device of claim 11, wherein the one or more conditions are met when the one or more MAC CEs indicate the activation of the measurement object.

13. The wireless device of claim 9, wherein the determination of the one or more conditions are met comprises determining, based on a signal quality threshold of a second carrier, that a signal quality of the second carrier becomes better than the signal quality threshold.

14. The wireless device of claim 9, wherein the determination of the one or more conditions are met comprises determining, based on a region, that a location of the wireless device belongs to the region.

15. The wireless device of claim 9, wherein the determination of the one or more conditions are met comprises determining, that a power state changes to a normal state from:
 a dormant state; or
 a power saving state.

16. A system comprising:
 a base station comprising:
  one or more first processors; and
  first memory storing first instructions that, when executed by the one or more first processors, cause the base station to transmit:
   one or more radio resource control (RRC) messages comprising configuration parameters of:
    a measurement object of a carrier, the measurement object indicating one or more reference signals;
    a measurement report associated with the measurement object;
    one or more conditions to initiate, based on the measurement object, a first measurement of a signal quality of the one or more reference signals; and
   one or more second RRC messages comprising second configuration parameters of:
    one or more second measurement objects;
    a first threshold value to be applied based on a signal quality of a primary cell; and
    a second threshold value based on the signal quality of the primary cell; and
 a wireless device comprising:
  one or more processors; and
  memory storing instructions that, when executed by the one or more processors, cause the wireless device to:
   receive the one or more RRC messages and the one or more second RRC messages;
   determine if the one or more conditions are met;
   in response to the determination indicating that the one or more conditions are met and based on the signal quality of the primary cell being lower than or equal to the first threshold value and the signal quality of the primary cell being higher than the second threshold value:
    initiating the first measurement based on the measurement object; and
    skipping a second measurement based on the one or more second measurement objects; and
   transmit the signal quality based on the measurement report.

* * * * *